(12) United States Patent
Matsuoka et al.

(10) Patent No.: US 12,367,435 B2
(45) Date of Patent: Jul. 22, 2025

(54) SYSTEMS AND METHODS FOR PROPOSAL GENERATION IN A TASK DETERMINATION SYSTEM

(71) Applicant: Yohana LLC, Palo Alto, CA (US)

(72) Inventors: Yoky Matsuoka, Los Altos Hills, CA (US); Defne Civelekoglu, Berkeley, CA (US); Senthilvasan Supramaniam, Sunnyvale, CA (US); Gwendolyn W. van der Linden, Redwood City, CA (US); Nitin Viswanathan, San Francisco, CA (US); David L. Warner, Woodside, CA (US); Lingyun Liu, Sunnyvale, CA (US); Benjamin Deming, Campbell, CA (US); Sean Paterson, Mountain View, CA (US)

(73) Assignee: Yohana LLC, Palo Alto, CA (US)

( * ) Notice: Subject to any disclaimer, the term of this patent is extended or adjusted under 35 U.S.C. 154(b) by 0 days.

(21) Appl. No.: 17/730,359

(22) Filed: Apr. 27, 2022

(65) Prior Publication Data

US 2022/0343238 A1    Oct. 27, 2022

Related U.S. Application Data

(60) Provisional application No. 63/180,589, filed on Apr. 27, 2021.

(51) Int. Cl.
G06Q 10/06     (2023.01)
G06Q 10/0631   (2023.01)

(52) U.S. Cl.
CPC .............................. *G06Q 10/06311* (2013.01)

(58) Field of Classification Search
None
See application file for complete search history.

(56) References Cited

U.S. PATENT DOCUMENTS 10,791,212 B1 *  9/2020  Mattox, Jr. ....... H04M 1/72451
2016/0055236 A1  2/2016  Frank et al.
(Continued)

FOREIGN PATENT DOCUMENTS

WO    2020263459 A1    12/2020

OTHER PUBLICATIONS

International Search Report and Written Opinion mailed Aug. 23, 2022 in International Application PCT/US2022/026496.
(Continued)

*Primary Examiner* — Alan Torrico-Lopez
(74) *Attorney, Agent, or Firm* — Polsinelli LLP

(57) ABSTRACT

Systems and methods for proposal generation in a task recommendation system are provided. A task recommendation system may receive a completed task template corresponding to a task associated with a member. The task recommendation system may automatically query a resource library in real-time to identify a proposal template corresponding to the task type. The task recommendation system may then identify a proposal recommendation for a proposal option associated with a set of proposal options included in the proposal template. The task recommendation system may generate and present a proposal that includes the proposal recommendation. Based on member interaction with the proposal, the task recommendation system may update the member profile and the resource library.

21 Claims, 12 Drawing Sheets

(56) References Cited

U.S. PATENT DOCUMENTS

| | | | |
|---|---|---|---|
| 2017/0091664 A1 | | 3/2017 | Sanchez et al. |
| 2018/0036591 A1 | * | 2/2018 | King et al. |
| 2019/0103107 A1 | * | 4/2019 | Cohen .................. G06F 16/908 |
| 2019/0163985 A1 | | 5/2019 | Wang et al. |
| 2019/0214024 A1 | * | 7/2019 | Gruber ................ G06F 16/2457 |
| 2019/0228347 A1 | | 7/2019 | McSpadden, II et al. |
| 2022/0170915 A1 | | 6/2022 | Van Den Boom et al. |
| 2022/0343238 A1 | | 10/2022 | Matsuoka et al. |
| 2023/0085225 A1 | | 3/2023 | Matsuoka et al. |

OTHER PUBLICATIONS

International Preliminary Report on Patentability mailed Nov. 9, 2023 in International Application PCT/US2022/026496.
International Search Report and Written Opinion mailed Nov. 21, 2024 in International Application PCT/US2024/042754.
Office Action mailed Nov. 27, 2024 in U.S. Appl. No. 18/807,556.

* cited by examiner

SYSTEMS AND METHODS FOR PROPOSAL GENERATION IN A TASK DETERMINATION SYSTEM

CROSS-REFERENCE TO RELATED APPLICATIONS

The present patent application claims the priority benefit of U.S. provisional patent application No. 63/180,589 filed Apr. 27, 2021, the disclosures of which are incorporated by reference herein.

FIELD

The present disclosure relates generally to determination and delegation of tasks and the generation of proposals for satisfying requirements associated with those tasks. In one example, the systems and methods described herein may be used to identify tasks that may be performed for the benefit of a member and to generate proposals for actions to take to perform those tasks. Further, the systems and method described herein may be used to provide automated coordination for the generation of proposals to perform tasks for the benefit of the member.

SUMMARY

Disclosed embodiments may provide a framework to identify and recommend proposals linked to projects and tasks so that various actions may be performed for the benefit of a member. According to some embodiments, a computer-implemented method is provided. The computer-implemented method comprises receiving a completed task template corresponding to a task associated with a member. The completed task template is associated with a task type. The computer-implemented method further comprises automatically querying a resource library in real-time to identify a proposal template corresponding to the task type. The proposal template corresponding to the task type includes a set of proposal options associated with the task type. The computer-implemented method further comprises identifying a proposal recommendation for a proposal option associated with the set of proposal options. The proposal recommendation is identified based on a member profile associated with the member and historical information corresponding to the task type. The computer-implemented method further comprises generating a proposal. The proposal includes the proposal recommendation. Additionally, when the proposal is generated, the proposal is provided to the member. The computer-implemented method further comprises updating the member profile and the resource library based on member interaction with the proposal.

In some embodiments, the computer-implemented method further comprises ranking the proposal recommendation based on a suitability metric. The suitability metric indicates a suitability between the proposal recommendation and the proposal option. The computer-implemented method further comprises adding the ranking to the proposal.

In some embodiments, the computer-implemented method further comprises automatically processing the member profile in real-time to toggle one or more data fields associated with the proposal recommendation. The one or more data fields correspond to information presentable to the member for the proposal.

In some embodiments, the proposal template specifies an empty set of proposal options.

In some embodiments, the computer-implemented method further comprises adding one or more custom fields to the proposal template. The computer-implemented method further comprises generating one or more custom proposal recommendations for a selected custom field. The one or more custom proposal recommendations are generated using a set of parameters associated with the task and associated with the selected custom field.

In some embodiments, the computer-implemented method further comprises receiving a request to add another proposal recommendation for the selected proposal option. The computer-implemented method further comprises automatically querying a resource library to identify previously generated proposals associated with the member. The previously generated proposals include previously provided proposal recommendations. The computer-implemented method further comprises providing the previously provided recommendations in response to the request.

In some embodiments, the computer-implemented method further comprises monitoring member interaction with the proposal to determine one or more preferences corresponding to a presentation of the proposal. The computer-implemented method further comprises automatically updating the member profile based on the one or more preferences.

In an embodiment, a system comprises one or more processors and memory including instructions that, as a result of being executed by the one or more processors, cause the system to perform the processes described herein. In another embodiment, a non-transitory computer-readable storage medium stores thereon executable instructions that, as a result of being executed by one or more processors of a computer system, cause the computer system to perform the processes described herein.

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Illustrative embodiments are described in detail below with reference to the following figures.

Figure 1:
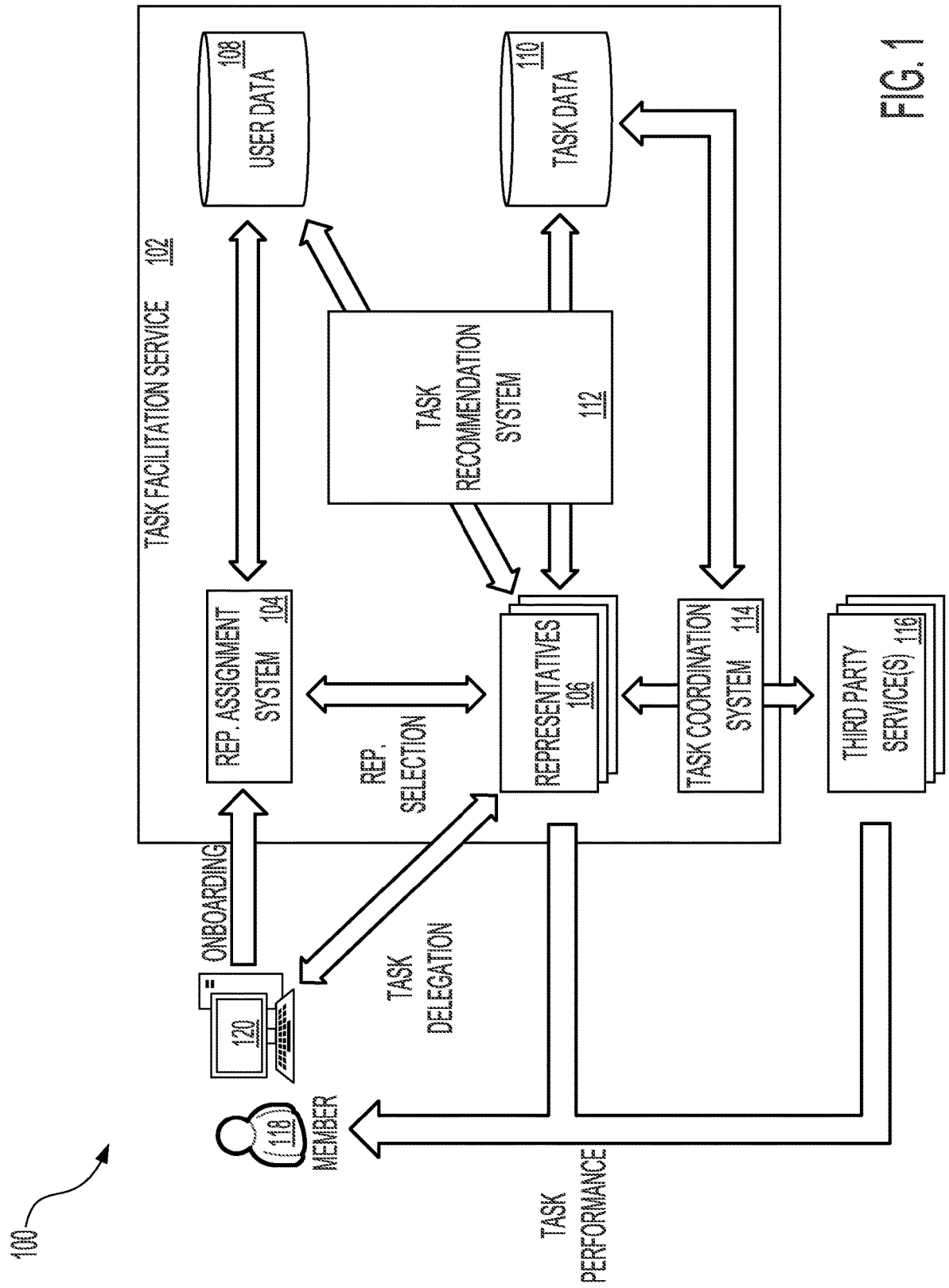
FIG. 1 shows an illustrative example of an environment in which a task facilitation service assigns a representative to a member through which various tasks performable for the benefit of the member can be recommended for performance by the representative and/or one or more third-party services in accordance with various embodiments.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

Additionally, in the appended figures, similar components and/or features may refer back to an earlier described component. For example, a component and/or feature may be described as " . . . the representative 406 (which is the same as the representative 106 described herein at least in connection with FIG. 1) . . . ." Such references are bi-directional in that, a later reference back such as " . . . the representative 806 (which is the same as the representative 106 described herein at least in connection with FIG. 1) . . . " is indicative that components and/or features described with respect to representative 106 and with respect to representative 406 are both incorporated into the components and/or features of representative 806 and vice versa.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Disclosed embodiments may provide a framework to identify and recommend proposals linked to projects and tasks so that various actions may be performed for the benefit of a member. Through this framework, a member may be assigned with a representative that, over time, may learn about the member's preferences and behavior. Those preferences and behaviors can then be used to recommend proposals for performing tasks, whereupon the proposals can be used to guide actions that can be performed on the member's behalf, thereby reducing the member's cognitive load for accomplishing tasks. Further, as the representative develops a relationship with the member over time, the representative can also curate proposals specifically to the member's preferences, propose experiences for the member, and propose actions to assist the member in achieving personal goals and ambitions.

A project that can be performed on behalf of a member can include a number of tasks. For example, a project for planning a birthday party for the child of a member may include tasks to get a cake, provide entertainment, purchase food for the attendees, and purchase gift bags. These tasks may have several available options. For example, the task to "get a cake" may have options based on several different bakeries. Accordingly, a particular project can quickly have a plethora of different tasks and a corresponding plethora of different options. A process to help with the organization and recommendation of the tasks, assign options to tasks, and rank these elements into one or more proposals can assist a representative in providing proposed actions for a member.

FIG. 1 shows an illustrative example of an environment 100 in which a task facilitation service 102 assigns a representative 106 to a member 118 through which various tasks performable for the benefit of the member 118 can be recommended for performance by the representative 106 and/or one or more third-party services 116 in accordance with various embodiments. The task facilitation service 102 may be implemented to reduce the cognitive load on members and their families in performing various tasks by identifying and delegating tasks to representatives 106 that may coordinate performance of these tasks for the benefit of these members. In an embodiment, a member 118, via a computing device 120 (e.g., a laptop computer, smartphone, etc.), may submit a request to the task facilitation service 102 to initiate an onboarding process for assignment of a representative 106 to the member 118 and to initiate identification of tasks that are performable for the benefit of the member 118. For instance, the member 118 may access the task facilitation service 102 via an application provided by the task facilitation service 102 and installed onto a computing device 120. Additionally, or alternatively, the task facilitation service 102 may maintain a web server (not shown) that hosts one or more web sites configured to present or otherwise make available an interface through which the member 118 may access the task facilitation service 102 and initiate the onboarding process.

During the onboarding process, the task facilitation service 102 may collect identifying information of the member 118, which may be used by a representative assignment system 104 to identify and assign a representative 106 to the member 118. For instance, the task facilitation service 102 may provide, to the member 118, a survey or questionnaire through which the member 118 may provide identifying information usable by the representative assignment system 104 to create a member profile for the member 118 and to select a representative 106 for the member 118. For instance, the task facilitation service 102 may prompt the member 118 to provide detailed information with regard to the composition of the member's family (e.g., number of inhabitants in the member's home, the number of children in the member's home, the number and types of pets in the member's home, etc.), the physical location of the member's home, any special needs or requirements of the member 118 (e.g., physical or emotional disabilities, etc.), and the like. In some instances, the member 118 may be prompted to provide demographic information (e.g., age, ethnicity, race, languages written/spoken, etc.). The member 118 may also be prompted to indicate any personal interests or hobbies that may be used to identify possible experiences that may be of interest to the member 118 (described in greater detail herein). In some instances, the task facilitation service 102 may prompt the member 118 to specify any tasks that the member 118 would like assistance with or would otherwise like to delegate to another entity, such as a representative and/or a third-party.

In an embodiment, the member's identifying information, as well as any information related to the member's level of comfort or interest in delegating different categories of tasks to others, is provided to a representative assignment system 104 of the task facilitation service 102 to identify a representative 106 that may be assigned to the member 118. The representative assignment system 104 may be implemented using a computer system or as an application or other executable code implemented on a computer system of the task facilitation service 102. The representative assignment system 104, in an embodiment, uses the member's identifying information, any information related to the member's level of comfort or interest in delegating tasks to others, and any other information obtained during the onboarding process as input to a classification or clustering algorithm configured to identify representatives that may be well-suited to interact and communicate with the member 118 in a productive manner.

Once the representative assignment system 104 has identified a set of representatives 106 that may be assigned to the member 118 to serve as an assistant or concierge for the member 118, the representative assignment system 104 may evaluate data corresponding to each representative of the set of representatives 106 to identify a particular representative that can be assigned to the member 118. For instance, the representative assignment system 104 may rank each representative of the set of representatives 106 according to degrees or vectors of similarity between the member's and representative's demographic information. For instance, if a member and a particular representative share a similar background (e.g., attended university in the same city, are from the same hometown, share particular interests, etc.), the representative assignment system 104 may rank the particular representative higher compared to other representatives that may have less similar backgrounds. Similarly, if a member and a particular representative are within geographic proximity to one another, the representative assignment system 104 may rank the particular representative higher compared to other representatives that may be further away from the member 118. Each factor, in some instances, may be weighted based on the impact of the factor on the creation of a positive, long-term relationship between members and representatives.

In an embodiment, the representative assignment system 104 uses the ranking of the set of representatives 106 to select a representative that may be assigned to the member 118. For instance, the representative assignment system 104 may select the highest ranked representative and determine the representative's availability to engage the member 118 in identifying and recommending tasks, coordinating resolution of tasks, and otherwise communicating with the member 118 to assure that their needs are addressed. If the selected representative is unavailable (e.g., the representative is already engaged with one or more other members, etc.), the representative assignment system 104 may select another representative according to the aforementioned ranking and determine the availability of this representative to engage the member 118. This process may be repeated until a representative is identified from the set of representatives 106 that is available to engage the member 118.

In an embodiment, the representative assignment system 104 can select a representative from the set of representatives 106 based on information corresponding to the availability of each representative. For instance, the representative assignment system 104 may automatically select the first available representative from the set of representatives 106. In some instances, the representative assignment system 104 may automatically select the first available representative that satisfies one or more criteria corresponding to the member's identifying information. For example, the representative assignment system 104 may automatically select an available representative that is within geographic proximity of the member 118, shares a similar background as that of the member 118, and the like.

In an embodiment, the data associated with the member 118 is used by the task facilitation service 102 to create a member profile corresponding to the member 118. As noted above, the task facilitation service 102 may provide, to the member 118, a survey or questionnaire through which the member 118 may provide identifying information associated with the member 118. The responses provided by the member 118 to this survey or questionnaire may be used by the task facilitation service 102 to generate an initial member profile corresponding to the member 118. In an embodiment, once the representative assignment system 104 has assigned a representative to the member 118, the task facilitation service 102 can prompt the member 118 to generate a new member profile corresponding to the member 118. For instance, the task facilitation service 102 may provide the member 118 with a survey or questionnaire that includes a set of questions that may be used to supplement the information previously provided during the aforementioned onboarding process. For example, through the survey or questionnaire, the task facilitation service 102 may prompt the member 118 to provide additional information about family members, important dates (e.g., birthdays, etc.), dietary restrictions, and the like. Based on the responses provided by the member 118, the task facilitation service 102 may update the member profile corresponding to the member 118.

In an embodiment, once the representative assignment system 104 has assigned a particular representative to the member 118, the representative assignment system 104 notifies the member 118 and the particular representative of the pairing. Further, the representative assignment system 104 may establish a chat session or other communications session between the member 118 and the assigned representative to facilitate communications between the member 118 and representative. For instance, via an application provided by the task facilitation service 102 and installed on the computing device 120 or through a web portal provided by the task facilitation service 102, the member 118 may exchange messages with the assigned representative over the chat session or other communication session. Similarly, the representative may be provided with an interface through which the representative may exchange messages with the member 118.

In some instances, the member 118 may initiate or otherwise resume a chat session with an assigned representative. For example, via the application provided by the task facilitation service 102 or through a web portal provided by the task facilitation service 102, the member may transmit a message to the representative over the chat session or other communication session to communicate with the representative. The member 118 can submit a message to the representative to indicate that the member 118 would like assistance with a particular task or project. As an illustrative example, the member 118 can submit a message to the representative to indicate that the member 118 would like the representative's assistance with regard to an upcoming move to Denver in the coming months. The representative, via an interface provided by the task facilitation service 102, may be presented with the submitted message. Accordingly, the representative may evaluate the message and generate a corresponding task that is to be performed to assist the member 118. For instance, the representative, via the interface provided by the task facilitation service 102, may access a task template, through which the representative may provide information related to the task or project. The information may include information related to the member 118 (e.g., member name, member address, etc.) as well as various parameters of the task itself (e.g., allocated budget, timeframe for completion of the task, and the like). The parameters of the task may further include any member preferences (e.g., preferred brands, preferred third-party services 116, etc.). In some instances, the information may be provided through a member profile associated with the member 118. For instance, the representative may access the member profile associated with the member 118 to obtain the information related to the member 118. In an embodiment, the task facilitation service 102 can automatically populate the task template using the member profile.

In an embodiment, the representative can provide the information obtained from the member 118 for the task specified in the one or more messages exchanged between the member 118 and representative to a task recommendation system 112 of the task facilitation service 102 to dynamically, and in real-time, identify any additional task parameters that may be required for generating one or more proposals for completion of the task. The task recommendation system 112 may be implemented using a computer system or as an application or other executable code implemented on a computer system of the task facilitation service 102. The task recommendation system 112, in an embodiment, provides the representative with an interface through which the representative may generate a task that may be presented to the member over a communications session corresponding to the task (e.g., via the application or web portal utilized by the member 118, etc.) and that may be completed by the representative and/or one or more third-party services 116 for the benefit of the member 118. For instance, the representative may provide a name for the task, any known parameters of the task as provided by the member (e.g., budgets, timeframes, task operations to be performed, etc.), and the like. As an illustrative example, if the member 118 transmits the message "Hey Russell, can you help with our move to Denver in 2 months," the representative may evaluate the message and generate a task entitled "Move to Denver." For this task, the representative may indicate that the timeframe for completion of the task is two months, as indicated by the member 118. Further, the representative may add additional information known to the representative about the member, as determined through the representative's own knowledge or through review of the member profile. For example, the representative may indicate any preferred moving companies, any budgetary constraints, and the like.

In an embodiment, the representative can provide the generated task to the task recommendation system 112 to determine whether additional member input is needed for creation of a proposal that may be presented to the member for completion of the task. The task recommendation system 112, for instance, may process the generated task and information corresponding to the member 118 from the user data storage 108 using a machine learning algorithm or artificial intelligence to automatically identify additional parameters for the task, as well as any additional information that may be required from the member 118 for the generation of proposals. For instance, the task recommendation system 112 may use the generated task, information corresponding to the member 118 (e.g., the member profile), and historical data corresponding to tasks performed for other similarly situated members as input to the machine learning algorithm or artificial intelligence to identify any additional parameters that may be automatically completed for the task and any additional information that may be required of the member 118 for defining the task. For example, if the task is related to an upcoming move to another city, the task recommendation system 112 may utilize the machine learning algorithm or artificial intelligence to identify similarly situated members (e.g., members within the same geographic area of member 118, members having similar task delegation sensibilities, members having performed similar tasks, etc.). Based on the task generated for the member 118, characteristics of the member 118 from the member profile stored in the user data storage 108 and data corresponding to these similarly situated members, the task recommendation system 112 may provide additional parameters for the task. As an illustrative example, for the aforementioned task, "Move to Denver," the task recommendation system 112 may provide a recommended budget for the task, one or more moving companies that the member 118 may approve of (as used by other similarly situated members with positive feedback), and the like. The representative may review these additional parameters and select one or more of these parameters for inclusion in the task.

In an embodiment the task recommendation system 112 can use information in the task data storage 110 regarding the third-party services 116 to generate proposal recommendations for a task (e.g., information generated by the task coordination system 114 and stored in the task data storage 110). For example, previous performance on one or more previous tasks that are the same as, or similar to, a task may be used to determine a suitability metric for recommending a particular third-party to perform a task. Similarly, other information about the third-party services 116 may be used to determine a suitability metric for recommending a particular third-party or other entity associated with the task facilitation service 102 to perform a task. For example, comparing the location of the third-party or other entity associated with the task facilitation service 102 to a location where the task is to be performed (e.g., the member's home) may be used to determine the suitability metric for recommending that third-party or other entity associated with the task facilitation service 102 to perform the task. Similarly, where budgetary considerations are a determining factor in performing a task, the task recommendation system 112 may use the previous and/or current rate of a particular third-party or other entity associated with the task facilitation service 102 stored in the task data storage 110 to determine the suitability metric for recommending that third-party or other entity associated with the task facilitation service 102 to perform the task. In some embodiments, parameters associated with a particular third-party or other entity associated with the task facilitation service 102 can be compared against similar parameters of other third parties and/or other entities associated with the task facilitation service 102 to determine the suitability metric for recommending that third-party or other entity associated with the task facilitation service 102 to perform the task. For example, the cost associated with a particular third-party or other entity associated with the task facilitation service 102 as compared to the cost associated with other third parties and/or other entities associated with the task facilitation service 102 may be used by the task recommendation system 112 to determine the suitability metric for recommending that third-party or other entity associated with the task facilitation service 102 to perform the task. In another example, the cost associated with a particular third-party or other entity associated with the task facilitation service 102 as compared to the average cost of all other third parties and other entities associated with the task facilitation service 102 may be used by the task recommendation system 112 to determine the suitability metric for recommending that third-party or other entity associated with the task facilitation service 102 to perform the task. In an embodiment, the task recommendation system 112 can coordinate with the task coordination system 114 to determine the suitability metric for a particular third-party or other entity associated with the task facilitation service 102 to perform a task and/or to provide proposal recommendations for that task.

If the task recommendation system 112 determines that additional member input is required for the task, the task recommendation system 112 may provide the representative with recommendations for questions that may be presented to the member 118 regarding the task. Returning to the "Move to Denver" task example, if the task recommendation system 112 determines that it is important to understand one or more parameters of the member's home (e.g., square footage, number of rooms, etc.) for the task, the task recommendation system 112 may provide a recommendation to the representative to prompt the member 118 to provide these one or more parameters. The representative may review the recommendations provided by the task recommendation system 112 and, via a task-specific interface corresponding to the project or task, prompt the member 118 to provide the additional task parameters. This process may reduce the number of prompts provided to the member 118 in order to define a particular task, thereby reducing the cognitive load on the member 118. In some instances, rather than providing the representative with recommendations for questions that may be presented to the member 118 regarding the task, the task recommendation system 112 can automatically present these questions to the member 118 via the task-specific interface corresponding to the project or task. For instance, if the task recommendation system 112 determines that a question related to the square footage of the member's home is required for the task, the task recommendation system 112 may automatically prompt the member 118, via the task-specific interface corresponding to the project or task, to provide the square footage for the member's home.

In an embodiment, once the representative has obtained the necessary task-related information from the member 118 and/or through the task recommendation system 112 (e.g., task parameters garnered via evaluation of tasks performed for similarly situated members, task parameters garnered from the member profile associated with the member 118, etc.), the representative can utilize a task coordination system 114 of the task facilitation service 102 to generate one or more proposals for resolution of the task. The task coordination system 114 may be implemented using a computer system or as an application or other executable code implemented on a computer system of the task facilitation service 102. In some examples, the representative may utilize a resource library maintained by the task coordination system 114 to identify one or more third-party services 116 and/or resources (e.g., retailers, restaurants, websites, brands, types of goods, particular goods, etc.) that may be used for performance of the task for the benefit of the member 118 according to the one or more task parameters identified by the representative and the task recommendation system 112, as described above. A proposal may specify a timeframe for completion of the task, identification of any third-party services 116 or other entities associated with the task facilitation service 102 (if any) that are to be engaged for completion of the task, a budget estimate for completion of the task, resources or types of resources to be used for completion of the task, and the like. The representative may present the proposal to the member 118 via the task-specific interface corresponding to the project or task to solicit a response from the member 118 to either proceed with the proposal or to provide an alternative proposal for completion of the task.

In an embodiment, the task recommendation system 112 can provide the representative with a recommendation as to whether the representative should provide the member 118 with a proposal and provide the member with an option to defer to the representative with regard to completion of the defined task. For instance, in addition to providing member and task-related information to the task recommendation system 112 to identify additional parameters for the task, the representative may indicate its recommendation to the task recommendation system 112 to present the member 118 with one or more proposals for completion of the task and to either present or omit an option to defer to the representative for completion of the task. The task recommendation system 112 may utilize the machine learning algorithm or artificial intelligence to generate the aforementioned recommendation. The task recommendation system 112 may utilize the information provided by the representative, as well as data for similarly situated members from the user data storage 108 and task data corresponding to similar tasks from a task data storage 110 (e.g., tasks having similar parameters to the submitted task, tasks performed on behalf of similarly situated members, etc.), to determine whether to recommend presentation of one or more proposals for completion of the task and whether to present the member 118 with an option to defer to the representative for completion of the task.

If the representative determines that the member is to be presented with an option to defer to the representative for completion of the task, the representative may present this option to the member over the chat session. The option may be presented in the form of a button or other graphical user interface (GUI) element that the member may select to indicate its approval of the option. For example, the member may be presented with a "Run With It" button to provide the member with an option to defer all decisions related to performance of the task to the representative. If the member 118 selects the option, the representative may present a proposal that has been selected by the representative for completion of the task on behalf of the member 118 and may proceed to coordinate with one or more third-party services 116 for performance and completion of the task according to the proposal. Thus, rather than allowing the member 118 to select a particular proposal for completion of the task, the representative may instead select a particular proposal on behalf of the member 118. The proposal may still be presented to the member 118 in order for the member 118 to verify how the task is to be completed. Any actions taken by the representative on behalf of the member 118 for completion of the task may be recorded in an entry corresponding to the task in the task data storage 110. Alternatively, if the member 118 rejects the option and instead indicates that the representative is to provide one or more proposals for completion of the task, the representative may generate one or more proposals, as described above.

In an embodiment, a representative may recommend one or more curated experiences that may be appealing to the member 118 to take their mind off of urgent matters and to spend more time on themselves and their families. As noted above, during an onboarding process, a member 118 may be prompted to indicate any of its interests or hobbies that the member 118 finds enjoyable. Further, as the representative continues its interactions with the member 118 over the chat session, the representative may prompt the member 118 to provide additional information regarding its interests in a natural way. For instance, a representative may ask the member 118 "what will you be doing this weekend?" Based on the member response, the representative may update the member profile corresponding to the member 118 to indicate the member's preferences. Thus, over time, the representative and the task facilitation service 102 may develop a deeper understanding of the member's interests and hobbies.

In an embodiment, the task facilitation service 102 generates, in each geographic market in which the task facilitation service 102 operates, a set of experiences that may be available to members. For each available experience, the task facilitation service 102 can generate a template that includes both the information required from a member 118 to plan the experience on behalf of the member 118 and a skeleton of what the proposal for the experience recommendation will look like when presented to the member 118. This may make it easier for a representative to complete definition of task(s) associated with the experience. In some instances, the template may incorporate data from various sources that provide high-quality recommendations, such as travel guides, food and restaurant guides, reputable publications, and the like. In an embodiment, the task recommendation system 112, periodically (e.g., monthly, bi-monthly, etc.) or in response to a triggering event (e.g., a set number of tasks are performed, member request, etc.), selects a set of experiences that may be recommended to the member 118.

If the member 118 selects a particular experience recommendation corresponding to an experience that the member 118 would like to have curated on its behalf, the task recommendation system 112 or representative may generate one or more new tasks related to the curation of the selected experience recommendation. Similar to the process described above for the completion of a task for the benefit of a member 118, the representative can generate one or more proposals for curation of a selected experience. For instance, the representative may generate a proposal that provides, amongst other things, a list of days/times for the experience, a list of possible venues for the experience (e.g., parks, movie theaters, hiking trails, etc.), a list of possible meal options and corresponding prices, options for delivery or pick-up of meals, and the like. The various options in a proposal may be presented to the member 118 via a task-specific interface corresponding to the selected experience.

Based on the member responses to the various options presented in the proposal, the representative may indicate that it is starting the curation process for the experience. Further, the representative may provide information related to the experience that may be relevant to the member 118. For example, if the member 118 has selected an option to pick-up food from a selected restaurant for a weekend picnic, the representative may provide detailed driving directions from the member's home to the restaurant to pick up the food (this would not be presented if the member 118 had selected a delivery option), detailed driving directions from the restaurant to the selected venue, parking information, a listing of the food that is to be ordered, and the total price of the food order. The member 118 may review this proposal and may determine whether to accept the proposal.

If the member 118 accepts the proposal, the representative may proceed to perform various tasks to curate the selected experience.

Once a member 118 has selected a particular proposal for a particular task, or has selected a button or other GUI element associated with the particular task to indicate that it wishes to defer to the representative for performance of the task, if the task is to be completed using third-party services 116, the representative may coordinate with one or more third-party services 116 for completion of the task for the benefit of the member 118. For instance, the representative may utilize a task coordination system 114 of the task facilitation service 102 to identify and contact one or more third-party services 116 for performance of a task. As noted above, the task coordination system 114 may include a resource library that includes detailed information related to third-party services 116 and other entities that may be available for the performance of tasks on behalf of members of the task facilitation service 102. For example, an entry for a third-party service in the resource library may include contact information for the third-party service, any available price sheets for services or goods offered by the third-party service, listings of goods and/or services offered by the third-party service, hours of operation, ratings or scores according to different categories of members, and the like. The representative may query the resource library to identify the one or more third-party services that are to perform the task and determine an estimated cost for performance of the task. In some instances, the representative may contact the one or more third-party services 116 to obtain quotes for completion of the task and to coordinate performance of the task for the benefit of the member 118.

In some instances, the resource library may further include detailed information corresponding to other services and other entities that may be associated or affiliated with the task facilitation service 102 and that are contracted to perform various tasks on behalf of members of the task facilitation service 102. These other services and other entities may provide their services or goods at rates agreed upon with the task facilitation service 102. Thus, if the representative selects any of these other services or other entities from the resource library, the representative may be able to determine the particular parameters (e.g., price, availability, time required, etc.) for completion of the task.

In an embodiment, for a given task, the representative can query the resource library to identify one or more third-party services and other services/entities affiliated with the task facilitation service 102 from which to solicit quotes for completion of the task. For instance, for a newly created task, the representative may transmit a job offer to these one or more third-party services and other services/entities. The job offer may indicate various characteristics of the task that is to be completed (e.g., scope of the task, general geographic location of the member 118 or of where the task is to be completed, desired budget, etc.). Through an application or web portal provided by the task facilitation service 102, a third-party service or other service/entity may review the job offer and determine whether to submit a quote for completion of the task or to decline the job offer. If a third-party service or other service/entity opts to reject the job offer, the representative may receive a notification indicating that the third-party service or other service/entity has declined the job offer. Alternatively, if a third-party service or other service/entity opts to bid to perform the task (e.g., accepts the job offer), the third-party service or other service/entity may submit a quote for completion of the task. This quote may indicate the estimated cost for completion of the task, the time required for completion of the task, the estimated date in which the third-party service or other service/entity is available to begin performance of the task, and the like.

The representative may use any provided quotes from the third-party services and/or other services/entities to generate different proposals for completion of the task. These different proposals may be presented to the member 118 through the task-specific interface corresponding to the particular task that is to be completed. If the member 118 selects a particular proposal from the set of proposals presented through the task-specific interface, the representative may transmit a notification to the third-party service or other service/entity that submitted the quote associated with the selected proposal to indicate that it has been selected for completion of the task. Accordingly, the representative may utilize a task coordination system 114 to coordinate with the third-party service or other service/entity for completion of the task, as described in greater detail herein.

In some instances, if the task is to be completed by the representative 106, the representative 106 may utilize the task coordination system 114 of the task facilitation service 102 to identify any resources that may be utilized by the representative 106 for performance of the task. The resource library may include detailed information related to different resources available for performance of a task. As an illustrative example, if the representative 106 is tasked with purchasing a set of filters for the member's home, the representative 106 may query the resource library to identify a retailer that may sell filters of a quality and/or price that is acceptable to the member 118 and that corresponds to the proposal accepted by the member 118. Further, the representative 106 may obtain, from the user data storage 108, available payment information of the member 118 that may be used to provide payment for any resources required by the representative 106 to complete the task. Using the aforementioned example, the representative 106 may obtain payment information of the member 118 from the user data storage 108 to complete a purchase with the retailer for the set of filters that are to be used in the member's home.

In an embodiment, the task coordination system 114 uses a machine learning algorithm or artificial intelligence to select one or more third-party services 116 and/or resources on behalf of the representative for performance of a task. For instance, the task coordination system 114 may utilize the selected proposal or parameters related to the task (e.g., if the member 118 has deferred to the representative for determination of how the task is to be performed), as well as historical task data from the task data storage 110 corresponding to similar tasks as input to the machine learning algorithm or artificial intelligence. The machine learning algorithm or artificial intelligence may produce, as output, a listing of one or more third-party services 116 and/or other entities affiliated with the task facilitation service 102 that may perform the task with a high probability of satisfaction to the member 118. If the task is to be performed by the representative 106, the machine learning algorithm or artificial intelligence may produce, as output, a listing of resources (e.g., retailers, restaurants, brands, etc.) that may be used by the representative 106 for performance of the task with a high probability of satisfaction to the member 118.

In some instances, if the task cannot be completed by the third-party service or other service/entity according to the estimates provided in the selected proposal, the member 118 may be provided with an option to cancel the particular task or otherwise make changes to the task. For instance, if the new estimated cost for performance of the task exceeds the maximum amount specified in the selected proposal, the member 118 may ask the representative to find an alternative third-party service or other service/entity for performance of the task within the budget specified in the proposal. Similarly, if the timeframe for completion of the task is not within the timeframe indicated in the proposal, the member 118 can ask the representative to find an alternative third-party service or other service/entity for performance of the task within the original timeframe. The member's interventions may be recorded by the task recommendation system 112 and the task coordination system 114 to retrain their corresponding machine learning algorithms or artificial intelligence to better identify third-party services 116 and/or other services/entities that may perform tasks within the defined proposal parameters.

In an embodiment, once the representative has contracted with one or more third-party services 116 or other services/entities for performance of a task, the task coordination system 114 may monitor performance of the task by these third-party services 116 or other services/entities. For instance, the task coordination system 114 may record any information provided by the third-party services 116 or other services/entities with regard to the timeframe for performance of the task, the cost associated with performance of the task, any status updates with regard to performance of the task, and the like. The task coordination system 114 may associate this information with the data record in the task data storage 110 corresponding to the task being performed. Status updates provided by third-party services 116 or other services/entities may be provided automatically to the member 118 via the application or web portal provided by the task facilitation service 102 and to the representative.

In an embodiment, if the task is to be performed by the representative 106, the task coordination system 114 can monitor performance of the task by the representative 106. For instance, the task coordination system 114 may monitor, in real-time, any communications between the representative 106 and the member 118 regarding the representative's performance of the task. These communications may include messages from the representative 106 indicating any status updates with regard to performance of the task, any purchases or expenses incurred by the representative 106 in performing the task, the timeframe for completion of the task, and the like. The task coordination system 114 may associate these messages from the representative 106 with the data record in the task data storage 110 corresponding to the task being performed.

As noted above, once a task has been completed, the member 118 may be prompted to provide feedback with regard to completion of the task. For instance, the member 118 may be prompted to provide feedback with regard to the performance and professionalism of the selected third-party services 116 in performance of the task. Further, the member 118 may be prompted to provide feedback with regard to the quality of the proposal provided by the representative and as to whether the performance of the task has addressed the underlying issue associated with the task. Using the responses provided by the member 118, the task facilitation service 102 may train or otherwise update the machine learning algorithms or artificial intelligence utilized by the task recommendation system 112 and the task coordination system 114 to provide better identification of tasks, better generation of proposals, better identification of third-party services 116 for completion of tasks for the benefit of the member 118 and other similarly-situated members, better identification of resources that may be provided to the representative 106 for performance of a task for the benefit of the member 118, and the like.

In an embodiment, the task recommendation system 112 may automatically update the member profile and the resource library in real-time based on member interaction with the proposal. For example, if the member 118 indicates, through a chat session or other communications session associated with the project or task for which the proposal was presented, that the proposal is unacceptable (e.g., does not include any appealing options, does not include appealing recommendations for the presented options, etc.), the task recommendation system 112 may update the member profile to indicate that the provided proposal for the particular task or project was not well received by the member 118. Thus, for similar projects or tasks, a representative may review the member profile and readily determine that the provided proposal options and/or proposal recommendations should not be used as the basis for new proposal options and/or proposal recommendations for the similar projects or tasks. Alternatively, if the member 118 selects a particular proposal recommendation for a proposal option associated with a project or task, and the member 118 provides positive feedback with regard to this proposal recommendation, the task recommendation system 112 may update the member profile to indicate that the provided proposal for the particular task or project was well received by the member 118 and that the proposal recommendation selected by the member 118 may be used for similar projects or tasks in the future. These updates may also be propagated to the resource library such that, for similar projects and tasks, other representatives may be able to readily identify proposal recommendations that may be well suited for proposal options associated with these similar projects and tasks.

It should be noted that for the processes described herein, various operations performed by the representative 106 may be additionally, or alternatively, performed using one or more machine learning algorithms or artificial intelligence. For example, as the representative 106 performs or otherwise coordinates performance of tasks on behalf of a member 118 over time, the task facilitation service 102 may continuously and automatically update the member profile according to member feedback related to the performance of these tasks by the representative 106 and/or third-party services 116. In an embodiment, the task recommendation system 112, after a member's profile has been updated over a period of time (e.g., six months, a year, etc.) or over a set of tasks (e.g., twenty tasks, thirty tasks, etc.), may utilize a machine learning algorithm or artificial intelligence to automatically and dynamically generate new tasks based on the various attributes of the member's profile (e.g., historical data corresponding to member-representative communications, member feedback corresponding to representative performance and presented tasks/proposals, etc.) with or without representative interaction. The task recommendation system 112 may automatically communicate with the member 118 to obtain any additional information required for new tasks and automatically generate proposals that may be presented to the member 118 for performance of these tasks. The representative 106 may monitor communications between the task recommendation system 112 and the member 118 to ensure that the conversation maintains a positive polarity (e.g., the member 118 is satisfied with its interaction with the task recommendation system 112 or other bot, etc.). If the representative 106 determines that the conversation has a negative polarity (e.g., the member 118 is expressing frustration, the task recommendation system 112 or bot is unable to process the member's responses or asks, etc.), the representative 106 may intervene in the conversation. This may allow the representative 106 to address any member concerns and perform any tasks on behalf of the member 118.

Thus, unlike automated customer service systems and environments, wherein these systems and environment may have little to no knowledge of the users interacting with agents or other automated systems, the task recommendation system 112 can continuously update the member profile to provide up-to-date historical information about the member 118 based on the member's automatic interaction with the system or interaction with the representative 106 and on the tasks performed on behalf of the member 118 over time. This historical information, which may be automatically and dynamically updated as the member 118 or the system interacts with the representative 106 and as tasks are devised, proposed, and performed for the member 118 over time, may be used by the task recommendation system 112 to anticipate, identify, and present appropriate or intelligent responses to member 118 queries, needs, and/or goals.

Figure 2:
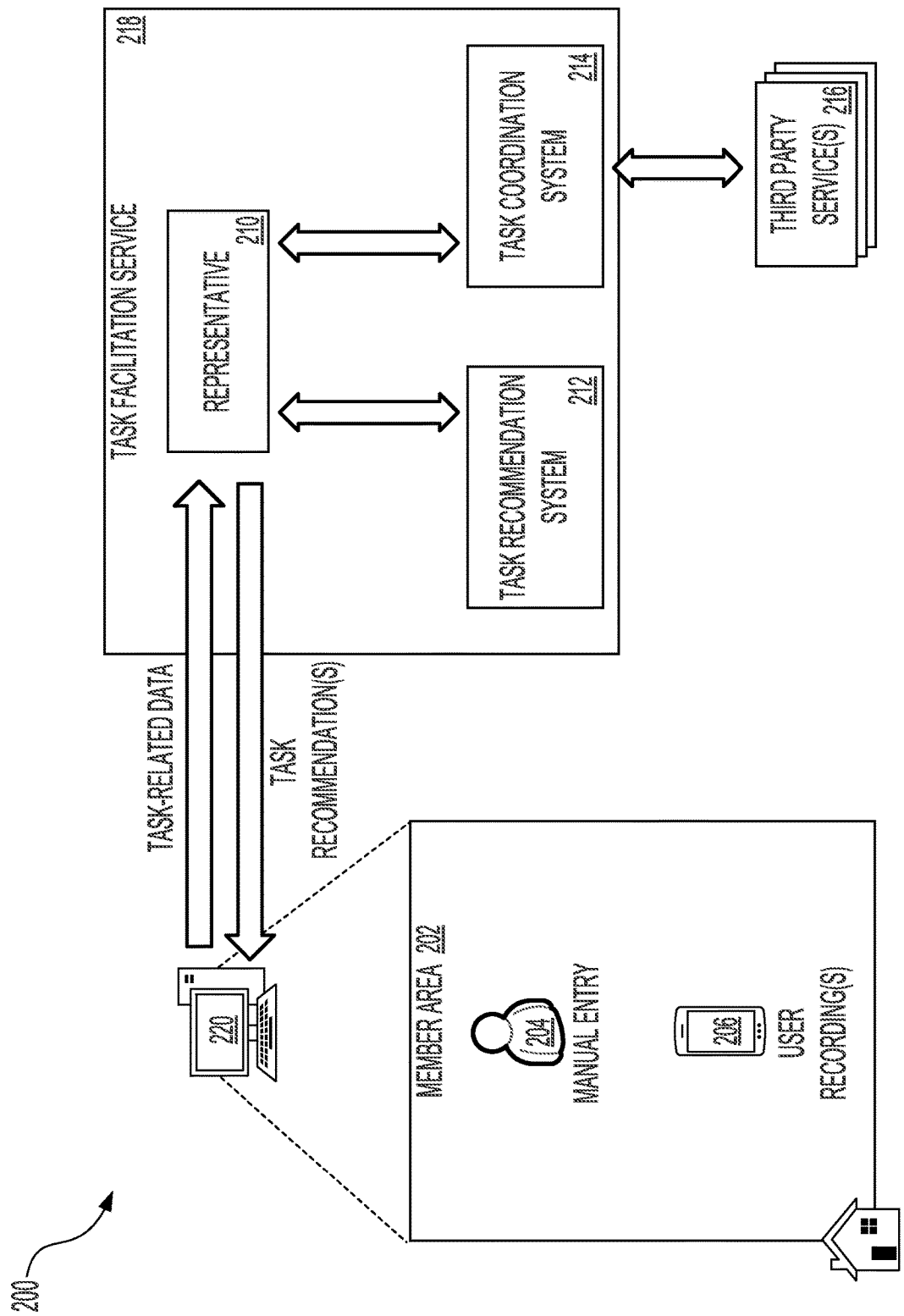
FIG. 2 shows an illustrative example of an environment in which task-related data is collected and aggregated from a member area to identify one or more tasks that can be recommended to the member for performance by a representative and/or third-party services in accordance with at least one embodiment.

FIG. 2 shows an illustrative example of an environment 200 in which task-related data is collected and aggregated from a member area 202 to identify one or more tasks that can be recommended to the member for delegation and performance by the representative 210 and/or third-party services 216 in accordance with at least one embodiment. In the environment 200, a member, via a computing device 220 (e.g., laptop computer, smartphone, etc.), may transmit task-related data to the representative 210 assigned to the member to identify one or more tasks that may be performed for the benefit of the member (the computing device 220 is the same as the computing device 120 described herein at least in connection with FIG. 1). For example, in an embodiment, the member can manually enter one or more tasks that the member would like to delegate to the representative 210 for performance. The task facilitation service 218 may provide, to the member and via an application or web portal provided by the task facilitation service 218, a task template for manual entry 204 of a task that may be delegated to the representative 210 or that may otherwise be added to the member's list of tasks.

In an embodiment, the task template provided to the member may be tailored specifically according to the characteristics of the member identified by the task facilitation service 218 and defined in a member profile associated with the member. The member profile or model may define a set of attributes of the member that may be used by a representative 210 to determine how best to approach the member in conversation, in recommending tasks and proposals to the member, and in performance of the tasks for the benefit of the member. Based on these member attributes, the task facilitation service 218 may omit particular fields from the task template.

If the member submits, via the computing device 220 or through an interface provided by the task facilitation service 218, a completed task template corresponding to a task that is to be performed for the benefit to the member, the representative 210 assigned to the member may obtain the completed task template and initiate evaluation of the task to determine how best to perform the task for the benefit of the member. For instance, the representative 210 may evaluate the task template and generate a new task for the member corresponding to the task-related details provided by the member in the task template. Further, based on the representative's knowledge of the member (e.g., from interaction with the member, from the member profile, etc.), the representative 210 may determine whether to prompt the member for additional information that may be used to determine how best to perform the task for the benefit of the member. For instance, if the member has indicated that they wish to have their gutters cleaned but has not indicated when the gutters should be cleaned via the task template, the representative 210 may communicate with the member via an active chat session associated with the newly created task to inquire as to the timeframe for cleaning of the member's gutters. As another example, if the member has submitted a task without a particular budget for performance of the task, and the representative 210 knows (e.g., based on the member profile, personal knowledge of the member, etc.) that the member is budget-conscious, the representative 210 may communicate with the member to determine what the budget should be for performance of the task. Any information obtained in response to these communications may be used to supplement the member profile such that, for future tasks, this newly obtained information may be automatically retrieved from the member profile without requiring additional prompts to the member.

In an embodiment, a member, via a computing device 220, can submit one or more user recordings 206 that may be used to identify tasks that can be performed for the benefit of the member. For instance, a member may upload, to the task facilitation service 218, one or more digital images of the member area 202 that may be indicative of issues within the member area 202 for which tasks may be created. As an illustrative example, the member may capture an image of a broken baseboard that is in need of repair. As another illustrative example, the member may capture an image of a clogged gutter. The representative 210 may obtain these digital images and manually identify one or more tasks that may be performed to address the issues represented in the uploaded digital images. For instance, if the representative 210 receives a digital image that illustrates a broken baseboard, the representative 210 may generate a new task corresponding to the repair of the broken baseboard. Similarly, if the representative 210 receives a digital image that illustrates a clogged gutter, the representative 210 may generate a task corresponding to the cleaning of the member's gutters. The one or more user recordings 206 may further include audio and/or video recordings within the member area 202 corresponding to possible issues for which tasks may be generated. These audio and/or video recordings may be reviewed by the representative 210 to identify any tasks that may be performed for the benefit of the member. Using the example of the broken baseboard described above, the member may record a video highlighting the broken baseboard while indicating "I would like to have this baseboard fixed soon as we're getting ready to sell the house." This video, thus, may highlight an issue related to a broken baseboard and a level of urgency in having the baseboard repaired within a short timeframe due to the member selling their home.

In an embodiment, a representative 210 can generate one or more proposals for completion of any given task presented to the member via the application or web portal provided by the task facilitation service 218. A proposal may include one or more options (also referred to herein as "recommendations") presented to a member that may be created and/or collected by a representative 210 while researching a given task. In some instances, a representative 210 may be provided with one or more templates that may be used to generate these one or more proposals. For example, the task facilitation service 218 may maintain proposal templates for different task types, whereby a proposal template for a particular task type may include various data fields associated with the task type. As an illustrative example, for a task associated with planning a birthday party, a representative 210 may utilize a proposal template corresponding to event planning. The proposal template corresponding to event planning may include data fields corresponding to venue options, catering options, entertainment options, and the like.

In an embodiment, the data fields within a proposal template can be toggled on or off to provide a representative 210 with the ability to determine what information is presented to the member in a proposal. For example, for a task associated with renting a balloon jump house for a party, a corresponding proposal template may include data fields corresponding to the location/address of a rental business, the business hours and availability of the rental business, an estimated cost, ratings/reviews for the rental business, and the like. The representative 210, based on its knowledge of the member's preferences, may toggle on or off any of these data fields. For example, if the representative 210 has established a relationship with the member whereby the representative 210, with high confidence, knows that the member trusts the representative 210 in selecting reputable businesses for its tasks, the representative 210 may toggle off a data field corresponding to the ratings/reviews for corresponding businesses from the proposal template. Similarly, if the representative 210 knows that the member is not interested in the location/address of the rental business for the purpose of the proposal, the representative 210 may toggle off the data field corresponding to the location/address for corresponding businesses from the proposal template. While certain data fields may be toggled off within the proposal template, the representative 210 may complete these data fields to provide additional information that may be used by the task facilitation service 218 to supplement a resource library of proposals as described in greater detail herein.

In an embodiment, the task facilitation service 218 utilizes a machine learning algorithm or artificial intelligence to generate recommendations for the representative 210 regarding data fields that may be presented to the member in a proposal. For example, the task facilitation service 218 may use, as input to the machine learning algorithm or artificial intelligence, a member profile or model associated with the member, historical task data for the member (e.g., previously completed tasks, tasks for which proposals have been provided, etc.), and information corresponding to the task for which a proposal is being generated (e.g., a task type or category, etc.). The output of the machine learning algorithm or artificial intelligence may define which data fields of a proposal template should be toggled on or off. For example, if the task facilitation service 218 determines, based on an evaluation of the member profile or model, historical task data for the member, and the information corresponding to the task for which the proposal is being generated, that the member is likely not interested in viewing information related to the ratings/reviews for the business nor the location/address of the business, the task facilitation service 218 may automatically toggle off these data fields from the proposal template. The task facilitation service 218, in some instances, may retain the option to toggle on these data fields in order to provide the representative 210 with the ability to present these data fields to the member in a proposal. For example, if the task facilitation service 218 has automatically toggled off a data field corresponding to the estimated cost for a balloon jump house rental from a particular business, but the member has expressed an interest in the possible cost involved, the representative 210 may toggle on the data field corresponding to the estimated cost.

In some instances, when a proposal is presented to a member, the task facilitation service 218 may monitor member interaction with the representative 210 and with the proposal to obtain data that may be used to further train the machine learning algorithm or artificial intelligence. For example, if a representative 210 presents a proposal without any ratings/reviews for a particular business based on the recommendation generated by the machine learning algorithm or artificial intelligence, and the member indicates (e.g., through messages to the representative 210, through selection of an option in the proposal to view ratings/reviews for the particular business, etc.) that they are interested in ratings/reviews for the particular business, the task facilitation service may utilize these feedback to further train the machine learning algorithm or artificial intelligence to increase the likelihood of recommending presentation of ratings/reviews for businesses selected for similar tasks or task types.

In an embodiment, the task facilitation service 218 maintains, via the task coordination system 214 (which is the same as the task coordination system 114 described herein at least in connection with FIG. 1), a resource library that may be used to automatically populate one or more data fields of a particular proposal template. The resource library may include entries corresponding to businesses and/or products previously used by representatives for proposals related to particular tasks or task types or that are otherwise associated with particular tasks or task types. For instance, when a representative 210 generates a proposal for a task related to repairing a roof near Lynnwood, Washington, the task coordination system 214 may obtain information associated with the roofer selected by the representative 210 for the task. The task coordination system 214 may generate an entry corresponding to the roofer in the resource library and associate this entry with "roof repair" and "Lynnwood, Washington" Thus, if another representative receives a task corresponding to repairing a roof for a member located near Lynnwood, Washington (e.g., Everett, Washington), the other representative may query the resource library for roofers near Lynnwood, Washington. The resource library may return, in response to the query, an entry corresponding to the roofer previously selected by the representative 210. If the other representative selects this roofer, the task coordination system 214 may automatically populate the data fields of the proposal template with the information available for the roofer from the resource library.

The representative 210, via a proposal template, may generate additional proposal options for businesses and/or products that may be used for completion of a task. For instance, for a particular proposal, the representative 210 may generate a recommended option, which may correspond to the business or product that the representative 210 is recommending for completion of a task. Additionally, in order to provide the member with additional options or choices, the representative 210 can generate additional options corresponding to other businesses or products that may complete the task. In some instances, if the representative 210 knows that the member has delegated the decision-making with regard to completion of a task to the representative 210, the representative 210 may forego generation of additional proposal options outside of the recommended option. However, the representative 210 may still present, to the member, the selected proposal option for completion of the task in order to keep the member informed about the status of the task.

In an embodiment, once the representative 210 has completed defining a proposal via use of a proposal template, the task facilitation service 218 may present the proposal to the member through the application or web portal provided by the task facilitation service 218. In some instances, the representative 210 may transmit a notification to the member to indicate that a proposal has been prepared for a particular task and that the proposal is ready for review via the application or web portal provided by the task facilitation service 218. The proposal presented to the member may indicate the task for which the proposal was prepared, as well as an indication of the one or more options that are being provided to the member. For instance, the proposal may include links to the recommended proposal option and to the other options (if any) prepared by the representative 210 for the particular task. These links may allow the member to navigate amongst the one or more options prepared by the representative 210 via the application or web portal.

For each proposal option, the member may be presented with information corresponding to the business (e.g., third-party service or other service/entity associated with the task facilitation service 218) or product selected by the representative 210 and corresponding to the data fields selected for presentation by the representative 210 via the proposal template. For example, for a task associated with a roof inspection at the member's home, the representative 210 may present for a particular roofer (e.g., proposal option) one or more reviews or testimonials for the roofer, the rate and availability for the roofer subject to the member's task completion timeframe (if any), the roofer's website, the roofer's contact information, any estimated costs, and an indication of next steps for the representative 210 should the member select this particular roofer for the task. In some instances, the member may select what details or data fields associated with a particular proposal are presented via the application or web portal. For example, if the member is presented with the estimated total for each proposal option and the member is not interested in reviewing the estimated total for each proposal option, the member may toggle off this particular data field from the proposal via the application or web portal. Alternatively, if the member is interested in reviewing additional detail with regard to each proposal option (e.g., additional reviews, additional business or product information, etc.), the member may request this additional detail to be presented via the proposal.

In an embodiment, based on member interaction with a provided proposal, the task facilitation service 218 can further train a machine learning algorithm or artificial intelligence used to determine or recommend what information should be presented to the member and to similarly-situated members for similar tasks or task types. As noted above, the task facilitation service 218 may use a machine learning algorithm or artificial intelligence to generate recommendations for the representative 210 regarding data fields that may be presented to the member in a proposal. The task facilitation service 218 may monitor or track member interaction with the proposal to determine the member's preferences regarding the information presented in the proposal for the particular task. Further, the task facilitation service 218 may monitor or track any messages exchanged between the member and the representative 210 related to the proposal to further identify the member's preferences. For example, if the member sends a message to the representative 210 indicating that the member would like to see more information with regard to the services offered by each of the businesses specified in the proposal, the task facilitation service 218 may determine that the member may want to see additional information with regard to the services offered by businesses associated with the particular task or task type. In some instances, the task facilitation service 218 may solicit feedback from the member with regard to proposals provided by the representative 210 to identify the member's preferences. This feedback and information garnered through member interaction with the representative 210 regarding the proposal and with the proposal itself may be used to retrain the machine learning algorithm or artificial intelligence to provide more accurate or improved recommendations for information that should be presented to the member and to similarly situated members in proposals for similar tasks or task types.

In some instances, each proposal presented to the member may specify any costs associated with each proposal option. These costs may be presented in different formats based on the requirements of the associated task or project. For instance, if a task or project corresponds to the purchase of an airline ticket, each proposal option for the corresponding proposal may present a fixed price for the airline ticket. As another illustrative example, a representative 210 can provide, for each proposal option, a budget for completion of the task according to the selected option (e.g., "will spend up to $150 on Halloween decorations for the party"). As yet another illustrative example, for tasks or projects where payment schedules may be involved, proposal options for a proposal related to a task or project may specify the payment schedule for each of these proposal options (e.g., "$100 for the initial consultation, with $300 for follow-up servicing," "$1,500 up-front to reserve the venue, with $1,500 due after the event," etc.).

If a member accepts a particular proposal option for a task or project, the representative 210 may communicate with the member to ensure that the member is consenting to payment of the presented costs and any associated taxes and fees for the particular proposal option. In some instances, if a proposal option is selected with a static payment amount (e.g., fixed price, "up to $X," phased payment schedules with static amounts, etc.), the member may be notified by the representative 210 if the actual payment amount required for fulfillment of the proposal option exceeds a threshold percentage or amount over the originally presented static payment amount. For example, if the representative 210 determines that the member may be required to spend more than 120% of the cost specified in the selected proposal option, the representative 210 may transmit a notification to the member to re-confirm the payment amount before proceeding with the proposal option.

In an embodiment, if a member accepts a proposal option from the presented proposal, the task facilitation service 218 moves the task associated with the presented proposal to an executing state and the representative 210 can proceed to execute on the proposal according to the selected proposal option. For instance, the representative 210 may contact one or more third-party services 216 to coordinate performance of the task according to the parameters defined in the proposal accepted by the member.

In an embodiment, the representative 210 utilizes the task coordination system 214 to assist in the coordination of performance of the task according to the parameters defined in the proposal accepted by the member. For instance, if the coordination with a third-party service 216 may be performed automatically (e.g., third-party service 216 provides automated system for ordering, scheduling, payments, etc.), the task coordination system 214 may interact directly with the third-party service 216 to coordinate performance of the task according to the selected proposal option. The task coordination system 214 may provide any information (e.g., confirmation, order status, reservation status, etc.) to the representative 210. The representative 210 may provide this information to the member via the application or web portal utilized by the member to access the task facilitation service 218 or through other communication methods (e.g., e-mail message, text message, etc.) to indicate that the third-party service 216 has initiated performance of the task according to the selected proposal option. In an embodiment, if the representative 210 is performing the task for the benefit of a member, the representative 210 can provide status updates with regard to its performance of the task to the member via the application or web portal provided by the task facilitation service 218.

Once a task has been completed, the member may provide feedback with regard to the performance of the representative 210 and/or third-party services 216 that performed the task according to the proposal option selected by the member. For instance, the member may exchange one or more messages with the representative 210 over the chat session for the particular task to indicate its feedback with regard to the completion of the task. In an embodiment, the task facilitation service uses a machine learning algorithm or artificial intelligence to process feedback provided by the member to improve the recommendations provided by the task facilitation service 218 for proposal options, third-party services 216 or other services/entities, and/or processes that may be performed for completion of similar tasks.

Figure 3:
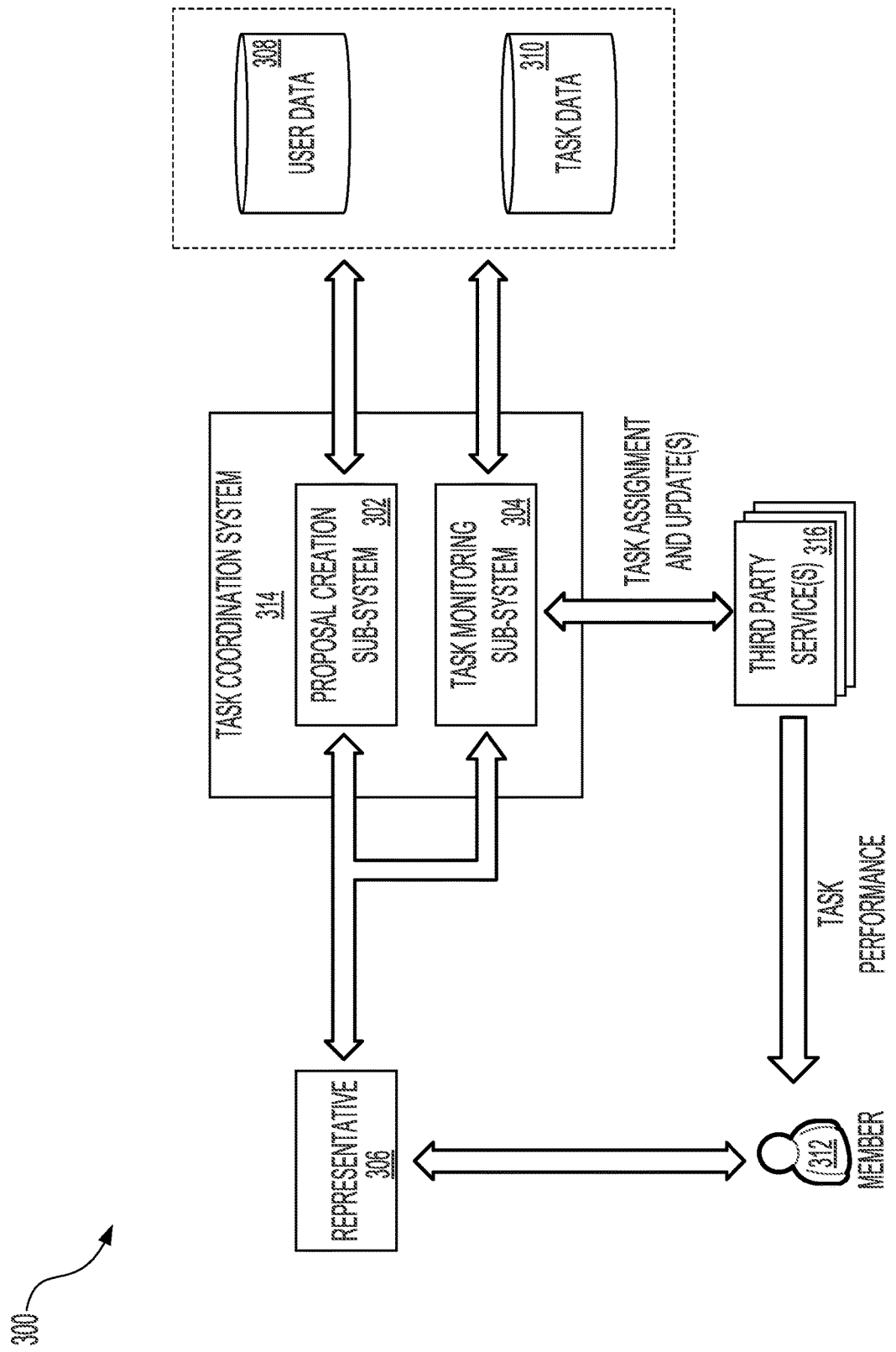
FIG. 3 shows an illustrative example of an environment in which a task coordination system assigns and monitors performance of a task for the benefit of a member by a representative and/or one or more third-party services in accordance with at least one embodiment.

FIG. 3 shows an illustrative example of an environment 300 in which a task coordination system 314 assigns and monitors performance of a task for the benefit of a member 312 by a representative 306 and/or one or more third-party services 316 in accordance with at least one embodiment. In the environment 300, a representative 306 may access a proposal creation sub-system 302 of the task coordination system 314 to generate a proposal for completion of a task for the benefit of the member 312. The proposal creation sub-system 302 may be implemented using a computer system or as an application or other executable code implemented on a computer system of the task coordination system 314. Once the representative 306 has obtained the necessary task-related information from the member 312 and/or through the task recommendation system (e.g., task parameters garnered via evaluation of tasks performed for similarly situated members, etc.), the representative 306 can utilize the proposal creation sub-system 302 to generate one or more proposals for resolution of the task.

As noted above, a proposal may include one or more options presented to a member 312 that may be created and/or collected by a representative 306 while researching a given task. In some instances, a representative 306 may access, via the proposal creation sub-system 302, one or more proposal templates that may be used to generate these one or more proposals. For example, the proposal creation sub-system 302 may maintain, within the task data storage 310 or internally, proposal templates for different task types, whereby a proposal template for a particular task type may include various data fields associated with the task type. The task data storage 310 may be associated with a resource library. This resource library may maintain the various proposal templates for the creation of new proposals for completion of different tasks.

In an embodiment, the data fields within a proposal template can be toggled on or off to provide a representative 306 with the ability to determine what information is presented to the member 312 in a proposal. The representative 306, based on its knowledge of the member's preferences, may toggle on or off any of these data fields within the template. For example, if the representative 306 has established a relationship with the member 312 whereby the representative 306, with high confidence, knows that the member trusts the representative 306 in selecting reputable businesses for its tasks, the representative 306 may toggle off a data field corresponding to the ratings/reviews for corresponding businesses from the proposal template. Similarly, if the representative 306 knows that the member 312 is not interested in the location/address of a business for the purpose of the proposal, the representative 306 may toggle off the data field corresponding to the location/address for corresponding businesses from the proposal template. While certain data fields may be toggled off within the proposal template, the representative 306 may complete these data fields to provide additional information that may be used by the proposal creation sub-system 302 to supplement proposals maintained by the task coordination system 314 within the resource library.

In an embodiment, the proposal creation sub-system 302 utilizes a machine learning algorithm or artificial intelligence to generate recommendations for the representative 306 regarding data fields that may be presented to the member 312 in a proposal. The proposal creation sub-system 302 may use, as input to the machine learning algorithm or artificial intelligence, a member profile or model associated with the member 312 from the user data storage 308, historical task data for the member 312 from the task data storage 310, and information corresponding to the task for which a proposal is being generated (e.g., a task type or category, etc.). The output of the machine learning algorithm or artificial intelligence may specify which data fields of a proposal template should be toggled on or off. The proposal creation sub-system 302, in some instances, may preserve, for the representative 306, the option to toggle on these data fields in order to provide the representative 306 with the ability to present these data fields to the member 312 in a proposal. For example, if the proposal creation sub-system 302 has automatically toggled off a data field corresponding to the estimated cost for completion of a task, but the member 312 has expressed an interest in the possible cost involved, the representative 306 may toggle on the data field corresponding to the estimated cost.

Once the representative 306 has generated a new proposal for the member 312, the representative 306 may present the proposal and any corresponding proposal options to the member 312. Further, the proposal creation sub-system 302 may store the new proposal in the user data storage 308 in association with the member profile. In some instances, when a proposal is presented to a member 312, the proposal creation sub-system 302 may monitor member interaction with the representative 306 and with the proposal to obtain data that may be used to further train the machine learning algorithm or artificial intelligence. For example, if a representative 306 presents a proposal without any ratings/reviews for a particular business based on the recommendation generated by the proposal creation sub-system 302, and the member 312 indicates (e.g., through messages to the representative 306, through selection of an option in the proposal to view ratings/reviews for the particular business, etc.) that they are interested in ratings/reviews for the particular business, the proposal creation sub-system 302 may utilize this feedback to further train the machine learning algorithm or artificial intelligence to increase the likelihood of recommending presentation of ratings/reviews for businesses selected for similar tasks or task types.

As noted above, the task coordination system 314 maintains a resource library that may be used to automatically populate one or more data fields of a particular proposal template. The resource library may include entries corresponding to businesses and/or products previously used by representatives for proposals related to particular tasks or task types or that are otherwise associated with particular tasks or task types. For instance, when a representative 306 generates a proposal for a task related to repairing a roof near Lynnwood, Washington, the proposal creation sub-system 302 may obtain information associated with the roofer selected by the representative 306 for the task. The proposal creation sub-system 302 may generate an entry corresponding to the roofer in the resource library and associate this entry with "roof repair" and "Lynnwood, Washington" Thus, if another representative receives a task corresponding to repairing a roof for a member located near Lynnwood, Washington, the other representative may query the resource library for roofers near Lynnwood, Washington. The resource library may return, in response to the query, an entry corresponding to the roofer previously selected by the representative 306. If the other representative selects this roofer, the proposal creation sub-system 302 may automatically populate the data fields of the proposal template with the information available for the roofer from the resource library.

In an embodiment, the representative 306 can query the resource library to identify one or more third-party services and other services/entities affiliated with the task facilitation service from which to solicit quotes for completion of the task. For instance, for a newly created task, the representative 306 may transmit a job offer to these one or more third-party services 316 and other services/entities. The job offer may indicate various characteristics of the task that is to be completed (e.g., scope of the task, general geographic location of the member 312 or of where the task is to be completed, desired budget, etc.). Through an application or web portal provided by the task facilitation service, a third-party service or other service/entity may review the job offer and determine whether to submit a quote for completion of the task or to decline the job offer. If a third-party service or other service/entity opts to reject the job offer, the representative 306 may receive a notification indicating that the third-party service or other service/entity has declined the job offer. Alternatively, if a third-party service or other service/entity opts to bid to perform the task (e.g., accepts the job offer), the third-party service or other service/entity may submit a quote for completion of the task. This quote may indicate the estimated cost for completion of the task, the time required for completion of the task, the estimated date in which the third-party service or other service/entity is available to begin performance of the task, and the like.

The representative 306 may use any provided quotes from the third-party services 316 and/or other services/entities to generate different proposal options for completion of the task. These different proposal options may be presented as a proposal to the member 312 through the task-specific interface corresponding to the particular task that is to be completed. If the member 312 selects a particular proposal option from the set of proposal options presented through the task-specific interface, the representative 306 may transmit a notification to the third-party service or other service/ entity that submitted the quote associated with the selected proposal option to indicate that it has been selected for completion of the task.

As noted above, the representative 306, via a proposal template, may generate additional proposal options for businesses and/or products that may be used for completion of a task. For instance, for a particular proposal, the representative 306 may generate a recommended option, which may correspond to the business or product that the representative 306 is recommending for completion of a task. Additionally, in order to provide the member 312 with additional options or choices, the representative 306 can generate additional options corresponding to other businesses or products that may complete the task. In some instances, if the representative 306 knows that the member 312 has delegated the decision-making with regard to completion of a task to the representative 306, the representative 306 may forego generation of additional proposal options outside of the recommended option. However, the representative 306 may still present, to the member 312, the selected proposal option for completion of the task in order to keep the member 312 informed about the status of the task.

Once the representative 306 has completed defining a proposal via use of a proposal template, the representative 306 may present the proposal to the member 312 through the application or web portal provided by the task facilitation service. In some instances, the representative 306 may transmit a notification to the member 312 to indicate that a proposal has been prepared for a particular task and that the proposal is ready for review via the application or web portal provided by the task facilitation service. The proposal presented to the member 312 may indicate the task for which the proposal was prepared, as well as an indication of the one or more options that are being provided to the member 312. For instance, the proposal may include links to the recommended proposal option and to the other options (if any) prepared by the representative 306 for the particular task. These links may allow the member 312 to navigate amongst the one or more options prepared by the representative 306 via the application or web portal. In some instances, the representative 306 may transmit the proposal to the member 312 via other communication channels, such as via e-mail, text message, and the like.

For each proposal option, the member may be presented with information corresponding to the business or product selected by the representative 306 and corresponding to the data fields selected for presentation by the representative 306 via the proposal creation sub-system 302. In some instances, the member 312 may select what details or data fields associated with a particular proposal are presented via the application or web portal. For example, if the member 312 is presented with the estimated total for each proposal option and the member 312 is not interested in reviewing the estimated total for each proposal option, the member 312 may toggle off this particular data field from the proposal via the application or web portal. Alternatively, if the member 312 is interested in reviewing additional detail with regard to each proposal option (e.g., additional reviews, additional business or product information, etc.), the member 312 may request this additional detail to be presented via the proposal.

As noted above, based on member interaction with a provided proposal, the proposal creation sub-system 302 may further train a machine learning algorithm or artificial intelligence used to determine or recommend what information should be presented to the member 312 and to similarly-situated members for similar tasks or task types. The proposal creation sub-system 302 may monitor or track member interaction with the proposal to determine the member's preferences regarding the information presented in the proposal for the particular task. Further, the proposal creation sub-system 302 may monitor or track any messages exchanged between the member 312 and the representative 306 related to the proposal to further identify the member's preferences. In some instances, the proposal creation sub-system 302 may solicit feedback from the member 312 with regard to proposals provided by the representative 306 to identify the member's preferences. This feedback and information garnered through member interaction with the representative 306 regarding the proposal and with the proposal itself may be used to retrain the machine learning algorithm or artificial intelligence to provide more accurate or improved recommendations for information that should be presented to the member 312 and to similarly situated members in proposals for similar tasks or task types. The proposal creation sub-system 302 may further use the feedback and information garnered through member interaction with the representative 306 to update a member profile or model within the user data storage 308 for use in determining recommendations for information that should be presented to the member 312 in a proposal.

In some instances, each proposal presented to the member 312 may specify any costs associated with each proposal option. These costs may be presented in different formats based on the requirements of the associated task or project. For instance, if the proposal corresponds to performance of the task by a third-party service or other service/entity associated with the task facilitation service, the proposal may include a quote submitted by the third-party service or other service/entity in response to the job offer from the representative 306. The quote may indicate any costs associated with different aspects of the task, as well as any additional fees that may be required for performance of the task (e.g., taxes, material costs, etc.). If a member 312 accepts a particular proposal option for a task or project, the representative 306 may communicate with the member 312 to ensure that the member is consenting to payment of the presented costs and any associated taxes and fees for the particular proposal option. In some instances, if a proposal option is selected with a static payment amount, the member 312 may be notified by the representative 306 if the actual payment amount required for fulfillment of the proposal option exceeds a threshold percentage or amount over the originally presented static payment amount.

In an embodiment, if a member 312 accepts a proposal option from the presented proposal, the task coordination system 314 moves the task associated with the presented proposal to an executing state and the representative 306 can proceed to execute on the proposal according to the selected proposal option. For instance, the representative 306 may contact one or more third-party services 316 and/or other services/entities associated with the task facilitation service to coordinate performance of the task according to the parameters defined in the proposal accepted by the member 312. Alternatively, if the representative 306 is to perform the task for the benefit of the member 312, the representative 306 may begin performance of the task according to the parameters defined in the proposal accepted by the member 312.

In an embodiment, the representative 306 utilizes a task monitoring sub-system 304 of the task coordination system 314 to assist in the coordination of performance of the task according to the parameters defined in the proposal accepted by the member 312. The task monitoring sub-system 304 may be implemented using a computer system or as an application or other executable code implemented on a computer system of the task coordination system 314. If the coordination with a third-party service 316 may be performed automatically (e.g., third-party service 316 provides automated system for ordering, scheduling, payments, etc.), the task monitoring sub-system 304 may interact directly with the third-party service 316 to coordinate performance of the task according to the selected proposal option. The task monitoring sub-system 304 may provide any information from a third-party service 316 to the representative 306. The representative 306, in turn, may provide this information to the member 312 via the application or web portal utilized by the member to access the task facilitation service. Alternatively, the representative 306 may transmit the information to the member 312 via other communication methods (e.g., e-mail message, text message, etc.) to indicate that the third-party service 316 has initiated performance of the task according to the selected proposal option.

In an embodiment, the task monitoring sub-system 304 can monitor performance of tasks by the representative 306 and/or the third-party services 316 for the benefit of the member 312. Further, once a task has been completed, the member 312 may provide feedback with regard to the performance of the representative 306 and/or third-party services 316 or other services/entities associated with the task facilitation service that performed the task according to the proposal option selected by the member 312. For instance, the member 312 may exchange one or more messages with the representative 306 over the task-specific chat session or other communications channel to indicate its feedback with regard to the completion of the task. In an embodiment, the task monitoring sub-system 304 provides the feedback to the proposal creation sub-system 302, which may use a machine learning algorithm or artificial intelligence to process feedback provided by the member 312 to improve the recommendations provided by the proposal creation sub-system 302 for proposal options, third-party services 316 or other services/entities, and/or processes that may be performed for completion of similar tasks. For instance, if the proposal creation sub-system 302 detects that the member is unsatisfied with the result provided by a third-party service 316 or other services/entities for a particular task, the proposal creation sub-system 302 may utilize this feedback to further train the machine learning algorithm or artificial intelligence to reduce the likelihood of the third-party service 316 or other services/entities being recommended for similar tasks and to similarly-situated members. As another example, if the proposal creation sub-system 302 detects that the member is pleased with the result provided by a representative 306 for a particular task, the proposal creation sub-system 302 may utilize this feedback to further train the machine learning algorithm or artificial intelligence to reinforce the operations performed by representatives for similar tasks and/or for similarly-situated members.

Figure 4:
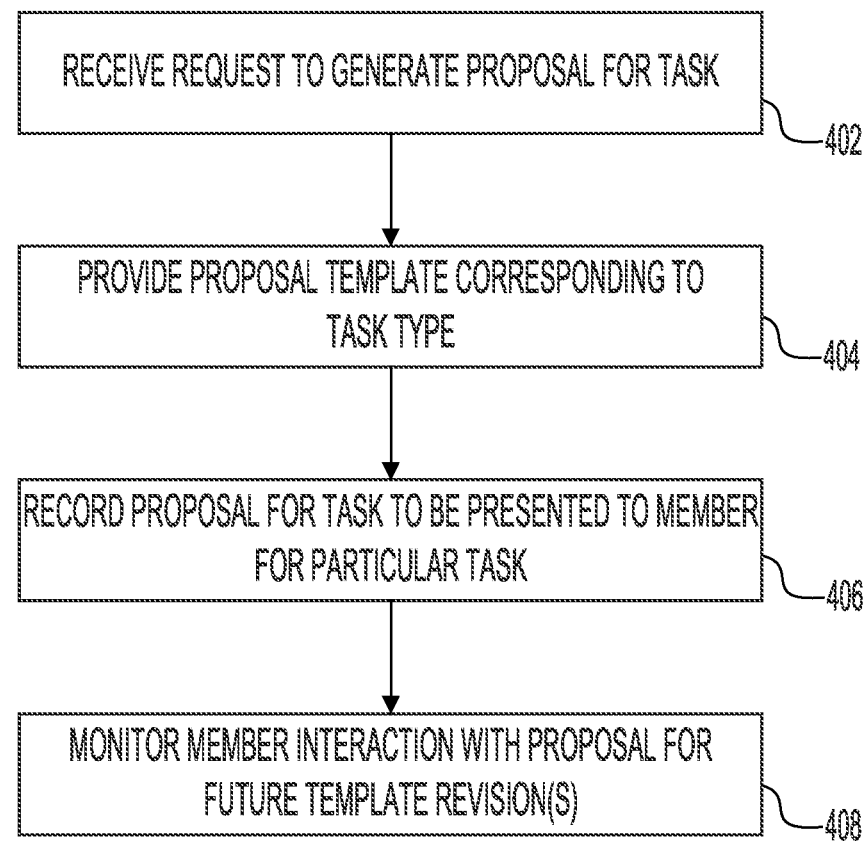
FIG. 4 shows an illustrative example of a process for generating a proposal and monitoring member interaction with the generated proposal in accordance with at least one embodiment.

FIG. 4 shows an illustrative example of a process 400 for generating a proposal and monitoring member interaction with the generated proposal in accordance with at least one embodiment. The process 400 may be performed by one or more systems of the task facilitation service (e.g., the task recommendation system 112 and the task coordination system 114 of the task facilitation service 102, all of which are described herein at least in connection with FIG. 1). At step 402, the systems of the task facilitation service may receive a request to generate a proposal for a particular task. The request may be submitted by a representative, which may have received authorization from a member to perform a task for the benefit of the member. For instance, once the representative has obtained the necessary task-related information from the member and/or through the task recommendation system (e.g., task parameters garnered via evaluation of tasks performed for similarly situated members, etc.), the representative can utilize systems of the task facilitation service to generate one or more proposals for resolution of the task as described herein.

At step 404, the systems of the task facilitation service provide a proposal template corresponding to the task type to the representative. The proposal template may be provided via a user interface provided to the representative by the task facilitation service. As noted above, a proposal may include one or more options presented to a member that may be created and/or collected by a representative while researching a given task. In some instances, a representative may access, via a task recommendation system, one or more templates that may be used to generate these one or more proposals. For example, the task recommendation system may maintain proposal templates for different task types, whereby a proposal template for a particular task type may include various data fields associated with the task type. As described herein, in an embodiment the task recommendation system can interface with the task coordination system and/or with other systems of the task facilitation service to provide the proposal template (e.g., the proposal template corresponding to the task type) to the representative.

At step 406, the systems of the task facilitation service may record a proposal generated by the representative for a particular task so that the proposal can be presented to the member for the particular task. For instance, the task coordination system may add the proposal to a task data storage such that member interaction with the proposal may be recorded for further training of the aforementioned machine learning algorithms or artificial intelligence used to generate and maintain member profiles and to define individualized proposal templates for different task types and for different members. Additionally, the task coordination system may store the proposal in the user data storage in association with a member entry in the user data storage, as described above.

At step 408, the systems of the task facilitation service may monitor member interaction with the proposal to identify possible future proposal template revisions. As noted above, when a proposal is presented to a member, the task coordination system may monitor member interaction with the representative and with the proposal to obtain data that may be used to further train a machine learning algorithm or artificial intelligence utilized to define a proposal template for a particular member. For example, if a representative presents a proposal without any ratings/reviews for a particular business based on the recommendation generated by the task coordination system, and the member indicates (e.g., through messages to the representative, through selection of an option in the proposal to view ratings/reviews for the particular business, etc.) that they are interested in ratings/reviews for the particular business, the task coordination system may utilize this feedback to further train the machine learning algorithm or artificial intelligence to increase the likelihood of recommending presentation of ratings/reviews for businesses selected for similar tasks or task types.

Figure 5:
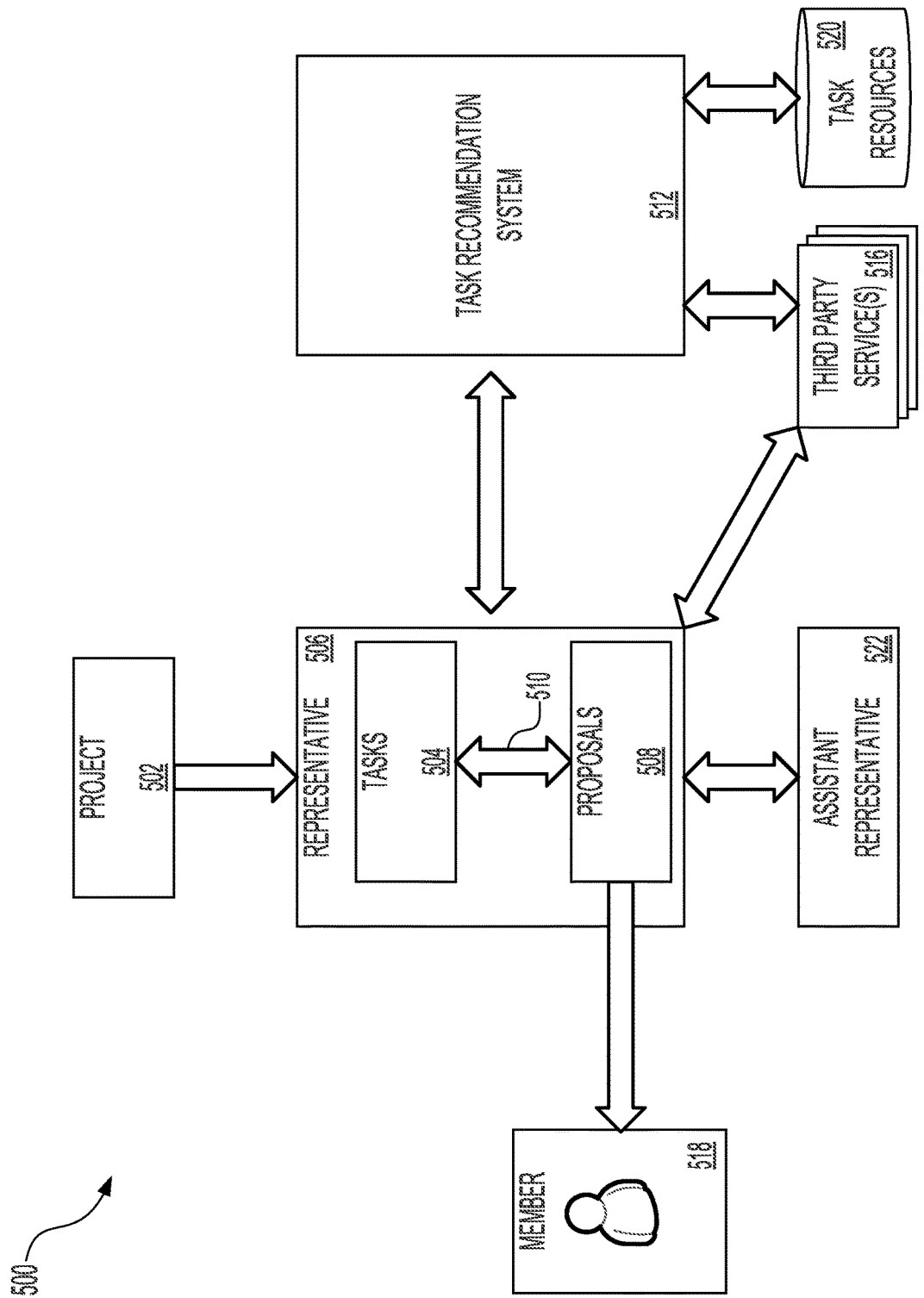
FIG. 5 shows an illustrative example of an environment in which a proposal related to a task is generated in an accordance with at least one embodiment.

FIG. 5 shows an illustrative example of an environment 500 in which a proposal related to an individual task or tasks associated with a project is generated in accordance with at least one embodiment. In the environment 500, a project 502 may be received by a representative 506 that is associated with a task facilitation service. The project 502 may be associated with a member 518. In an embodiment, the project 502 or a project proposal (e.g., a proposal to generate a new project) is directly generated in response to a message from the member 518. For example, the member 518 may transmit a message to the representative 506 stating "I need to start a project for my parents' anniversary weekend" which may cause the representative 506 and/or a system of the task facilitation service to initiate a project to plan the anniversary weekend. The message transmitted by the member 518 may include less information (e.g., "I need to start a project to plan a weekend getaway"). Alternatively, the message transmitted by the member 518 may include more information (e.g., "I need to start a project to plan my parents' anniversary weekend on the weekend of May 20th"). The message transmitted by the member 518 may include very detailed information (e.g., "I need to start a project to plan my parents' anniversary weekend on the weekend of May $20^{th}$ with wine tasting and a surprise activity"). In some instances, the message transmitted by the member 518 may include no information (e.g., "I need to start a project").

In some embodiments, a message can cause the representative 506 and/or the task recommendation system 512 to initiate a project with varying degrees of initial information about the project. In some embodiments, the proposed project (also referred to herein as a "project proposal") is then presented back to the member 518 for verification. For instance, the representative 506 or the task recommendation system 512 may create a project-specific interface through which the member 518 may be presented with the proposed project. This project-specific interface may be presented through the application or web portal provided by the task facilitation service. In some embodiments, the proposed project is not presented to the member if, for example, the representative 506 wishes to reduce the cognitive load of the member 518, the representative 506 has enough information to begin generating tasks and proposals for the project 502, and/or the representative 506 knows that the member 518 does not want to verify the project proposal (e.g., through evaluation of a member profile that includes member preferences and/or observations of previous member behavior).

It should be noted that, in some examples, the member 518 may request or otherwise submit a message to the representative 506 to initiate a singular task. For instance, the member 518 may transmit a message to the representative 506 (such as through an existing chat session or other communications channel provided by the task facilitation service) to request creation and performance of a singular task for the benefit of the member 518. As an illustrative example, if the member 518 transmits the message "I could use help in finding a mechanic to repair my vehicle," the representative 506 may interpret this message as a request to create a singular task related to the scheduling of an appointment with a mechanic to repair the member's vehicle. Thus, as opposed to projects, which may comprise various tasks that need to be completed in order for these projects to be completed, a singular task may be performed independent of any project.

As noted above, the member 518 can also manually provide task-related data via a task template corresponding to a particular task category or type. Through this task template, the member 518 may provide a name for the task or project, a description of the task or project, a timeframe for performance of the task or project, and the like. In some instances, the task template provided to the member 518 may be tailored specifically according to the characteristics of the member 518 identified by the task facilitation service and to the characteristics corresponding to the particular task category or type associated with the selected task template. If the member 518 requests creation and performance of a task or project, the task facilitation service may generate a task- or project-specific interface through which the member 518 may be presented with the proposed task or project, respectively.

In an embodiment, the project proposal can include a recommendation by a system of the task facilitation service about whether to send the project proposal to the member 518 for approval before proceeding with generating tasks and proposals for the project 502 and for each of the tasks associated with the project 502. Such approval, if needed, causes a project proposal to become a project (e.g., the project 502). Such a recommendation may be based on stated or intuited preferences of the member, may be based on a behavioral history of the member (e.g., that the member always wants to review a project proposal or that the member never wants to review a project proposal), may be based on the current cognitive load on the member (e.g., that the member is a tax preparation CPA and it is April $5^{th}$), may be based on the commonality of the project (e.g., that the member plans anniversary weekends for their parents every year), or may be based on a combination of these and other such factors as garnered from the member profile associated with the member 518. In an embodiment, the representative 506 makes the decision about whether to present the project proposal to the member 518 based on, for example, past interactions between the representative 506 and the member 518.

In some embodiments, the recommendation of whether to present the proposed project to the member 518 for verification is based on a degree of predictability associated with the project proposal. For example, if the member 518 asks the representative 506 to start the project, the member 518 can reasonably predict that the representative 506 would move forward with the project and thus additional approval may not be needed. Conversely, if the project proposal is automatically generated by systems of the task facilitation service from the analysis of messages between the member 518 and the representative 506, the member 518 may have very little reason to predict that a proposal corresponding to a project is forthcoming and, thus, recommendation of an approval step may be more likely.

In some embodiments, the representative 506 accepts the recommendation as to whether to seek approval for the project proposal (i.e., the representative 506 decides to follow the recommendation and either proceeds with seeking approval for the proposed project when it is recommended or does not proceed with seeking approval for the proposed project when it is not recommended). In some embodiments, the representative 506 rejects the recommendation as to whether to seek approval for the project proposal (i.e., the representative 506 decides to not follow the recommendation and either proceeds with seeking approval for the proposed project when it is not recommended or does not proceed with seeking approval for the proposed project when it is recommended). Decisions by the representative to either accept or reject the recommendation of the task recommendation system 512 may be used by the task recommendation system 512 to inform future recommendations as to whether to seek approval from members for project proposals. Decisions by the representative 506 to either accept or reject the recommendation may be used to inform future recommendations for the member 518, for the type of project or task, for the entire system, or for a combination of these future recommendations.

In an embodiment, a project proposal is generated from context and/or analysis of other messages between the member 518 and the representative 506. For example, the member 518 may transmit a message to the representative 506 stating "my parents are having their $25^{th}$ anniversary in a few weeks" followed by another message stating "I really should plan something for them" causing the task recommendation system 512 to recommend that a project to plan an anniversary weekend be initiated. The recommendation to initiate the project may then be presented to the representative 506 by the task recommendation system 512 and the representative 506 may then present the proposed project to the member 518 for approval. In some embodiments, the proposed project is not presented back to the member if, for example, the representative 506 wishes to reduce the cognitive load of the member 518, the representative 506 has enough information to begin generating tasks and proposals for the project 502, and/or the representative 506 knows that the member 518 does not want or need to verify the project proposal by the factors such as those described above.

In an embodiment, a project proposal is generated automatically by the task recommendation system 512 from other information associated with the member 518. For example, the task facilitation service may have, within a member profile associated with the member 518, information that indicates the member's parents, their names, ages, and wedding date. Such information may be gathered from the member directly (e.g., through intake questions), may be gathered from previous messages exchanged between the member 518 and the representative 506 as described above, may be gathered from previous projects and/or tasks (e.g., planning the anniversary last year), or may be gathered from other information sources (e.g., public data, ancestry data, or other such information sources). The recommendation to initiate the project may then be presented to the representative 506 by the task recommendation system 512 and the representative 506 may then present the proposed project to the member 518 for approval or may not presented back to the member if, for example, the representative 506 wishes to reduce the cognitive load of the member 518, the representative 506 has enough information to begin generating tasks and proposals for the project 502, and/or the representative 506 knows that the member 518 does not want or need to verify the project proposal by the factors such as those described above.

In an embodiment, the project proposal is generated by the representative 506 based on knowledge about the member 518. For example, the representative may know that the member's parents have an upcoming anniversary based on a completely unrelated conversation and/or a conversation about an unrelated project or task (e.g., "I cannot be home to let the window cleaners in that day because it is my anniversary. Did you know that my Mom and Dad have the same anniversary? We did not plan it that way, it just happened."). Such information about the member may not be stored in the member profile associated with the member 518. Alternatively, such information may be indicated within the member profile within a section corresponding to the representative's personal notes. These personal notes may only be visible to the representative 506 such that, if the member 518 accesses the member profile to add, remove, or otherwise modify any member information within, the representative's personal notes may be omitted from presentation to the member 518. As with the above project proposals, the representative 506 may then determine whether to present the proposed project to the member 518 for approval based on, for example, the cognitive load of the member, the representative having enough information to begin generating tasks and proposals for the project, and/or the representative knowing that the member 518 does not want or need to approve the project proposal by the factors such as those described above.

In some embodiments, the task recommendation system 512 implements machine learning or artificial intelligence techniques to generate recommendations about whether to send the project proposal to the member 518 for approval, the project proposal from context and/or analysis of other messages between the member 518 and the representative 506, the project proposal from other information associated with the member 518, a project template, proposal options, proposal recommendations, and/or aspects of each of these recommendations and/or proposals. Such machine learning or artificial intelligence techniques may be used by the task recommendation system 512 to identify the relevant factors and to generate the proposals and/or recommendations that may be relevant to the member 518. For example, the task recommendation system 512 may implement a clustering algorithm to identify similar recommendations and/or parameters based on one or more relevant parameters (e.g., in an n-dimensional parameter space associated with the member, the proposal, the recommendation, etc.). In some instances, a dataset of characteristics of a plurality of members, recommendations, and/or proposals may be analyzed using a clustering algorithm to identify ways that different types of members that may interact with the task facilitation service in relation to various proposals and tasks to generate recommendations and/or proposals. Example clustering algorithms that may trained using sample member datasets are described herein. Based on the output of the machine learning algorithm, the task recommendation system 512 may generate the project proposals and/or the recommendations for seeking approval described herein. As may be contemplated, the use of such machine learning and/or artificial intelligence techniques and the results thereof may reduce the number of unnecessary interactions between the member 518 and the representative 506 and thus may better tailor the process of generating a project 502 that is tailored to the member's needs.

As may be contemplated, in some embodiments, the project proposal and/or the recommendations as to whether to send the project proposal to the member before proceeding can be generated by a combination of the methods described herein and/or other such methods. For example, the representative 506 may know that an event for the member 518 is coming up, the task recommendation system 512 may send an alert regarding the upcoming anniversary, and the context of previous messages between the member 518 and the representative 506 may indicate that the member 518 likes to plan surprise getaways for their parents. The combination of these elements may then be used to generate a project proposal which may or may not then be presented to the member 518 for approval based on the factors such as those described above.

Once a project 502 is initiated by, for example, one or more of the methods described above, the representative 506 may then begin associating one or more tasks 504 with the project 502. In some embodiments, a project has a defined minimal set of information needed to begin associating one or more tasks 504 with the project 502. Examples of a defined minimal set of information needed to begin associating one or more tasks 504 with the project 502 may include, but may not be limited to, a date, a location, and a budget. As may be contemplated, different projects and/or different tasks may have different defined minimal sets of information needed to begin associating the one or more tasks with the project. For example, the scope and the nature of the information (i.e., the defined minimal set of information) that is needed to begin associating one or more tasks with a project to plan an anniversary weekend is different than the scope and nature of the information that is needed for a project to plan a move to a foreign country and both are different than the scope and nature of the information that is needed for a project to get a car serviced and new tires installed.

In an embodiment, the task recommendation system 512 can determine which additional information is needed to begin associating the one or more tasks 504 with the project 502. Such determination may be based on a template for the project and/or for templates for possible tasks associated with the project, as described herein. Such determination may also be based on previous tasks associated with the member (e.g., the member has had projects for previous anniversary weekends, or the member has had projects for previous weekend getaways, or the member has had projects for previous surprises for their parents) and/or information garnered from the member profile associated with the member 518. Such determination may also be based on similar tasks either associated with the member 518 or with other members (e.g., a birthday weekend project for the member 518 or an anniversary weekend for another member).

In an embodiment, the representative 506 determines which additional information is needed to begin associating the one or more tasks 504 with the project 502. Such determination may again be based on a template for the project and/or for templates for possible tasks associated with the project, as described herein. Such determination may also be based on previous tasks associated with the member 518 (e.g., the member 518 has had projects for previous anniversary weekends, or the member 518 has had projects for previous weekend getaways, or the member 518 has had projects for previous surprises for their parents). Such determination may also be based on similar tasks either associated with the member 518 or with other members (e.g., a birthday weekend project for the member 518 or an anniversary weekend for another member). Such determination may also be based on personal knowledge or experiences that the representative has about the member 518. In an embodiment, the task recommendation system 512 can automatically identify the portions of the member profile that may be used to obtain the additional information needed to begin associating the one or more tasks 504 with the project. For example, if the representative selects a template corresponding to an evening out at a restaurant, the task recommendation system 512 may automatically process the member profile to identify any information corresponding to the member's dietary preferences and restrictions that may be used to populate one or more fields within the template selected by the representative 506.

In an embodiment, the determination of which additional information is needed to begin associating the one or more tasks 504 with the project 502 is made by a combination of these and/or other such techniques. For example, the task recommendation system 512 may determine some of the additional information is needed to begin associating the one or more tasks 504 with the project 502, the representative 506 may determine some of the additional information is needed to begin associating the one or more tasks 504 with the project 502, and other techniques (e.g., external databases, environmental factors, demographics, etc.) may determine some of the additional information is needed to begin associating the one or more tasks 504 with the project 502.

Once it is determined which additional information is needed to begin associating the one or more tasks 504 with the project 502 (e.g., the defined minimal set of information), the additional information can be gathered. In an embodiment, the representative 506 gathers the additional information that may be needed to begin associating one or more tasks 504 with the project 502. For example, the representative 506 may gather additional information as to which weekend the anniversary falls on, what the parents like to do, what the budget is, where the parents live, how far they might want to travel, etc.). In some instances, the representative 506 may obtain this additional information through manual evaluation of the member profile associated with the member 518. In an embodiment, the task recommendation system 512 may automatically identify the portions of the member profile that may be used to associate the one or more tasks 504 with the project 502. The representative 506 may review these automatically identified portions of the member profile to ensure that the association is performed accurately. If the representative 506 makes any changes to the information automatically identified by the task recommendation system 512 (based on the representative's personal knowledge of the member 118, etc.), the task recommendation system 512 may use these changes to automatically update the member profile to incorporate these changes. In some instances, if changes are to be made to the member profile as a result of the changes made by the representative 506, the task recommendation system 512 may prompt the member 518 to verify that the proposed change to the member profile is accurate. If the member 518 indicates that the proposed change is inaccurate, or the member 518 provides an alternative change, the task recommendation system 512 may automatically update the association and the member profile to reflect the accurate information, as indicated by the member 518.

In the example where the member sends a message stating "I need to start a project for my parents' anniversary weekend," the representative 506 may need to determine which weekend that is, what the parents like to do, what the budget is, where the parents live, how far they might want to travel, and/or other such information. In an embodiment, the representative 506 sends messages to the member 518 requesting the additional information. However, as may be contemplated, such requests for additional information may unnecessarily increase the cognitive load on the member and it may be useful to minimize directly requesting the additional information.

In an embodiment, the representative 506 uses the task recommendation system 512 to determine some or all of the missing information for the project. For example, as described above, data associated with the member 518 stored in the member profile may be used to determine one or more elements of missing information (e.g., which weekend the anniversary is, what the parents like to do, what the budget is, where the parents live, how far they might want to travel, and/or other such information). Additionally, other information intuited from the analysis of previous conversations between the member 518 and the representative 506 may be used to determine one or more other elements of missing information and/or may be used to verify determined elements of missing information. Such known and missing information may be referred to herein as "project parameters." Such known and missing information may also be referred to herein as "task parameters" when, for example, the project parameters are directly related to particular tasks 504 associated with the project 502. As may be contemplated, other systems of the task facilitation service such as those described herein may be used to identify and obtain the missing information for the project 502.

In the example where the project initially includes less information (e.g., "I need to start a project to plan a weekend getaway"), the representative 506 may have more missing information for the project 502 and may, in some embodiments, use additional sources including, but not limited to, soliciting information directly from the member 518, reviewing the member profile associated with the member 518, or looking at external data sources. The techniques described above in the previous example (e.g., data associated with the member 518 stored in the member profile and/or information intuited from the analysis of previous conversations between the member 518 and the representative 506) may also be used to reduce or eliminate the amount of information that is solicited directly from the member 518, thereby minimizing the cognitive load on the member 518.

In the example where the project initially includes more information (e.g., "I need to start a project to plan my parents' anniversary weekend on the weekend of May 20th") or where the project 502 is generated by the task recommendation system 512 and/or by the member 518 from a more complete set of information, any missing information associated with the project 502 may also use additional sources including, but not limited to, soliciting information directly from the member 518 and/or reviewing the member profile associated with the member 518. The techniques described above in the previous example (e.g., data associated with the member 518 stored in the member profile and/or information intuited from the analysis of previous conversations between the member 518 and the representative 506) may also be used to reduce or eliminate the amount of information that is solicited directly from the member 518.

In the example where the message transmitted by the member 518 includes little to no information (e.g., "I need to start a project"), the representative 506 may begin with soliciting information directly from the member 518 and then use that solicited information to determine as much of the missing information while minimizing the amount of information subsequently solicited directly from the member 518, thereby at least mitigating the cognitive load on the member 518. In some instances, any information obtained through this solicitation for information from member 518 may be used to supplement the member profile. For instance, if the member 518 indicates that they need to start a project for their parents' anniversary, and provided detailed information regarding their parents, the representative 506 may update the member profile associated with the member 518 to include this detailed information regarding the member's parents (if not present within the member profile).

In an embodiment, the task recommendation system 512 can automatically process member responses to the representative's solicitation of information to populate the member profile. For instance, the task recommendation system 512 can monitor, automatically and in real-time, messages exchanged between the member 518 and the representative 506 to identify any information that may be used to supplement the project 502 and to update the member profile. For instance, the task recommendation system 512 may utilize natural language processing (NLP) or other artificial intelligence to evaluate received messages or other communications from the member 518 to identify any information that may be used to supplement the project 502 and/or the member profile. In some instances, the task recommendation system 512 may utilize historical data corresponding to messages exchanged between members and representatives to train the NLP or other artificial intelligence to identify information that may be used to supplement the project 502 and the member profile.

It should be noted that each of these examples are for projects to plan an anniversary weekend for the member's parents and, accordingly, each has the same defined minimal set of information needed to begin associating the one or more tasks 504 with the project 502. The defined minimal set of information needed to begin associating the one or more tasks 504 with the project 502 is based on the nature and scope of the project 502. However, as each of the examples begins with a different set of provided information, the processes whereby the information is gathered to satisfy the defined minimal set of information needed to begin associating the one or more tasks 504 with the project 502 may be different in the different examples illustrated. It should also be noted that the defined minimal set of information needed to begin associating the one or more tasks 504 with the project 502 may not be all of the information needed to complete associating the one or more tasks 504 with the project 502. For example, a representative 506 may be able to begin associating one or more tasks with a project 502 for an anniversary weekend without knowing, for example, that the member's mother has special dietary requirements (e.g., that she is vegan). A task (or task component) associated with a project 502 to plan an anniversary weekend may be to plan a special anniversary dinner for the parents. Later on in the proposal generation process, that task may be replaced by a task to plan a special anniversary dinner for the parents at a vegan restaurant.

With sufficient information to begin defining the tasks that will be performed by the representative 506 and/or one or more third-party services 516 or other services/entities affiliated with the task facilitation service on behalf of the member 518 to complete the project 502, the representative 506 can begin defining the tasks 504 that are to be performed in order to complete the project 502. In an embodiment, the representative 506 begins defining the tasks and generating one or more proposal options for completion of these tasks. In an embodiment, the proposal options define the tasks 504 that will be performed by the representative 506 and/or one or more third-party services 516 and/or other services/entities affiliated with the task facilitation service on behalf of the member 518 to complete the project 502. In such an embodiment, there may be a "one-to-one" relationship between the proposal options and the tasks 504 (i.e., one proposal option corresponds to one task) or there may be a "one-to-many" relationship between the proposal options and the tasks 504 (i.e., one proposal option corresponds to a plurality of tasks) or there may be a "many-to-one" relationship between the proposal options and the tasks (i.e., a plurality of proposal option corresponds to a single task).

In an embodiment, the proposal options associated with the project 502 receive one or more proposal recommendations, which are recommendations for tasks 504 that will be performed by the representative 506 and/or one or more third-party services 516 and/or other services/entities affiliated with the task facilitation service on behalf of the member 518 to satisfy the proposal option and to complete the project 502. In an embodiment, proposal recommendations are obtained by the representative 506 from the task recommendation system 512. In an embodiment, proposal recommendations are generated by the representative 506 using information from the task recommendation system 512. In an embodiment, proposal recommendations are generated by the representative 506 using information from one or more third-party services 516 and/or other services/entities affiliated with the task facilitation service.

In an embodiment, proposal recommendations are generated by the representative 506 using information from task resources (e.g., user data storage 108 and user data storage 110, both described herein at least in connection with FIG. 1) provided by the task recommendation system 512. In an embodiment, proposal recommendations are generated by the representative 506 using a combination of these and other such information sources. In an embodiment, proposal recommendations are generated by an assistant representative 522 using a combination of these and other such information sources. In such an embodiment, the assistant representative 522 may be a junior representative, or may be another representative, or may be a bot configured to generate proposal recommendations using machine learning or artificial intelligence algorithms such as those described herein.

In some instances, the representative 506 may use a resource library maintained by the task facilitation service to obtain information corresponding to different third-party services 516, other services/entities affiliated with the task facilitation service, and tasks that may be performed for the particular type or category of project 502. For instance, an entry for a third-party service in the resource library may include contact information for the third-party service, any available price sheets for services or goods offered by the third-party service, listings of goods and/or services offered by the third-party service, hours of operation, ratings or scores according to different categories of members, and the like. The representative 506 may query the resource library to identify the one or more third-party services that are to perform the task and determine an estimated cost for performance of the task. In some instances, the representative may contact the one or more third-party services 516 to obtain quotes for completion of the task and to coordinate performance of the task for the benefit of the member 518.

In some instances, the resource library may further include detailed information corresponding to other services and other entities that may be associated or affiliated with the task facilitation service and that are contracted to perform various tasks on behalf of members of the task facilitation service. These other services and other entities may provide their services or goods at rates agreed upon with the task facilitation service. Thus, if the representative 506 selects any of these other services or other entities from the resource library, the representative 506 may be able to determine the particular parameters (e.g., price, availability, time required, etc.) for completion of the task.

In an embodiment, for a given task associated with the project 502, the representative 506 can query the resource library to identify one or more third-party services 516 and other services/entities affiliated with the task facilitation service from which to solicit quotes for completion of the task. For instance, for a newly created task, the representative 506 may transmit a job offer to these one or more third-party services 516 and other services/entities. The job offer may indicate various characteristics of the task that is to be completed (e.g., scope of the task, general geographic location of the member 518 or of where the task is to be completed, desired budget, etc.). Through an application or web portal provided by the task facilitation service, a third-party service or other service/entity may review the job offer and determine whether to submit a quote for completion of the task or to decline the job offer. If a third-party service or other service/entity opts to reject the job offer, the representative 506 may receive a notification indicating that the third-party service or other service/entity has declined the job offer. Alternatively, if a third-party service or other service/entity opts to bid to perform the task (e.g., accepts the job offer), the third-party service or other service/entity may submit a quote for completion of the task. This quote may indicate the estimated cost for completion of the task, the time required for completion of the task, the estimated date in which the third-party service or other service/entity is available to begin performance of the task, and the like. The representative may use any provided quotes from the third-party services and/or other services/entities to generate different proposals for completion of the task.

In an embodiment, once the proposal recommendations are received and/or generated, the representative 506 creates one or more proposals 508 using the proposal recommendations. A proposal may include a proposal recommendation for each of the proposal options. In an embodiment, proposal recommendations and/or proposals are ranked according to a number of criteria described herein. For example, a proposal recommendation may be ranked based on information obtained from a social media site, by the task facilitation service, by the representative 506, or based on cost, demographics, location, or other such criteria, or by a combination of these and/or other criteria. Similarly, in an embodiment, a proposal is ranked and/or marked as preferred. The ranking of a proposal may be based on an aggregation of the rankings of the proposal recommendations or it may be ranked using other ranking criteria such as those described herein. In an embodiment, one or more of the proposals 508 are sent the member 518 with or without the ranking and/or preferred designation. In an embodiment, the one or more of the proposals 508 are communicated to the member 518 and a process for accepting a proposal is initiated.

It should be noted that for the processes described herein, various operations performed by the representative 506 may be additionally, or alternatively, performed using one or more machine learning algorithms or artificial intelligence such as those described herein. For example, as the representative 506 and/or the task recommendation system 512 generate proposals, recommend proposals, coordinate tasks, and/or perform tasks on behalf of a member 518 over time, the task recommendation system 512 may continuously and automatically update the member profile according to feedback related to the generation of proposals, recommendation of proposals, coordination of tasks, and/or performance of tasks (by, for example, the representative 506, the task recommendation system 512, and/or the third-party services 516 or other services/entities affiliated with the task facilitation service).

In an embodiment, the task recommendation system 512, after the member profile associated with the member 518 has been updated over a period of time (e.g., six months, a year, etc.) or over a set of proposals, proposal recommendations, and tasks (e.g., twenty tasks, thirty tasks, etc.), may utilize a machine learning algorithm and/or artificial intelligence techniques to automatically and dynamically generate new proposals, proposal recommendations, and/or tasks based on the various attributes of the member profile (e.g., historical data corresponding to member-representative communications, member feedback corresponding to representative performance and presented tasks/proposals/recommendations, etc.) with or without representative interaction. The task recommendation system 512 may automatically communicate with the member 518 to obtain any additional information required for new projects and tasks and automatically generate proposals that may be presented to the member 518 for performance of these projects and tasks. The representative 506 may also monitor communications between the task recommendation system 512 and the member 518 to ensure that the conversation maintains a positive polarity (e.g., the member 518 is satisfied with its interaction with the task recommendation system 512, other systems of the task facilitation service, the representative 506, the assistant representative 522, other bots associated with the task facilitation services, etc.). If the representative 506 determines that the conversation has a negative polarity (e.g., the member 518 is expressing frustration or dissatisfaction, the task recommendation system 512 is unable to process the member's responses or asks, etc.), the representative 506 may intervene in the conversation. This may allow the representative 506 to address any member concerns and perform any tasks on behalf of the member 518, restoring a positive polarity.

Thus, unlike automated customer service systems and environments, wherein these systems and environment may have little to no knowledge of the users interacting with agents or other automated systems, the task recommendation system 512 can continuously update the member profile to provide up-to-date historical information about the member 518 based on the member's interaction with the system and/or interaction with the representative 506 and based on the proposals generated, the proposals recommended, and the tasks performed on behalf of the member 518 over time. This historical information, which may be automatically and dynamically updated as the member 518 and/or the systems of the task facilitation service interact with the representative 506 and as tasks are devised, proposed, recommended, and performed for the member 518 over time, may be used by the task recommendation system 512 to anticipate, identify, and present appropriate or intelligent responses to member 518 queries, needs, and/or goals.

Figure 6:
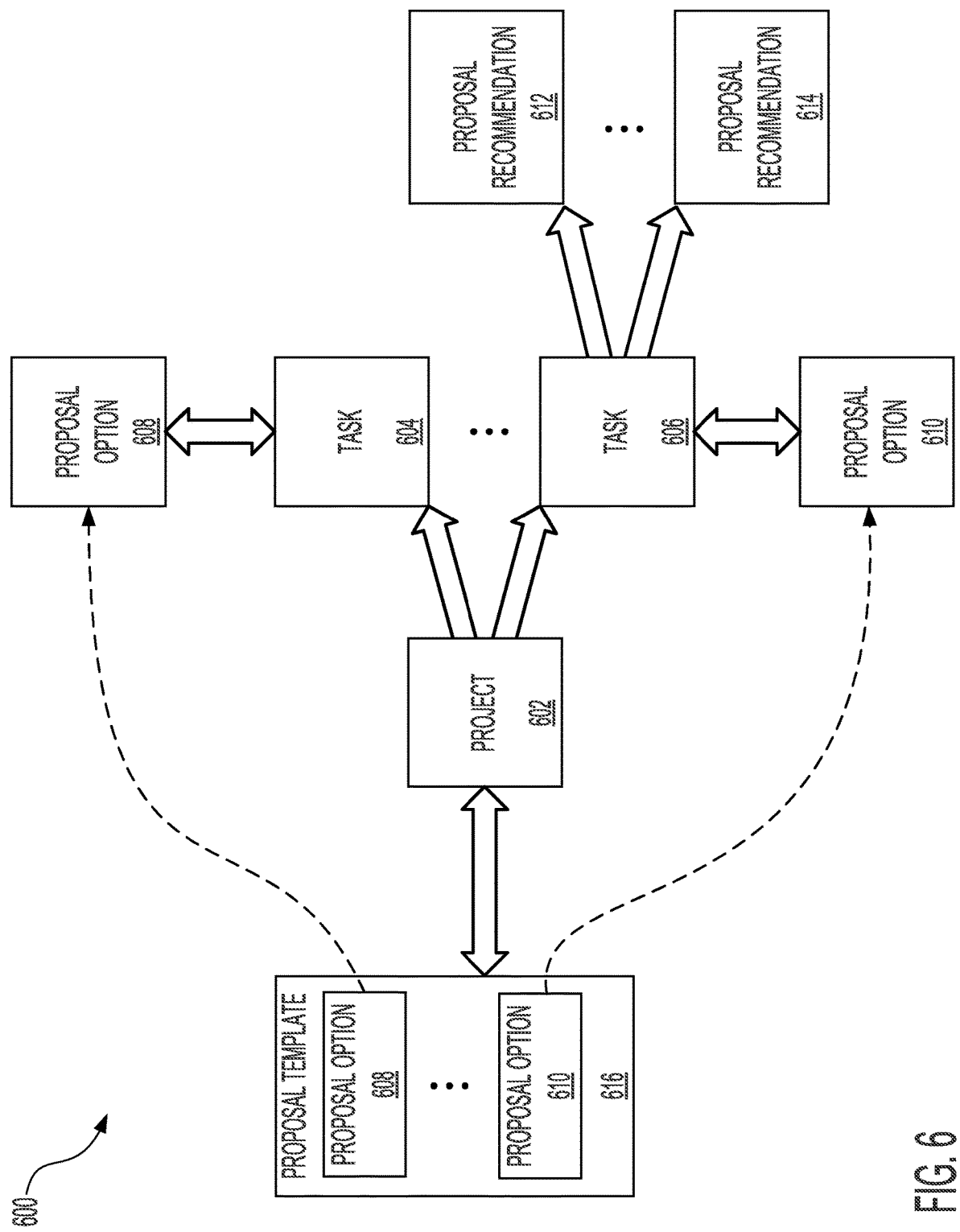
FIG. 6 shows an illustrative example of an environment in which relationships between projects, task components, proposal options, proposal templates, and proposal recommendations are shown in accordance with at least one embodiment.

FIG. 6 shows an illustrative example of an environment 600 in which relationships between projects, tasks, proposal options, proposal templates, and proposal recommendations are shown in accordance with at least one embodiment. In an embodiment, a project 602 (e.g., a project to plan a wedding anniversary weekend for a member's parents) is associated with one or more tasks (also referred to herein as task components) such as task 604 and task 606, which are in turn associated with proposal option 608 and proposal option 610, respectively. In such an embodiment, proposal option 608 and proposal option 610 are elements of proposal template 616, which is generated or selected for project 602.

Although illustrated here with a plurality of tasks, in some embodiments a project 602 can have a single task (e.g., task 604). For example, a project to get a member's car serviced may include only a single task corresponding to having the car serviced by a mechanic. In such embodiments, the project may have the single task, or the project and the single task may be the same (i.e., rather than a "has a" relationship, the project "is a" task and the task "is a" project). In such embodiments, the task may exist independently of a project so that, rather than presenting a proposal associated with a project as described herein, a proposal may be presented for the single task. In such embodiments, the single task may be one of a plurality of tasks that are to be performed for (or on behalf of) a member. Such single tasks may be grouped together in a "to do list" format that may also include one or more tasks that are associated with multi-task.

In an embodiment, a task (e.g., the task 604) is associated with a proposal option 608, which as used herein is an element of the proposal template 616. For example, for a project 602 to plan an anniversary weekend for a member's parents, the proposal template 616 used to define the tasks for the project may include a proposal option for a 2-night stay at a hotel (e.g., proposal option 608), a proposal option for a wine tasting (e.g., proposal option 610), a proposal option for a dinner in a restaurant (not depicted in example environment 600), and a proposal option for a surprise activity (also not depicted in example environment 600). In this example, each proposal option may have an associated task that is an element of the project so that the proposal option for the 2-night stay at the hotel may have an associated task to make a reservation at a hotel, the proposal option for the wine tasting may have an associated task to find an appropriate winery, the proposal option for dinner may have an associated task to find the restaurant and make a reservation, and the proposal option for the surprise activity to determine and schedule the surprise activity.

In an embodiment, a proposal option is associated with a plurality of tasks. For example, the proposal option for dinner may have an associated task to find the restaurant and another associated task to make a reservation at the restaurant. In another embodiment, a task associated with a proposal option has a plurality of sub-tasks. For example, a proposal option for dinner may have an associated task to find the restaurant and make the reservation and that task may have a plurality of sub-tasks (e.g., find the restaurant, make the reservation, make a parking reservation, determine the specials, ensure the restaurant has dishes for specific dietary requirements, etc.).

In an embodiment, a task (e.g., the task 606) has one or more proposal recommendations such as proposal recommendation 612 and proposal recommendation 614. For example, a task 606 (e.g., a task to find a wine tasting for the anniversary weekend for a member's parents) may have one or more proposal recommendations such as proposal recommendation 612 and proposal recommendation 614 to visit two different wineries near where the anniversary weekend will occur. As may be contemplated, for some tasks and in some locations there may be many options for proposal recommendations (e.g., to locate a winery for a wine tasting in Napa Valley) and for other tasks in other locations there may be only one proposal recommendation (e.g., to schedule a surprise activity in a location where the only option is bungee jumping). As may also be contemplated, for some tasks and in some locations there may be no suitable options for proposal recommendations.

Figure 7:
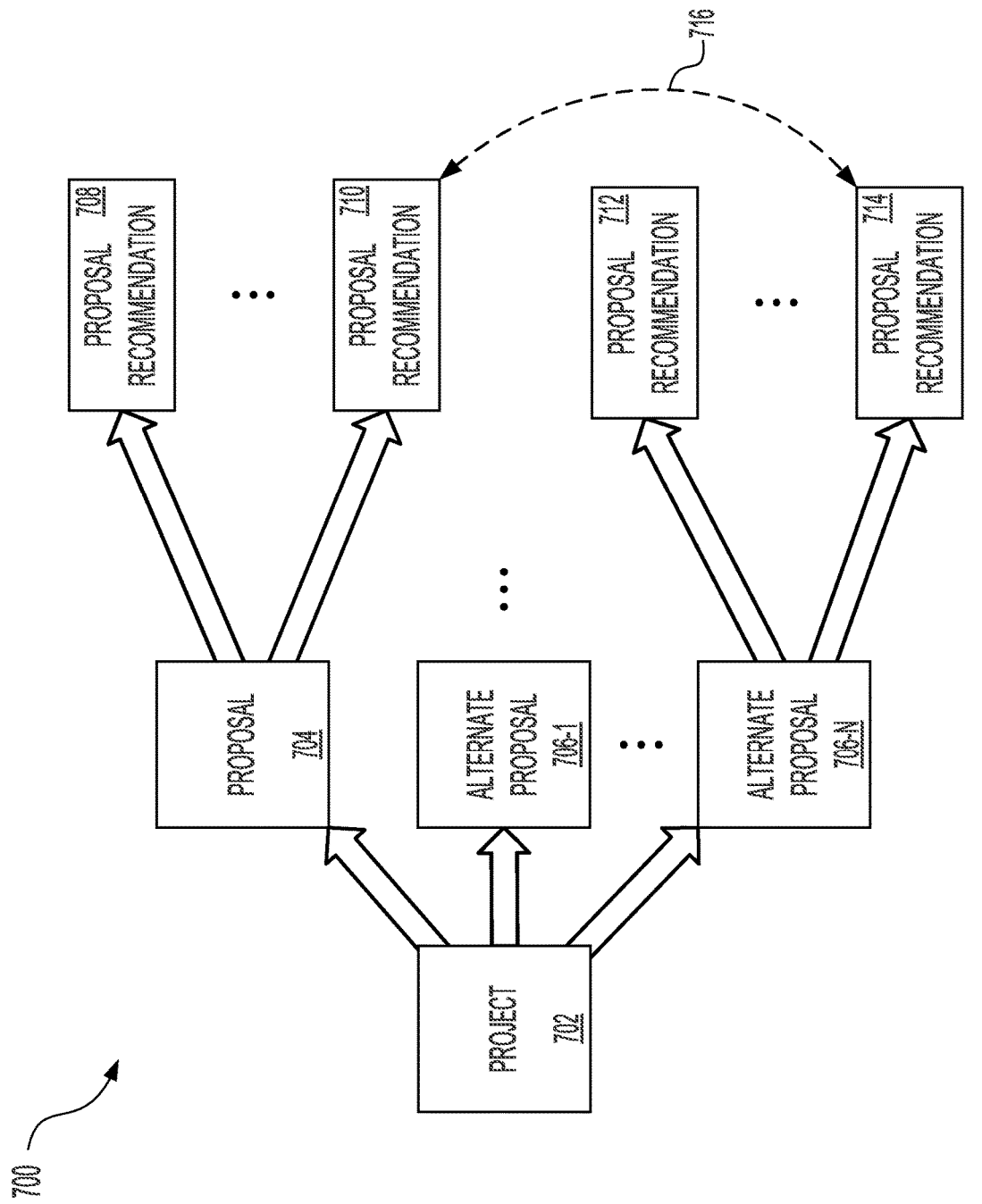
FIG. 7 shows an illustrative example of an environment in which relationships between projects, tasks, proposals, and proposal recommendations are shown in accordance with at least one embodiment.

FIG. 7 shows an illustrative example of an environment 700 in which relationships between projects, tasks, proposals, and proposal recommendations are shown in accordance with at least one embodiment. As illustrated in FIG. 7, for a project 702 (which has a plurality of tasks associated with the project 702 or which may be a single task) a proposal 704 may be generated using the systems and methods described herein. The proposal 704 may include one or more proposal recommendations (e.g., proposal recommendation 708 and proposal recommendation 710) where the proposal recommendations include a proposal recommendation directed to each of the tasks associated with the project 702. Although not illustrated in FIG. 7, each proposal recommendation may correspond to a task of the project 702 and each task is generated from a proposal option associated with a proposal template as described herein.

In an embodiment, one or more alternate proposals 706-1-706-N are generated for the project 702. For example, for a task to find a place for dinner during the anniversary weekend of the member's parents, two different restaurant options may be available as proposal recommendations. In such an example, one proposal (e.g., proposal 704) may include a proposal recommendation for the first restaurant and one proposal (e.g., an alternate proposal of the one or more alternate proposals 706-1-706-N) may include a proposal recommendation for the second restaurant. Thus, each alternate proposal 706-1-706-N may correspond to different options for completion of a particular task or set of tasks associated with the project 702. These different options may serve as possible alternatives to the recommended option presented in the proposal 704 for completion of the particular task or set of tasks associated with the project 702.

Just as the proposal 704 includes one or more proposal recommendations (e.g., proposal recommendation 708 and proposal recommendation 710) where the proposal recommendations include a proposal recommendation directed to each of the tasks of the project, an alternate proposal of the one or more alternate proposals 706-1-706-N includes one or more proposal recommendations (e.g., proposal recommendation 712 and proposal recommendation 714) where the proposal recommendations also include a proposal recommendation directed to each of the tasks associated with the project 702.

In an embodiment, proposal recommendations can be presented to a member as part of more than one proposal. For example, proposal 704 includes proposal recommendation 708 and proposal recommendation 710 and an alternate proposal of the one or more alternate proposals 706-1-706-N includes a proposal recommendation 712 and a proposal recommendation 714. The dotted line 716 is an indicator that proposal recommendation 710 and proposal recommendation 714 are the same proposal recommendation. As an illustrative example, proposal 704 may include a proposal recommendation to attend a wine tasting at "Winery A" (e.g., proposal recommendation 708) and a proposal recommendation to have dinner at "Restaurant Z" (e.g., proposal recommendation 710) and an alternate proposal of the one or more alternate proposals 706 may include a proposal recommendation to attend a wine tasting at "Winery B" (e.g., proposal recommendation 712) but may also include a proposal recommendation to have dinner at "Restaurant Z" (e.g., proposal recommendation 714). In this example, proposal recommendation 710 and proposal recommendation 714 are the same, but in different proposals.

In an embodiment, one or more of the proposal recommendations are designated as a preferred recommendation. A preferred recommendation may be designated as such by the representative during proposal generation based on, for example, the representative's knowledge of the member's preferences. A preferred recommendation may also be designated as such due to one or more positive reviews of, for example, a third-party associated with the preferred recommendation. A preferred recommendation may also be designated as such by systems of the task facilitation service. A preferred recommendation may also be designated as such based on one or more other factors including, but not limited to, location, range of services available, promotional considerations (e.g., sponsored recommendations), demographics, political affiliation, or a combination of these and a plethora of other factors as may be contemplated. In some embodiments, a preferred recommendation is designated as such using a machine learning or artificial intelligence algorithm such as those described herein and based on one or more of the factors described above.

In an embodiment, based on member interaction with the proposal 704 and any alternate proposals 706-1-706-N, as well as with any corresponding proposal recommendations, the machine learning or artificial intelligence algorithm implemented to designate a preferred recommendation may be trained to more accurately designate preferred recommendations for different proposals. For instance, a proposal creation sub-system 302 (as described above in connection with FIG. 3) may monitor or track member interaction with the different proposals presented to the member to determine the member's preferences regarding the information presented in these proposals for a particular task or set of tasks. Further, the proposal creation sub-system 302 may monitor or track any messages exchanged between the member and the representative related to the different proposals and corresponding proposal recommendations to further identify the member's preferences. In some instances, the proposal creation sub-system 302 may solicit feedback from the member with regard to proposals provided by the representative to identify the member's preferences. This feedback and information garnered through member interaction with the representative regarding the different proposals and with the proposals themselves may be used to retrain the machine learning or artificial intelligence algorithm to more accurately designate preferred recommendations for the proposals presented to the member and other similarly-situated members. This feedback and information garnered through member interaction with the representative may be used to update a member profile or model associated with the member for use in determining preferred recommendations.

Figure 8:
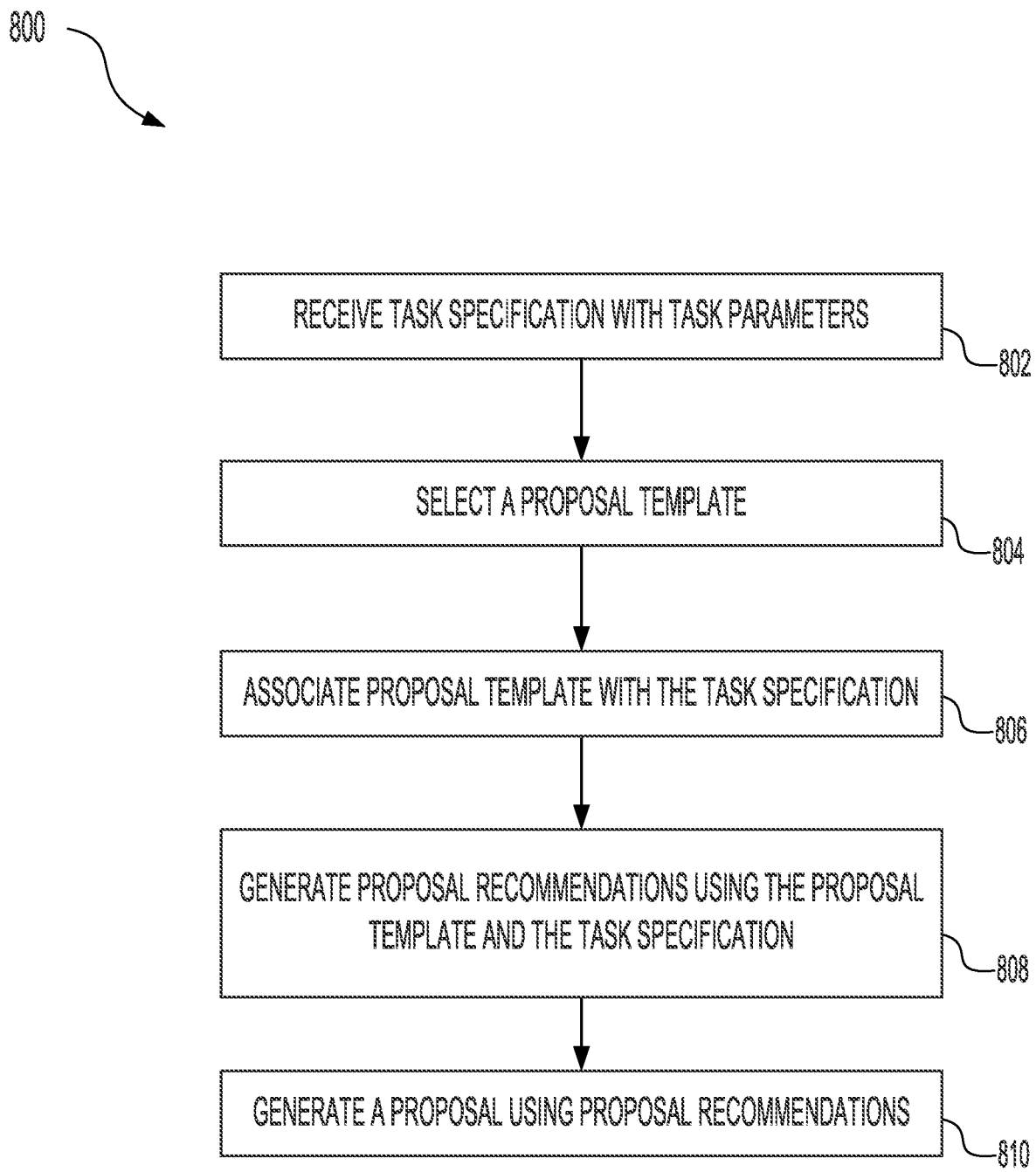
FIG. 8 shows an illustrative example of a process for generating proposal recommendations in accordance with at least one embodiment.

FIG. 8 shows an illustrative example of a process 800 for generating proposal recommendations in accordance with at least one embodiment. One or more components of a task facilitation service, such as the task facilitation service 102 described herein at least in connection with FIG. 1, may perform the example process 800 illustrated in FIG. 8. For example, the process 800 may be performed by a task recommendation system of the task facilitation service (e.g., the task recommendation system 112 of the task facilitation service 102, both described herein at least in connection with FIG. 1).

At step 802, a task recommendation system receives a task specification that includes a task and a set of parameters associated with the task. In an embodiment, the task is one of a plurality of tasks associated with a project. In such an embodiment, the set of parameters may also be associated with the project. The set of parameters may include parameters about the task, may include parameters about a member associated with the task (e.g., maximum allowed budget, demographic information, location information, etc.), or may include other such information associated with the task and/or project. The task specification may correspond to a completed task template used to define the task. As noted above, the completed task template may include one or more automatically populated data fields that are automatically populated based on information stored in the member profile associated with the member. For example, if the selected task template corresponds to an evening out at a restaurant, the member profile associated with the member is automatically processed to identify any information corresponding to the member's dietary preferences and restrictions that may be used to populate one or more fields within the task template. These automatically populated data fields may be updated by either the member or the representative, as described herein.

At step 804, the task recommendation system selects a proposal template that includes one or more proposal options. In an embodiment, the proposal template is an empty template (i.e., it contains no proposal options). In an embodiment, one or more custom fields are added to the proposal template. As an example, a project template may be a project template for a weekend getaway in wine country. A custom field adding a side trip to go surfing can be added to the proposal template, thereby creating a proposal template for doing both things.

In an embodiment, the proposal template is selected using a template algorithm, which may select the proposal template based on the task specification. In such an embodiment, the template algorithm is an algorithm executed by the task recommendation system that uses one or more machine learning algorithms and/or other such artificial intelligence techniques. As described herein, the machine learning and/or artificial intelligence techniques may be used by systems of the task facilitation service (e.g., the task recommendation system) to identify the relevant factors in the task specification and to generate proposal templates that may be relevant to a task and/or a project. For example, the task recommendation system may implement a clustering algorithm to identify similar task parameters based on one or more relevant parameters (e.g., in an n-dimensional parameter space associated with the task specification). In some instances, a dataset of one or more task specifications may be analyzed using a clustering algorithm to identify ways that different interactions with the task facilitation service in relation to various proposals and tasks may be used to generate proposal templates. Example clustering algorithms that may trained using sample specification datasets are described herein. Based on the output of the machine learning algorithm, task recommendation system may generate the proposal templates as described herein. As may be contemplated, the use of such machine learning and/or artificial intelligence techniques and the results thereof may reduce the number of unnecessary interactions between the member and the representative and thus may better tailor the process of generating a proposal template that will result in a proposal that is tailored to the member's needs.

In an embodiment, the task facilitation service maintains different proposal templates corresponding to different task types or categories within a resource library. For example, a particular proposal template corresponding to vehicle maintenance tasks may include various data fields corresponding to vehicles (e.g., make and model of the member's vehicle, the age of the vehicle, information corresponding to the last time the vehicle was maintained, any reported accidents associated with the vehicle, a description of any issues associated with the vehicle, etc.). As another illustrative example, for a task associated with planning a birthday party, a proposal template corresponding to event planning may be used to generate proposals for the task. The proposal template corresponding to event planning may include data fields corresponding to venue options, catering options, entertainment options, and the like.

In an embodiment, rather than using a template algorithm to select a particular proposal template based on the obtained task template, the task recommendation system automatically, and in real-time, queries a resource library to identify a proposal template corresponding to the task type or category associated with the obtained task template. As noted above, the resource library may maintain proposal templates for different task types, whereby a proposal template for a particular task type may include various data fields associated with the task type. As an illustrative example, for a task associated with planning a birthday party, whereby the task may correspond to an event planning task type, the resource library may maintain a proposal template corresponding to event planning tasks and projects. The proposal template corresponding to event planning tasks and projects may include data fields corresponding to venue options, catering options, entertainment options, and the like. Accordingly, the task recommendation system may automatically process the obtained task template to identify a corresponding task type or category and query, in real-time, the resource library to identify a proposal template corresponding to the identified task type or category.

At step 806, the task recommendation system associates the proposal template with the task specification. In an embodiment, the task recommendation associates the proposal template with the task specification by providing information linking the proposal template and the task specification using, for example, one or more services of a task facilitation service (e.g., a task recommendation system such as the task recommendation system 212 and/or a task coordination system 214 described herein at least in connection with FIG. 2). It should be noted that, in some instances, the proposal template may already be associated with the task specification based on the task type or category associated with the task that is to be performed. As noted above, the task specification may be defined through use of a particular task template which, in turn, may be associated with a particular task type of category. Based on this particular task type or category, the task recommendation system may automatically identify a proposal template that corresponds to this task type or category. This association may be maintained within the resource library, as described herein.

At step 808, the task recommendation system generates proposal recommendations for a proposal option of the proposal template, where the proposal recommendations are generated by applying a recommendation algorithm to parameters associated with the task. In an embodiment, the proposal option is one of a plurality of proposal options associated with the proposal template. For example, a proposal template may be associated with a project to set up a wine tasting weekend for the parents of a member of the task facilitation service. The proposal template may include a plurality of proposal options (e.g., a 2-night stay, a wine tasting, dinner, and a special activity). In such an example, one or more proposal recommendations may be generated for each proposal option of the proposal template.

In an embodiment, the proposal recommendations are generated by applying a recommendation algorithm to parameters associated with the task. In such an embodiment, the recommendation algorithm is also an algorithm executed by the task recommendation system that uses one or more machine learning algorithms and/or other such artificial intelligence techniques. As described herein, the machine learning and/or artificial intelligence techniques may be used by the task recommendation system to identify the relevant factors in the task specification and to generate proposal recommendations that may be relevant to a task and/or a project. For example, the task recommendation system may implement a clustering algorithm to identify similar task parameters based on one or more relevant parameters (e.g., in an n-dimensional parameter space associated with the task specification). In some instances, a dataset of one or more task specifications may be analyzed using a clustering algorithm to identify ways that different interactions with the task facilitation service in relation to various projects, proposals, recommendations, and tasks may be used to generate proposal recommendation. Example clustering algorithms that may trained using sample specification datasets as described herein. Based on the output of the machine learning algorithm, task recommendation system may generate the proposal recommendations described herein. As may be contemplated, the use of such machine learning and/or artificial intelligence techniques and the results thereof may reduce the number of unnecessary interactions between the member and the representative and thus may better tailor the process of generating proposal recommendations that will result in a proposal that is tailored to the member's needs.

In an embodiment, the task recommendation system further uses the recommendation algorithm to generate recommendations regarding data fields that may be presented to the member in a proposal. The task recommendation system may use, as input to the recommendation algorithm, the member profile associated with the member, historical data corresponding to the member, and information corresponding to the task for which the proposal is being generated (e.g., the parameters associated with the task). The output of the machine learning algorithm or artificial intelligence may specify which data fields of a proposal template should be toggled on or off. The task recommendation system, in some instances, may preserve, for the representative, the option to toggle on these data fields in order to provide the representative with the ability to present these data fields to the member in a proposal. For example, if the task recommendation system has automatically toggled off a data field corresponding to the estimated cost for completion of a task, but the member has expressed an interest in the possible cost involved, the representative may toggle on the data field corresponding to the estimated cost. Member interaction with the proposal, including interaction with these data fields, may be used to further train the recommendation algorithm, as described herein.

In an embodiment, rather than using a recommendation algorithm to generate these proposal recommendations, the task recommendation system may automatically, and in real-time, process the member profile associated with the member and historical information corresponding to the task type or category to identify one or more proposal recommendations for each of the proposal options that are to be presented to the member. For example, the task recommendation system may process the member profile associated with the member to identify any previous projects and tasks performed for the benefit of the member, as well as any corresponding feedback with regard to the performance of these projects and tasks. For example, if a project for planning of a weekend getaway for the member's parents was previously completed, and the current project corresponds to planning a new weekend getaway for the member's parents, the task recommendation system may automatically determine that these projects share similar characteristics. As such, the task recommendation system may automatically, and in real-time, identify any previously selected proposal recommendations associated with the previously completed project and use these previously selected proposal recommendations to construct new proposal recommendations for the new proposal options.

In addition to processing the member profile to identify any previous projects and tasks performed for the benefit of the member, the task recommendation system may automatically, and in real-time, query the resource library to identify any previously generated proposal recommendations for similar projects and corresponding proposals. For example, the task recommendation system may query the resource library using the task type or category associated with the project or task template received by the task recommendation system. In response to this query, the resource library may return a listing of previously completed projects and tasks corresponding to the submitted task type or category. As this listing may be voluminous in nature and impractical to be performed through the human mind in real-time, the task recommendation system may utilize one or more executable processes (e.g., application programming interfaces (APIs), classical algorithms, etc.) to simultaneously process this listing of previously completed projects and tasks to identify any proposal options and corresponding proposal recommendations that may be similar to the proposal options selected for the new proposal. From the corresponding proposal recommendations, the task recommendation system may review any feedback associated with these proposal recommendations (e.g., member selections from any presented proposal recommendations, member communications with a corresponding representative regarding the presented proposal recommendations, member feedback regarding a selected proposal recommendation after completion of the associated project/task, etc.) to identify one or more proposal recommendations that may be used to generate new proposal recommendations for the proposal options to be included in the proposal. The task recommendation system may use these identified one or more proposal recommendations to generate new proposal recommendations for the one or more proposal options. As the resource library may be continuously updated in real-time as projects and tasks are being performed and as proposals are generated for these projects and tasks, the task recommendation system may be able to process up-to-date historical data from the resource library to identify the one or more proposal recommendations that may be used to generate new proposal recommendations for the proposal options to be included in the proposal.

At step 810, the task recommendation system generates a proposal that includes one or more proposal recommendations. In an embodiment, the proposal is one of a plurality of proposals. For example, a first proposal for the wine tasting weekend may include a first hotel recommendation, a winery recommendation, a dinner recommendation, and a surprise activity recommendation and a second proposal for the wine tasting weekend may include a second hotel recommendation, the same winery recommendation, the same dinner recommendation, and the same surprise activity recommendation. Additional proposals may include different surprise activity recommendations or may include no surprise activity recommendations.

If the task recommendation system utilized a template algorithm and a recommendation algorithm to generate the proposal, the task recommendation system may update the template algorithm and the recommendation algorithm using the task specification, the selected proposal option, and the proposal using training techniques such as those described herein. For example, the task recommendation system may update the template algorithm by training the template algorithm using a dataset of one or more task specifications and using a clustering algorithm to identify ways that different interactions with the task facilitation service in relation to various proposals and tasks may be used to generate proposal templates. Such interactions may include responses by the member to a proposal that was based on the proposal template, rankings of the proposal recommendations that were generated in response to the proposal template, or other such interactions. Similarly, the task recommendation system may update the recommendation algorithm by training the recommendation algorithm using a dataset of one or more task specifications and using a clustering algorithm to identify ways that different interactions with the task facilitation service in relation to various proposals and tasks may be used to generate proposal recommendations. Such interactions may include responses by the member to a proposal that was generated using the proposal recommendations, rankings of the proposal recommendations, or other such interactions.

Figure 9:
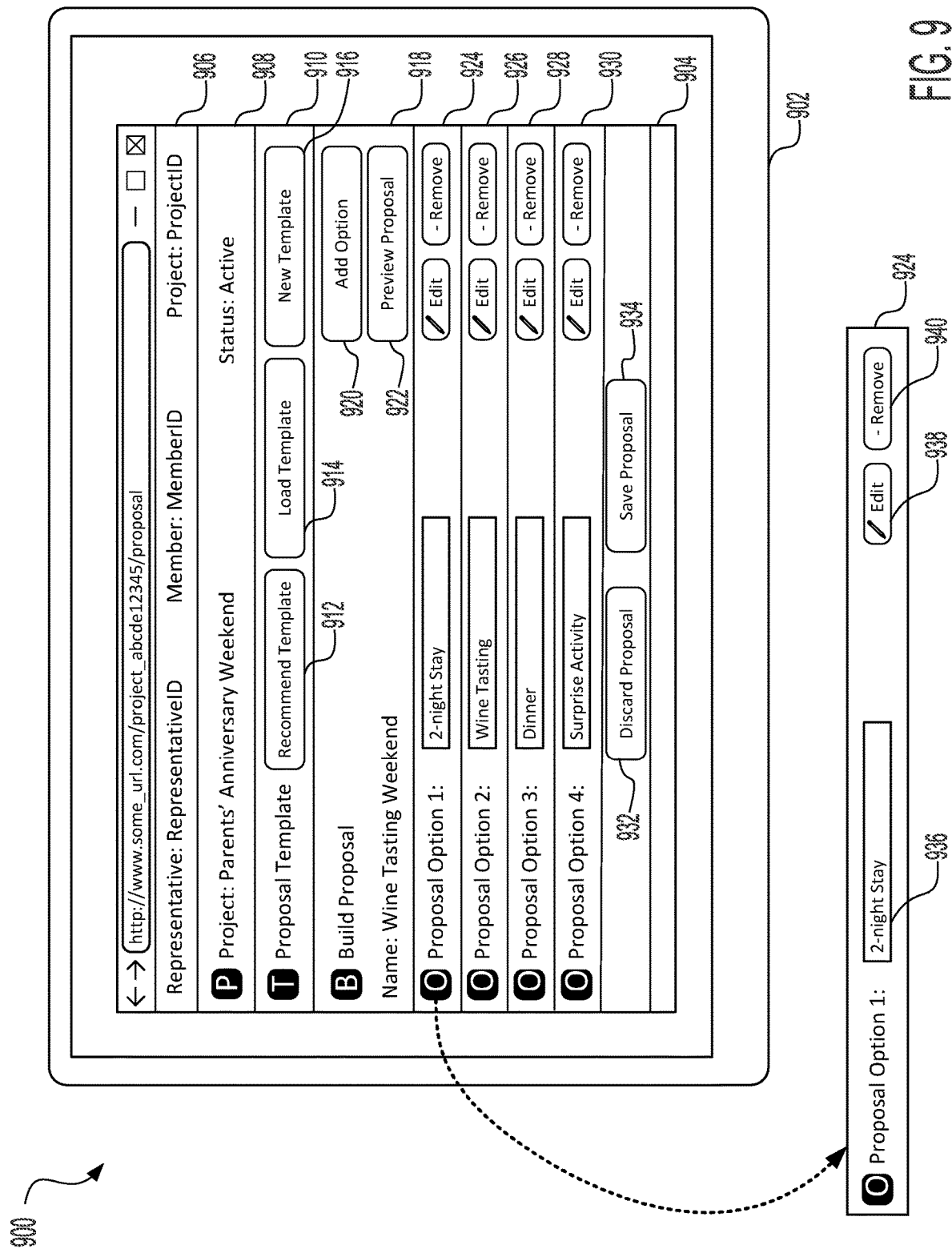
FIG. 9 shows an illustrative example of an environment in which in which a proposal is generated in accordance with at least one embodiment.

FIG. 9 shows an illustrative example of an environment 900 in which a proposal is generated in accordance with at least one embodiment. In an embodiment, a computing device 902 is used to display an application 904. The application 904, as illustrated in FIG. 9, may be accessed via a web portal provided by the task facilitation service. However, in some instances, the application 904 may be provided via a standalone application provided by the task facilitation service and executed on the computing device 902.

In an embodiment, a representative (e.g., the representative 106 described herein at least in connection with FIG. 1) interacts with the task facilitation service via the computing device 902. In an embodiment, the application 904 displays user interface elements including, but not limited to, icons, text, buttons, dropdown lists, radio buttons, check boxes, and visual canvases to convey information obtained from systems of the task facilitation service, a member, a third-party (e.g., one of the third-party services or other services/entities affiliated with the task facilitation service), and/or obtained from other sources. In an embodiment, the application 904 uses the aforementioned user interface elements to obtain information from the representative and to provide the obtained information to systems of the task facilitation service, to the member, to a third-party, and/or to other information subscribers.

Figure 12:
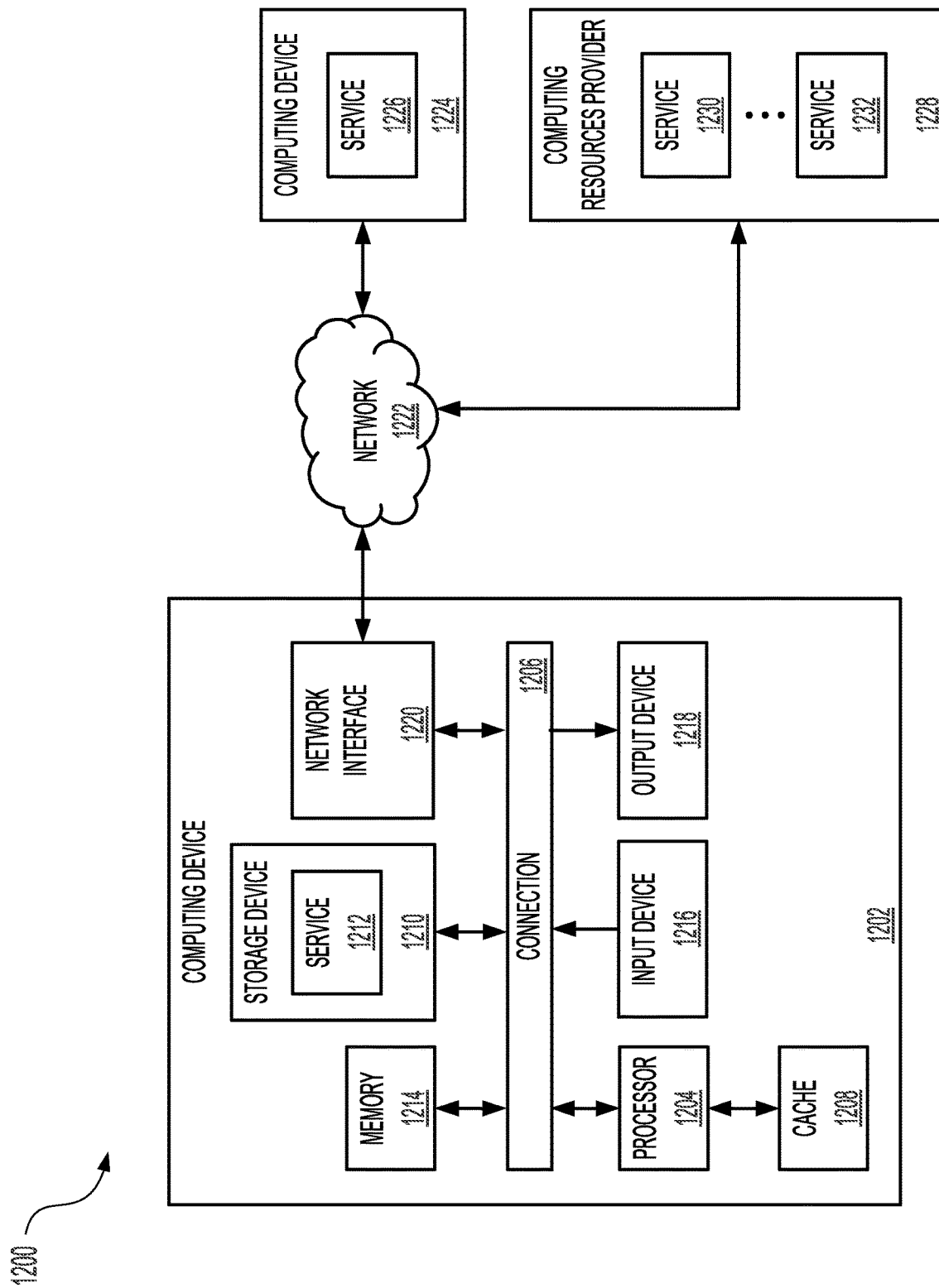
FIG. 12 shows a computing system architecture, including various components in electrical communication with each other, in accordance with various embodiments.

In an embodiment, the application 904 receives the obtained information via a network interface (e.g., the network interface 1220 described herein at least in connection with FIG. 12) that is associated with the computing device 902 (e.g., the computing device 1202, the computing device 1224, or a computing device associated with the computing resources provider 1228, all described herein at least in connection with FIG. 12). In an embodiment, the application 904 provides the information obtained from the representative via the network interface that is associated with the computing device 902.

In an embodiment, user interface elements of the application 904 are used to display an information bar 906 that contains information including, but not limited to, an identifier of the representative, an identifier of the member, and an identifier of a current project or individual task. As illustrated in FIG. 9, the current project includes a plurality of tasks. However, in certain instances a project may include a single task. Thus, the identifier of the current project may be an identifier of a particular project, may be an identifier of an individual task, or may be an identifier of an aggregate project that includes tasks from multiple sources (e.g., a "to do list" aggregate project as described herein). In some instances, the current project may include no tasks (i.e., is an empty project).

In an embodiment, user interface elements of the application 904 are used to display a title bar 908 that contains information including, but not limited to, a name of the current project and the status of the current project. In an embodiment, the name of the current project is a short descriptive title associated with the project (e.g., "Parents' Anniversary Weekend"). In some instances, the name of the current project may be a default name assigned by the task facilitation service. In such instances, the current project may also include a short description of the project that may also be displayed in the title bar 908. In an embodiment, the status of the current project is selected from a list of possible statuses that may be stored by the systems of the task facilitation service. For example, the project status of the current project may be "open," "closed," "active," "inactive," "on track," "behind," or a combination of these and/or other such statuses. In an embodiment, the project status is selected from a predefined list. In an embodiment, the project status is a free-form field that can, for example, be entered by the representative using user interface elements of the application 904.

In an embodiment, user interface elements of the application 904 are used to display a proposal template bar 910 that further contains user interface elements that the representative can use to associate project and/or task templates with the current project. In the embodiment illustrated in FIG. 9, the proposal template bar 910 includes a recommend template button 912, a load template button 914, and a new template button 916.

In an embodiment, the recommend template button 912 is used by the representative to obtain an automatically generated template for the current project where the automatically generated template includes one or more proposal options that can be used to define tasks for the current project using systems and methods such as those described herein (e.g., using a machine learning or artificial intelligence algorithm that analyzes data from other project templates, projects, tasks, and/or other such sources to provide the automatically generated template). In another embodiment, systems of the task facilitation service automatically generate a template without receiving a deliberate request to do so from the representative (e.g., using the recommend template button 912). In such an embodiment, the automatically generated template may be automatically generated when the project is created, or may be automatically generated when the minimal set of information is obtained by the representative as described above, or may be automatically generated at some other point in the project generation process. In such an embodiment, the automatically generated template may also be generated using a machine learning or artificial intelligence algorithm that analyzes data from other project templates, projects, tasks, and/or other such sources to provide the automatically generated template.

In some instances, selection of the recommend template button 912 may cause the systems of the task facilitation service to query the resource library to identify a proposal template that may correspond to the particular project or individual task and that may be recommended to the representative. As noted above, the task facilitation service maintains different proposal templates corresponding to different task types or categories within a resource library. Accordingly, based on any project and/or task-related information provided by the representative through the application 904 regarding the particular project or individual task for which a proposal is being generated, the systems of the task facilitation service may automatically identify, from the resource library, a proposal template associated with a task category or type corresponding to the project or task identified by the representative through the application 904.

In an embodiment, the load template button 914 is used by the representative to load a template for the current project or individual task. The loaded template may, in some embodiments, be loaded from systems of the task facilitation service. As with the automatically generated template above, the loaded template may include one or more proposal options that can be used to define tasks for the current project using systems and methods such as those described herein. In an embodiment, the representative can load a specific template based on the project. For example, the representative may have a previously saved template for planning a weekend getaway from a previous project. In another example, the representative may load the template from a set of templates associated with the representative. For instance, if the representative selects the load template button 914, the systems of the task facilitation service may query the resource library to identify any proposal templates associated with the representative. These may include any incomplete or previously completed proposal templates that the representative has prepared for the member or other members associated with the representative. Further, these proposal templates may include any proposal templates that the representative has opted to save for future use and/or that have been customized by the representative based on the representative's own preferences (e.g., custom data fields, etc.).

In another example, the representative may load the template from a set of templates associated with the member. For instance, if the representative selects the load template button 914, the systems of the task facilitation service may query the resource library to identify any proposal templates that are associated with the member. These proposal templates may include those templates previously used to generate proposals for projects and/or individual tasks performed for the benefit of the member. Information corresponding to these previously used proposal templates may be stored in the member profile associated with the member. Thus, in response to selection of the load template button 914, the systems of the task facilitation service may automatically process the member profile to identify any other previously performed or active projects and tasks for which proposals have been generated. Based on these identified projects and tasks, the systems of the task facilitation service may determine which proposal templates were used to generate proposals for these projects and tasks. Subsequently, the systems of the task facilitation service may use the result of this determination to query the resource library in order to obtain these proposal templates for the representative.

In some instances, if the representative selects the load template button 914, the systems of the task facilitation service may update the application 904 to present a graphical representation of the resource library. Through this graphical representation of the resource library, the representative may be presented with various proposal templates that may be available to the representative for generating a proposal. Additionally, through this graphical representation of the resource library, the representative may submit a query to identify one or more proposal templates that may be relevant to the submitted query. For example, if the representative submits a query with the string "vehicle maintenance," the systems of the task facilitation service may update the interface to provide any proposal templates that may be associated with the terms "vehicle," "maintenance," and/or "vehicle maintenance." From these proposal templates, the representative may select an appropriate proposal template for generating a proposal associated with the particular project or individual task.

In an embodiment, the new template button 916 is used by the representative to create a new template for the current project. In an embodiment, the new template is a blank template that does not initially include any proposal options. In an embodiment, the new template is a template shell which may include a partial set of proposal options. In an embodiment, the new template is based on an existing template. In such an embodiment, the new template button 916 may cause the application 904 to display an additional user interface element (not illustrated herein) usable to, for example, create a new blank template, a new template from a designated template shell, a new template based on one or more previous projects, a new template based on other templates of the task facilitation service, or a new template based on other such sources.

In an embodiment, user interface elements of the application 904 are used to display a build proposal bar 918 that further contains user interface elements that the representative can use to add additional elements to a proposal and/or to display the proposal that is associated with the current project or individual task. In the embodiment illustrated in FIG. 9, the build proposal bar 918 includes an add option button 920 and a preview proposal button 922. In the embodiment illustrated in FIG. 9, the build proposal bar 918 also includes a name of the proposal. In an embodiment, the name of the proposal is a short descriptive title of the proposal (e.g., "Wine Tasting Weekend"). In an embodiment, the name of the proposal has a default name assigned by systems of the task facilitation service. In such an embodiment, a short description of the proposal may also be displayed in the build proposal bar 918.

In an embodiment, the add option button 920 is used by the representative to add a new proposal option to a proposal that is being generated for the current project. As previously discussed herein, proposal options for a proposal may come from a proposal template. For example, a proposal template for a wine tasting weekend may have proposal options for a two-night stay, a wine tasting, a dinner, and a surprise activity. In an embodiment, proposal options from a proposal template are more general so that, for example, a proposal template for a wine-tasting weekend may include a hotel stay (e.g., with unspecified length), a wine-tasting, a special meal, and a more-generally specified activity. In such an embodiment, the representative may then refine the proposal options to, for example, the two-night stay, the dinner, and the surprise activity. In an embodiment, proposal options from a proposal template can be even more general including, for example, only a "lodging" proposal option and one or more "activities" options. In such an embodiment, the representative may then refine the proposal options as described above. In an embodiment, the proposal template is empty and, thus, contains no proposal options. In such an embodiment, the representative may then refine the proposal options as described above.

One way that a representative may refine the proposal options of a proposal is by using the add option button 920. For example, for a proposal template with only a "lodging" proposal option and one or more "activities" options, the representative may use the add option button 920 to add a wine-tasting proposal option and a dinner proposal option. In an embodiment, a proposal option can be added from the resource library, which may maintain various proposal options, using the add option button 920. In an embodiment, a proposal option can be added from one or more proposal templates maintained in the resource library using the add option button 920. For example, a proposal option from a proposal template corresponding to a "surfing trip" may be added to a wine tasting proposal in order to provide a possible surfing excursion to the wine tasting weekend. In an embodiment, a proposal option can be added from other projects or tasks maintained in the resource library using the add option button 920. Such other projects may be projects associated with the member, projects associated with other members that may be assigned to the representative, projects associated with other members of the task facilitation service, or projects from some other source. In an embodiment, custom options can be added to a proposal using the add option button 920 so that, for example, a proposal option to go surfing may be added to a wine tasting weekend proposal directly. In an embodiment, proposal options may be recommended and/or added automatically using a machine learning algorithm that, for example, analyzes project and template data from previous projects and templates to generate proposal options suitably tailored to a particular project or project template.

In an embodiment, the user interface elements of the application 904 are used to display one or more proposal option bars (e.g., the proposal option bar 924, the proposal option bar 926, the proposal option bar 928, and the proposal option bar 930) that further contain user interface elements that the representative can use to add additional elements or to edit proposal options for the proposal that is associated with the current project. In the embodiment illustrated in FIG. 9, a proposal bar (e.g., the proposal option bar 924, illustrated in greater detail in the lower part of FIG. 9) a proposal option text field 936, an edit proposal option button 938, and a remove proposal option button 940. In an embodiment, the proposal option text field 936 contains the name of the proposal option (e.g., "2-night stay"). In some instances, the proposal option text field 936 may include a short description of the proposal option (e.g., "2-night stay at a hotel in the wine region"). Alternatively, the name of the proposal option may have a default name assigned by systems of the task facilitation service. In addition to this default name, a short description of the proposal may also be displayed in the proposal option bar 924.

In addition to using the add option button 920 to refine the proposal options of a proposal, the representative may also refine the proposal options of a proposal using the edit proposal option button 938 and the remove proposal option button 940. In an embodiment, the edit proposal option button 938 is used by the representative to edit a corresponding proposal option. Such edits may include adding more specific details to the proposal option. For example, the general proposal template for a wine-tasting that includes a hotel stay with unspecified length described above may be edited using the edit proposal option button 938 so that the representative may then refine the proposal options to a two-night stay. Such edits may also include providing custom proposal options to a proposal so that, for example, the representative may use the add option button 920 to add a blank custom proposal option to the proposal and, using the edit proposal option button 938, refine the blank custom proposal option to incorporate a surfing expedition during the wine tasting weekend. In an embodiment, the remove proposal option button 940 is also used to refine a proposal by providing a way for the representative to remove extraneous proposal options. For example, the member's parents may live near the winery and so the proposal option for a 2-night stay may not be necessary in that case.

It should be noted that proposal options may be associated with one or more tasks associated with a proposal. For example, a proposal option may be to provide a 2-night stay for the wine tasting weekend. Such a proposal option may be associated with a task to "find and book a 2-night stay in some sort of lodgings near wineries." Such a task may be divided into further sub-tasks (e.g., determine location of the wineries, locate lodging near that location, book the hotel, verify registration, etc.). As may be contemplated, such tasks or sub-tasks may have dependencies between them. For example, the aforementioned task to "find and book a 2-night stay in some sort of lodgings near wineries" may be dependent on which wineries. Such dependencies and interdependencies may be explicitly denoted and/or may be implicit.

In an embodiment, the user interface elements of the application 904 are used to provide other options for the representative to interact with proposals associated with a current project. In the embodiment illustrated in FIG. 9, user interface elements of the application 904 include a preview proposal button 922, a discard proposal button 932, and a save proposal button 934. In an embodiment, the preview proposal button 922 is used by the representative to generate a view of the proposal associated with the current project. Such a view of the proposal may include the elements of the proposal (e.g., the proposal options) that have proposal recommendations and may also include elements of the proposal that do not have proposal recommendations. In an embodiment, the discard proposal button 932 is used by the representative to delete the proposal. Further, the discard proposal button 932 may cause the proposal to be deleted permanently or to be marked (e.g., as inactive) but not deleted.

In an embodiment, the save proposal button 934 is used by the representative to save the proposal so that, for example, the proposal can be further refined later. For instance, if the representative selects the save proposal button 934, the systems of the task facilitation service may store the proposal within the resource library and in association with the representative and/or the particular project or individual task for which the proposal is being generated. In some examples, the representative may be prompted to assign a unique identifier to the proposal such that, at a later time, the representative may use the application 904 to readily identify this proposal from any other proposals being generated by the representative or previously created for other projects and/or individual tasks.

It should be noted that user interface elements of the application 904 may include additional functionality not illustrated in FIG. 9. For example, a representative may create a proposal with several proposal options. The representative may then decide to save the proposal as a template. Accordingly, the proposal template bar 910 may be configured to include, for example, a "save as template" button that allows the representative to save the current proposal for a particular project or individual task as a template for future projects or individual tasks. In such an embodiment, the save as template button may cause some or all of the recommendations to be removed from the proposal so that the proposal can be saved as a proposal template with the proposal options. In an embodiment, the task facilitation service determines whether to save a proposal as a template based on, for example, common elements, high rankings of recommendations (described below), or other such factors. In an embodiment, a highly ranked proposal can be used as the basis for at least part of a curated experience as described above. In another embodiment, the application 904 includes, for example, a "save proposal as" button that allows the representative to save a copy of the current proposal under a different designation so that, for example, a closely related project, the current proposal may be used as the basis for a new proposal for the closely related project. In an embodiment, one or more proposal options can be saved as a portion of a proposal template. In such an embodiment, a portion of one proposal template can be combined with a portion of a different proposal template to create a new proposal template. For example, parts of the wine tasting weekend project may be combined with parts of a hot air ballooning weekend to create a proposal template that includes both activities.

It should be noted that while the example environment 900 illustrated in FIG. 9 shows a single proposal associated with a current project, a plurality of proposals may be associated with a project. In such an embodiment, some of the user interface elements of the application 904 may apply to all of the proposals that are associated with the current project (e.g., the information bar 906, the title bar 908, the proposal template bar 910, the recommend template button 912, the load template button 914, and/or the new template button 916). In an embodiment, the proposal template bar 910, the recommend template button 912, the load template button 914, and the new template button 916 apply to all of the proposals that are associated with the current project. In an embodiment, each of the proposals that are associated with the current project has an associated proposal template bar 910, recommend template button 912, load template button 914, and new template button 916 so that, for example, different templates may be used for different proposals of a single project.

It should also be noted that the user interface elements of the application 904 illustrated in FIG. 9 are illustrative examples and, as may be contemplated, different user interface elements, designs thereof, and/or arrangements thereof may be considered as within the scope of the present application. For example, the icon displayed in the title bar 908 is merely an illustrative example.

Figure 10:
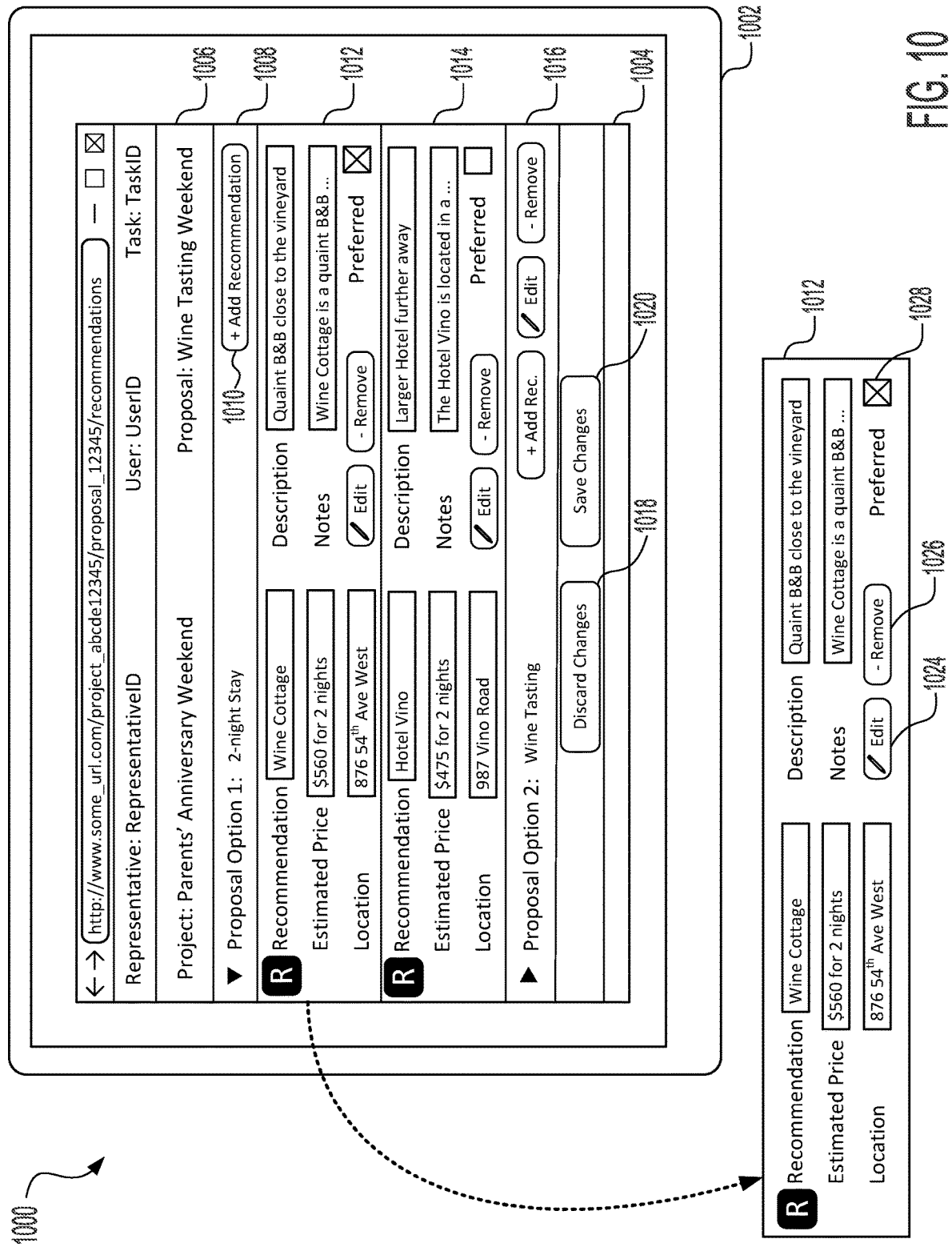
FIG. 10 shows an illustrative example of an environment in which proposal recommendations are edited in an accordance with at least one embodiment.

FIG. 10 shows an illustrative example of an environment 1000 in which proposal recommendations are edited in an accordance with at least one embodiment. In an embodiment, a computing device 1002 is used to display an application 1004. The application 1004, as illustrated in FIG. 10, may be accessed via a web portal provided by the task facilitation service. However, in some instances, the application 1004 may be provided via a standalone application provided by the task facilitation service and executed on the computing device 1002.

In an embodiment, a representative (e.g., the representative 106 described herein at least in connection with FIG. 1) interacts with systems of the task facilitation service via the computing device 1002. In an embodiment, the application 1004 displays user interface elements including, but not limited to, icons, text, buttons, dropdown lists, radio buttons, check boxes, and visual canvases to convey information obtained from systems of the task facilitation service, obtained from a member, obtained from a third-party service or other service/entity affiliated with the task facilitation service, and/or obtained from other sources. In an embodiment, the application 1004 uses these user interface elements to obtain information from the representative and to provide the obtained information to systems of the task facilitation service, to the member, to a third-party, and/or to other information subscribers.

In an embodiment, the application 1004 receives the obtained information via a network interface (e.g., the network interface 1220 described herein at least in connection with FIG. 12) that is associated with the computing device 1002 (e.g., the computing device 1202, the computing device 1224, or a computing device associated with the computing resources provider 1228, all described herein at least in connection with FIG. 12). In an embodiment, the application 1004 provides the information obtained from the representative via the network interface that is associated with the computing device 1002.

In an embodiment, user interface elements of the application 1004 are used to display an information bar 1006 that contains information including, but not limited to, an identifier of the representative, an identifier of the member, and an identifier of a current project or individual task for which the proposal is being prepared. In an embodiment, the current project includes a plurality of tasks. However, in certain instances a project may include a single task. Thus, the identifier of the current project may be an identifier of a particular project, may be an identifier of an individual task, or may be an identifier of an aggregate project that includes tasks from multiple sources (e.g., a "to do list" aggregate project as described herein). In some instances, the current project may include no tasks (i.e., is an empty project).

In an embodiment, user interface elements of the application 1004 are used to display one or more proposal option dropdown bars (e.g., the proposal option dropdown bar 1008 and the proposal option dropdown bar 1016) that contain a name of a corresponding proposal option (e.g., "2-night Stay," "Wine Tasting") and one or more additional user interface elements that the representative can use to associate proposal recommendations with the proposal option. As an example, the proposal option dropdown bar 1008 includes an add recommendation button 1010, a recommendation canvas 1012, and a recommendation canvas 1014. Each of the recommendation canvases (e.g., the recommendation canvas 1012 and the recommendation canvas 1014) may include additional user interface elements, as described below.

In an embodiment, an add recommendation button 1010 is used by the representative to add a recommendation to perform tasks that may be performed by the representative and/or one or more third-parties on behalf of the member to satisfy the corresponding proposal option (e.g., "2-night Stay") associated with the current project. In an embodiment, the add recommendation button 1010 is used to automatically generate a recommendation for the proposal option based on, for example, an analysis of the member profile associated with the member (e.g., the member's preferences, the member's budgetary constraints, the member's restrictions, etc.), past proposal options from members, or other such data (e.g., demographics, location, time of year, predicted weather, etc.). In an embodiment, the automatically generated recommendation is generated using a machine learning or artificial intelligence algorithm that analyzes data from, for example, the member profile associated with the member, past proposal options from members and other historical data corresponding to similar proposals and/or similarly-situated members, or other such data (e.g., demographics, location, time of year, predicted weather, etc.). In some instances, systems of the task facilitation service may automatically generate a recommendation without receiving a deliberate request to do so from the representative (e.g., using the add recommendation button 1010). For example, the automatically generated recommendation may be automatically generated when the project option is loaded. Alternatively, the recommendation may be automatically generated when the project option is created or when the minimal set of information is obtained by the representative as described above. In some examples, a recommendation may be automatically generated at some other point in the project option and/or the project recommended processes. The automatically generated recommendation may also be generated using a machine learning or artificial intelligence algorithm that analyzes data from, for example, the member profile, past proposal options from similarly-situated members, or other such data (e.g., demographics, location, time of year, predicted weather, etc.).

In an embodiment, the add recommendation button 1010 is used by the representative to load a recommendation for the project option. The loaded recommendation may, in some embodiments, be loaded from systems of the task facilitation service. As with the automatically generated recommendation above, the loaded recommendation includes a recommendation to perform tasks that may be performed by the representative and/or one or more third-parties on behalf of the member to satisfy the proposal option using systems and methods such as those described herein. In some instances, selection of the add recommendation button 1010 may cause the systems of the task facilitation service to query the resource library to identify various resources that may be used to generate a particular recommendation. For example, for a proposal option corresponding to a "2-night Stay" and a corresponding project related to an anniversary weekend for the member's parents, the systems of the task facilitation service may use information from the member profile (e.g., geographical location of the member's parents, budgetary constraints, any member or parental preferences, etc.), as well as any available information regarding the project (e.g., geographic location for the wine tasting weekend, etc.), to query the resource library for any recommendations that may satisfy the proposal option and the parameters of the proposal and project. These recommendations may correspond to available resources maintained in the resource library as provided by the representative, the member, or any other entities (e.g., other representatives, other members, third-party services, etc.). The resource library may thus server as a repository for different resources (e.g., guides, public search results, available third-party services, previously performed projects and tasks, etc.) that may be used to identify possible recommendations for different proposal options.

In an embodiment, the representative can load a specific recommendation based on the project option. For example, the representative may have a previously saved template for planning a weekend getaway from a previous project. Accordingly, the representative may load the recommendation from that previous template or project. In another example, the representative may load the recommendation from a set of recommendations associated with the representative. For instance, if the representative selects the add recommendation button 1010, the systems of the task facilitation service may query the resource library to identify any previously generated proposals associated with the representative. From these previously generated proposals, the systems of the task facilitation service may identify any recommendations associated with these previously generated proposals. These previously generated recommendations may be presented to the representative through the application 1004.

In another example, the representative may load the recommendation from a set of recommendations associated with the member. For instance, if the representative selects the add recommendation button 1010, the systems of the task facilitation service may query the resource library to identify any previously generated proposals associated with the member. These proposals may include recommendations previously provided to the member by the representative or any other representatives that may have prepared these proposals for the member. In some instances, information corresponding to these previously generated proposals may be stored in the member profile associated with the member. Thus, in response to selection of the add recommendation button 1010, the systems of the task facilitation service may automatically process the member profile to identify any previously performed or active projects and tasks for which proposals have been generated. Based on these identified projects and tasks, the systems of the task facilitation service may identify the corresponding proposals and recommendations.

In some instances, if the representative selects the add recommendation button 1010, the systems of the task facilitation service may update the application 1004 to present a graphical representation of the resource library. Through this graphical representation of the resource library, the representative may be presented with various recommendations that may be available to the representative for populating the particular proposal option from which the add recommendation button 1010 was selected. Additionally, through this graphical representation of the resource library, the representative may submit a query to identify one or more recommendations that may be relevant to the submitted query. For example, if the representative submits a query with the string "2-night Stay," the systems of the task facilitation service may update the interface to provide any recommendations or resources that may be associated with the terms "2-night," "stay," and/or "2-night stay." Further, in some instances, the systems of the task facilitation service may automatically augment the query with information garnered from the member profile (e.g., geographical location of the member's parents, budgetary restrictions or constraints, etc.) and from the project and/or task (e.g., location for the wine tasting weekend, etc.). From these recommendations and resources, the representative may select an appropriate recommendation for the particular proposal option.

In an embodiment, the add recommendation button 1010 is used by the representative to create a new recommendation for the current project option. For instance, in response to selection of the add recommendation button 1010, a blank recommendation may be added to the proposal option. This blank recommendation may not initially include any specific recommendations to perform tasks that may be performed by the representative and/or one or more third-parties on behalf of the member to satisfy the proposal option. In some instances, selection of the add recommendation button 1010 may result in a recommendation shell being added to the proposal option. This recommendation shell may include a partial set of specific recommendations to perform tasks that may be performed by the representative and/or one or more third-parties on behalf of the member to satisfy the proposal option. In such an embodiment, the add recommendation button 1010 may cause the application 1004 to display an additional user interface element (not illustrated herein) to, for example, create a new blank recommendation or create a new recommendation from a designated recommendation shell.

As described above, a recommendation canvas, such as the recommendation canvas 1012, may include a plurality of user interface elements of the application 1004 that the representative may use to edit recommendations associated with a proposal option. For example, in the illustrated example shown in FIG. 10, the recommendation canvas 1012 includes one or more data fields for the recommendation to book the 2-night stay at the "Wine Cottage." The data fields of the recommendation may be static fields (i.e., shared between recommendations of this type), may be unique fields (i.e., specific to this recommendation and/or member), may be custom data fields (i.e., may be created specifically for this instance of this recommendation), or may be some other type of data field. In an embodiment, a recommendation is based on a recommendation template, which may include data fields without set values. For example, a recommendation based on a recommendation template may include data fields for the name, estimated price, location, description, and notes but may not include values for those data fields.

In some instances, a recommendation may be based on a recommendation shell, which may include data fields with some set values and some unset values. For example, a recommendation based on a recommendation shell may include data fields for the name, estimated price, location, description, and notes and may also include values for the name, estimated price, and location but not for the description or notes. In an embodiment, the recommendation includes other data fields including, but not limited to, rating (e.g., from social media sites), manager or owner name, pictures of the property, pictures of rooms of the property, a link to an onsite restaurant, and other such data fields.

As may be contemplated, a plurality of proposal recommendations may be associated with a proposal option. In the example environment illustrated in FIG. 10, the proposal option dropdown bar 1008 includes the recommendation canvas 1012 (described above) and the recommendation canvas 1014. The recommendation canvas 1014 shows a different recommendation for the 2-night stay proposal option (at the "Hotel Vino") which may have been generated using one of the methods described above with respect to the recommendation canvas 1012 (e.g., using the add recommendation button 1010).

In the example environment illustrated in FIG. 10, a recommendation canvas such a recommendation canvas 1012 includes additional user interface elements of the application 1004 that are used by the representative to generate recommendations for a proposal option. For example, the recommendation canvas 1012 includes an edit recommendation button 1024 and a remove recommendation button 1026. In an embodiment, the edit recommendation button 1024 is used by the representative to change values for the data fields of the recommendation to, for example, refine the recommendation. Such edits may include adding fields to a recommendation from a library of fields stored by systems of the task facilitation service in the resource library. Such edits may also include adding more specific details to the recommendation as custom fields. Such custom fields may be specific to the representative, to the project, to the proposal option, to one or more tasks associated with the proposal option, or to the recommendation. In some instances, if the representative adds a blank recommendation to the proposal option, the representative may use the edit recommendation button 1024 to refine the blank recommendation by adding and editing data fields associated with the recommendation. In an embodiment, the remove recommendation button 1026 is also used to refine a recommendation and/or to refine a set of recommendations by providing a way for the representative to remove extraneous recommendations for a proposal option. For example, one of the member's parents may have an allergy that precludes a particular lodging choice, thereby obviating a recommendation for that lodging choice.

In an embodiment, any edits submitted by the representative to a particular recommendation are recorded in the resource library for later use by the representative and any other representatives for similar proposal options and corresponding projects/tasks. For example, if the representative edits a blank recommendation to create a recommendation corresponding to a hotel option that the representative has recently learned about (e.g., through a public search for hotels near the wine tasting venue, through the representative's own knowledge, etc.), the recommendation and corresponding information may be recorded in the resource library. Another representative trying to identify a recommendation for lodging near the wine tasting venue (whether related to the wine tasting venue or other location within proximity of the venue) for a particular proposal option may be presented with this particular recommendation in response to a query submitted to the resource library.

In an embodiment, the edit recommendation button 1024 is used by the representative to open and edit a larger set of data fields for the recommendation (e.g., to retrieve a rating from social media sites, to edit the manager's or owner's name, to upload pictures of the property, to upload pictures of rooms of the property, to provide a link to an onsite restaurant, and/or to edit other such data fields). In an embodiment, the values for the data fields displayed in the recommendation canvas (e.g., the recommendation canvas 1012) can be edited by entering data directly into the displayed data fields.

In an embodiment, a preferred recommendation checkbox 1028 can be used by the representative to indicate that a proposal recommendation is a preferred proposal recommendation. In another embodiment, user interface elements of the application 1004 can be used to allow the representative to assign a ranking to the proposal recommendation. As described herein, proposal recommendations are recommendations to perform tasks that may be performed by the representative and/or one or more third-parties on behalf of the member to satisfy the proposal option. Accordingly, denoting a proposal recommendation as a preferred proposal recommendation and/or ranking a proposal recommendation may, in some embodiments, cause a preferred status or a higher ranking on the tasks that may be performed by the representative and/or one or more third-parties on behalf of the member to satisfy the proposal option to be conferred on the tasks using systems and methods described herein. Similarly, a proposal that includes one or more preferred recommendations and/or that includes one or more recommendations that ranked higher can also cause a preferred status or a higher ranking to be conferred on the proposal using systems and methods described herein. In an embodiment, the preferred status of a recommendation and/or the ranking of a recommendation can be automatically generated using a machine learning or artificial intelligence algorithm that analyzes data from, for example, the member's preferences, past proposal options from members, or other such data (e.g., demographics, location, time of year, predicted weather, etc.).

In an embodiment, elements of recommendations associated with a proposal option can be saved as templates or shells for subsequent proposal options. For example, the proposal option for a 2-night stay with the two recommendations and the designation of one a preferred recommendation illustrated in FIG. 10 may be saved and used as a template for or a shell for subsequent recommendations for the same or similar proposal options. In an embodiment, the representative can save the proposal option and recommendations to the resource library. In an embodiment, systems of the task facilitation service can automatically save a proposal option with recommendations and a preferred designation and/or a ranking to the resource library.

In an embodiment, the user interface elements of the application 1004 are used to provide other options for the representative to interact with proposal recommendations associated with a project option. In the embodiment illustrated in FIG. 10, user interface elements of the application 1004 include a discard changes button 1018, and a save changes button 1020. In an embodiment, the discard changes button 1018 is used by the representative to discard any changes made to the proposal options such as changes to the recommendations and, for example, return to a previous state. For example, the discard changes button 1018 may cause the changes to the recommendations associated with the proposal option to be discarded and the recommendations associated with the proposal option to be reverted to a previous state. In another example, the discard changes button 1018 may cause the changes to the recommendations associated with the proposal option the proposal to marked as, for example, inactive but not deleted.

In an embodiment, the save changes button 1020 is used by the representative to save the changes to the recommendations associated with the proposal option so that, for example, the recommendations associated with the proposal option can be refined later. Although not illustrated here, the user interface elements of the application 1004 may include a preview button not unlike the preview proposal button 922 described herein at least in connection with FIG. 9, which may be used by the representative to generate a view of the proposal or a portion of the proposal associated with the current project. Such a view of the proposal or portion of the proposal may include the elements of the proposal (e.g., the proposal options) that have proposal recommendations and may also include elements of the proposal that do not have proposal recommendations.

It should be noted that while the example environment 1000 illustrated in FIG. 10 shows recommendations for a single set of recommendations for a single proposal option associated with a current project, a plurality of recommendations, proposal options, and proposals may be associated with a project. It should also be noted that the user interface elements of the application 1004 illustrated in FIG. 10 are illustrative examples and, as may be contemplated, different user interface elements, designs thereof, and/or arrangements thereof may be considered as within the scope of the present application. For example, the icon displayed in recommendation canvas 1012 is merely an illustrative example.

Although not illustrated in FIG. 10, in an embodiment there may be no acceptable and/or preferred recommendations for a proposal option. For example, a proposal option corresponding to making a dinner reservation on behalf of a member with a stated preference to only eat at vegan restaurants may not have any associated proposal recommendations in an area where no such restaurants exist. In such an example, the task facilitation service can generate alternative proposal options that may have associated recommendations using, for example, machine learning or artificial intelligence algorithms as described herein. For example, systems of the task facilitation service may generate a proposal option to pack a vegan picnic, which could then have a recommendation to get the picnic lunch from a vendor that is nearby or on the way to the winery location. In some embodiments, a proposal option with no associated recommendations can be automatically deleted so that it is, for example, not included in a proposal. In some embodiments a "null recommendation" (i.e., a recommendation to not perform any tasks) can be included in the proposal.

In an embodiment, a recommendation causes additional tasks and/or proposal options to be created. For example, as shown in recommendation canvas 1012, the "Wine Cottage" is located close to the vineyard and thus, either the vineyard or the "Wine Cottage" could have a shuttle or provide transportation for guests and visitors. Conversely, as shown in recommendation canvas 1014, the "Hotel Vino" is located further away from the vineyard and thus, it may be less likely that the vineyard or the "Hotel Vino" has a shuttle or provides transportation for guests and visitors. Accordingly, selection of this recommendation may require additional tasks to, for example, rent a car, book a ride-share, or otherwise find transportation between the hotel and the vineyard. Such additional tasks and/or proposal options may be generated by the representative or may be generated by the task facilitation service using machine learning and/or artificial intelligences techniques such as those described herein.

As may be contemplated, a recommendation and/or ranking of a recommendation can be used as the basis for, as a template for, or as a shell for subsequent recommendations. For example, a preferred recommendation for the "Wine Cottage" may increase the likelihood that the "Wine Cottage" is included and/or preferred in other proposals from the task facilitation service and, in some embodiments, can cause the "Wine Cottage" to be automatically recommended for other proposals for the member, for wine tasting weekends, for weekend getaways, or for weekends in the location where the vineyards are located.

It should be noted that for the systems, methods, interactions, and processes described herein in connection with, for example, FIGS. 9 and 10, various operations performed by the representative may be additionally, or alternatively, performed using one or more machine learning algorithms or artificial intelligence such as those described herein. For example, as the representative and/or the task recommendation system generate and/or suggest proposal templates, generate and/or suggest proposal options, generate and/or suggest recommendations, generate proposals, rank and/or designate proposals as preferred, coordinate tasks, and/or perform tasks on behalf of a member, systems of the task facilitation service may continuously and automatically update the member's profile and/or the member's preferences according to feedback related to those generations and/or suggestions.

In an embodiment, systems of the task facilitation service (e.g., the task recommendation system) may utilize a machine learning algorithm and/or artificial intelligence techniques such as those described herein to automatically and dynamically generate proposal templates, proposal options, recommendations, proposals, proposal rankings, and/or tasks based on the various attributes of the member profile with or without representative interaction. For example, the task recommendation system may automatically communicate with the member to obtain any additional information required for new projects and tasks and may automatically generate proposal templates, proposal options, recommendations, proposals, proposal rankings, or tasks based on that additional information. The representative may also monitor communications between the task recommendation system and the member to ensure that a conversation between the two maintains a positive polarity (e.g., the member is satisfied with its interaction with the task recommendation system, other systems of the task facilitation service, the representative, the assistant representative, and/or other bots associated with the task facilitation services). If the representative determines that the conversation has a negative polarity (e.g., the member is expressing frustration or dissatisfaction, the task recommendation system is unable to process the member's responses or asks, etc.), the representative may intervene in the conversation. This may allow the representative to address any member concerns and generate proposal options, generate recommendations, generate proposals, generate proposal rankings, and/or perform any tasks on behalf of the member.

Thus, as described above, unlike automated customer service systems and environments, wherein these systems and environment may have little to no knowledge of the users interacting with agents or other automated systems, systems of the task facilitation service such as the task recommendation system can continuously update the member profile to provide up-to-date historical information about the member based on the member's interaction with the systems of the task facilitation service and/or interaction with the representative and based on, for example, the proposals generated, the proposals recommended, and the tasks performed on behalf of the member over time. This historical information, which may be automatically and dynamically updated as the member and/or the systems of the task facilitation service interact with the representative and as proposal templates are generated and/or suggested, proposal options are generated and/or suggested, recommendations are generated and/or suggested, proposals are generated, proposals are ranked and/or designated as preferred, tasks are coordinated, and/or tasks are performed on behalf of the member, may be used by the task recommendation system to anticipate, identify, and present appropriate or intelligent responses to member queries, needs, and/or goals.

Figure 11:
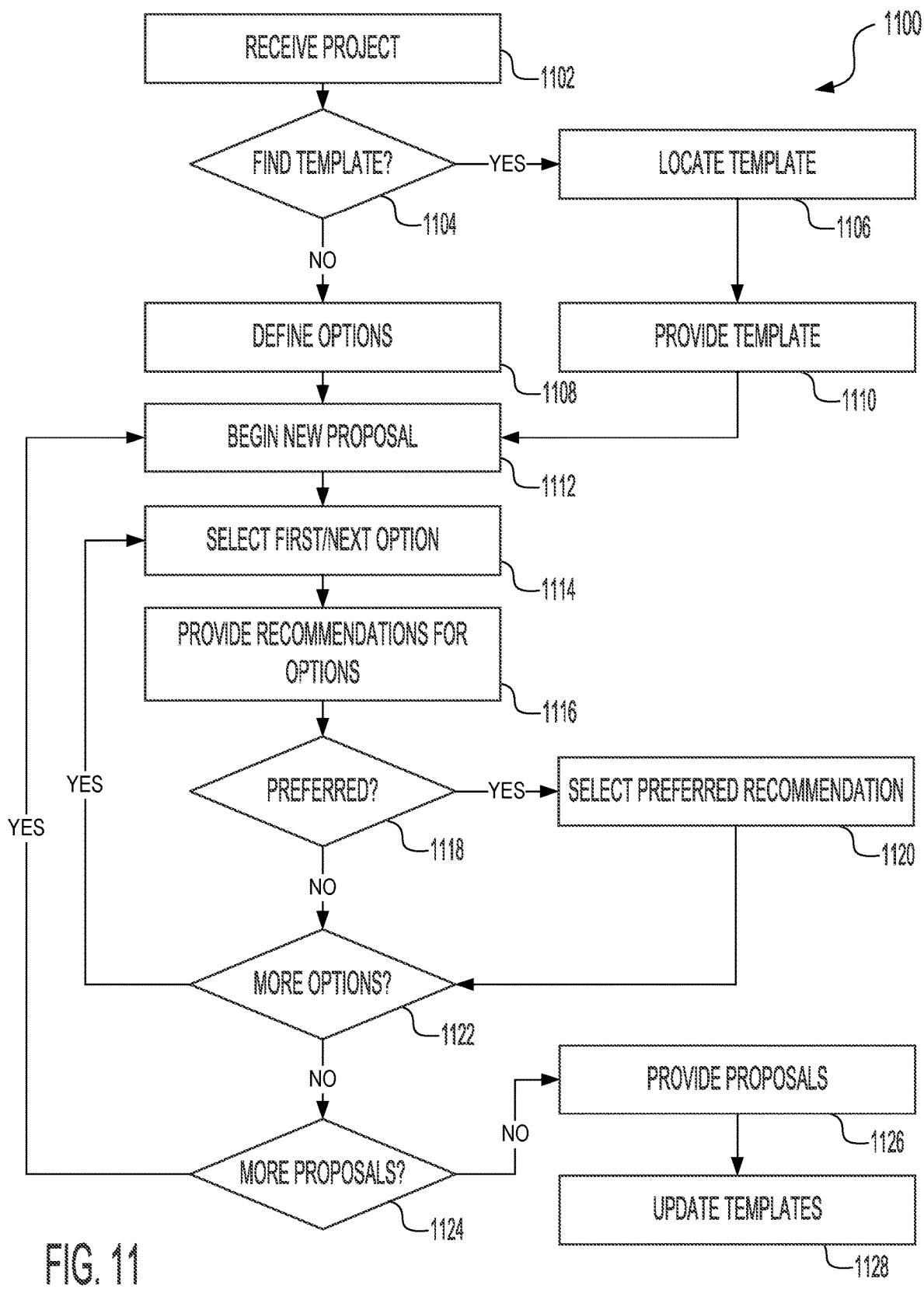
FIG. 11 shows an illustrative example of a process for generating a proposal using a proposal template in accordance with at least one embodiment.

FIG. 11 shows an illustrative example of a process 1100 for generating a proposal using a proposal template in accordance with at least one embodiment. One or more components of a task facilitation service may perform the example process 1100 illustrated in FIG. 11. For example, the process 1100 may be performed by a task recommendation system of the task facilitation service (e.g., the task recommendation system 112 of the task facilitation service 102, both described herein at least in connection with FIG. 1). Parts of the process 1100 illustrated in FIG. 11 may also be performed by other services of the task facilitation service.

At step 1102, a system of the task facilitation service receives a project. In an embodiment, the system of the task facilitation service receives the project from a representative. For instance, the representative may generate a new project or independent task based on communications exchanged between the representative and a corresponding member of the task facilitation service through a communications channel (e.g., a chat session, etc.). As an illustrative example, through the communications session, the member may indicate that they need help with an upcoming move to a new city. Accordingly, the representative may generate a new project or individual tasks corresponding to this upcoming move.

In another embodiment, the system of the task facilitation service receives the project from a member. As noted above, the task facilitation service may provide, to the member and via an application or web portal provided by the task facilitation service, an option for manual entry of a project or task that may be delegated to the representative or that may otherwise be added to the member's list of projects and tasks. If the member selects an option for manual entry of a project or task, the task facilitation service may provide, via an interface of the application or web portal, a task template through which the member may enter various details related to the task, as described in greater detail herein. The task template may include various fields through which the member may provide a name for the task, a description of the task (e.g., "I need to have my gutters cleaned before the upcoming storm," "I'd like to have painters touch up my powder room," etc.), a timeframe for performance of the task (e.g., a specific deadline date, a date range, a level of urgency, etc.), a budget for performance of the task (e.g., no budget limitation, a specific maximum amount, etc.), and the like.

At step 1104 a system of the task facilitation service determines if a template associated with the project should be found. In an embodiment, the system of the task facilitation service determines if a template associated with the project should be found based on an analysis of the project. For example, a very simple project such as "get my tires rotated" may not need a template. Conversely, a complex project such as "plan a move out of the country" may require a plurality of templates to break the project up into individual tasks. In an embodiment, the system of the task facilitation service uses one or more machine learning and/or artificial intelligence techniques such as those described herein to determine if a template associated with the project should be found.

If, at step 1104, the system of the task facilitation service determines that a template associated with the project should be found ("YES" branch), at step 1106, the system of the task facilitation service locates a template associated with the project that may include one or more proposal options. In an embodiment, the system of the task facilitation service locates the template in a resource library maintained by the task facilitation service. The resource library may store project templates for different types or categories of projects. In another embodiment, the system of the task facilitation service generates the template using information specified for the project. In an embodiment, the system of the task facilitation service uses one or more machine learning and/or artificial intelligence techniques such as those described herein to locate and/or generate a template that may be associated with the project.

At step 1110, a system of the task facilitation service provides the template to one or more services of the task facilitation service. It should be noted that if the system of the task facilitation service is unable to locate and/or generate a template in step 1106, the system of the task facilitation service may return an empty template such as those described herein, or may generate an error, or may provide some other response. For instance, the system of the task facilitation service may provide a notification to the representative or member to indicate that no stored templates correspond to the submitted project. Accordingly, the representative or member may utilize a blank template or other entry form to define the project.

If, at step 1104, the system of the task facilitation service does not determine that a template associated with the project should be found ("NO" branch), at step 1108 the system of the task facilitation service defines proposal options for the project. In an embodiment, at step 1108, the system of the task facilitation service generates an empty proposal template and may add one or more proposal options to the empty proposal template. It should be noted that if the system of the task facilitation service is unable to locate and/or generate a template in step 1106, and the system of the task facilitation service determines to return an empty template, the system of the task facilitation service may also add one or more proposal options to the empty proposal template.

At step 1112, a system of the task facilitation service begins a new proposal using the proposal options that were either specified in the task template (in step 1110) or defined by the task recommendation system (in step 1108). At step 1114, a system of the task facilitation service selects the first (or next, in subsequent iterations) proposal option.

At step 1116, a system of the task facilitation service provides one or more recommendations for the task component selected in step 1114. For example, if the proposal option is to book a 2-night stay as part of a project corresponding to a wine tasting weekend, the system of the task facilitation service may provide one or more recommendations to satisfy that proposal option.

At step 1118, a system of the task facilitation service determines if one or more of the recommendations provided in step 1116 should be designated as a preferred recommendation. If, at step 1118, the system of the task facilitation service determines that one or more of the recommendations provided in step 1116 should be designated as a preferred recommendation ("YES" branch), at step 1120, the system of the task facilitation service selects the preferred recommendation and/or provides a ranking associated with the recommendation based on it being a preferred recommendation and proceeds to step 1122. If, at step 1118, the system of the task facilitation service determines that one or more of the recommendations provided in step 1116 should not be designated as a preferred recommendation ("NO" branch), at step 1120 the system of the task facilitation service proceeds to step 1122.

At step 1122, a system of the task facilitation service determines if there are more components of the task components to process. If, at step 1122, the system of the task facilitation service determines that there are more components of the task components to process ("YES" branch), the system of the task facilitation service returns to step 1114 to select the next component of the task components as described above.

If, at step 1122, the system of the task facilitation service determines that there are not more components of the task components to process ("NO" branch), at step 1124 the system of the task facilitation service determines if there are more proposals to generate (e.g., alternate proposals such as those described herein). If, at step 1124, the system of the task facilitation service determines that there are more proposals to generate ("YES" branch), the system of the task facilitation service returns to step 1112 to begin the next proposal as described above.

If, at step 1124, the system of the task facilitation service determines that there are not more proposals to generate ("NO" branch), at step 1126 the system of the task facilitation service provides the generated proposals for the project. In an embodiment, the system of the task facilitation service designates one or more of the proposals as a recommended proposal using the systems and methods described herein for designating a proposal as a recommended proposal.

At step 1128, a system of the task facilitation service updates one or more proposal templates based on decisions made during the execution of the example process 1100 illustrated in FIG. 11 using techniques described herein at least in connection with FIG. 8.

FIG. 12 illustrates a computing system architecture 1200, including various components in electrical communication with each other, in accordance with some embodiments. The example computing system architecture 1200 illustrated in FIG. 12 includes a computing device 1202, which has various components in electrical communication with each other using a connection 1206, such as a bus, in accordance with some implementations. The example computing system architecture 1200 includes a processing unit 1204 that is in electrical communication with various system components, using the connection 1206, and including the system memory 1214. In some embodiments, the system memory 1214 includes read-only memory (ROM), random-access memory (RAM), and other such memory technologies including, but not limited to, those described herein. In some embodiments, the example computing system architecture 1200 includes a cache 1208 of high-speed memory connected directly with, in close proximity to, or integrated as part of the processor 1204. The system architecture 1200 can copy data from the memory 1214 and/or the storage device 1210 to the cache 1208 for quick access by the processor 1204. In this way, the cache 1208 can provide a performance boost that decreases or eliminates processor delays in the processor 1204 due to waiting for data. Using modules, methods and services such as those described herein, the processor 1204 can be configured to perform various actions. In some embodiments, the cache 1208 may include multiple types of cache including, for example, level one (L1) and level two (L2) cache. The memory 1214 may be referred to herein as system memory or computer system memory. The memory 1214 may include, at various times, elements of an operating system, one or more applications, data associated with the operating system or the one or more applications, or other such data associated with the computing device 1202.

Other system memory 1214 can be available for use as well. The memory 1214 can include multiple different types of memory with different performance characteristics. The processor 1204 can include any general purpose processor and one or more hardware or software services, such as service 1212 stored in storage device 1210, configured to control the processor 1204 as well as a special-purpose processor where software instructions are incorporated into the actual processor design. The processor 1204 can be a completely self-contained computing system, containing multiple cores or processors, connectors (e.g., buses), memory, memory controllers, caches, etc. In some embodiments, such a self-contained computing system with multiple cores is symmetric. In some embodiments, such a self-contained computing system with multiple cores is asymmetric. In some embodiments, the processor 1204 can be a microprocessor, a microcontroller, a digital signal processor ("DSP"), or a combination of these and/or other types of processors. In some embodiments, the processor 1204 can include multiple elements such as a core, one or more registers, and one or more processing units such as an arithmetic logic unit (ALU), a floating point unit (FPU), a graphics processing unit (GPU), a physics processing unit (PPU), a digital system processing (DSP) unit, or combinations of these and/or other such processing units.

To enable user interaction with the computing system architecture 1200, an input device 1216 can represent any number of input mechanisms, such as a microphone for speech, a touch-sensitive screen for gesture or graphical input, keyboard, mouse, motion input, pen, and other such input devices. An output device 1218 can also be one or more of a number of output mechanisms known to those of skill in the art including, but not limited to, monitors, speakers, printers, haptic devices, and other such output devices. In some instances, multimodal systems can enable a user to provide multiple types of input to communicate with the computing system architecture 1200. In some embodiments, the input device 1216 and/or the output device 1218 can be coupled to the computing device 1202 using a remote connection device such as, for example, a communication interface such as the network interface 1220 described herein. In such embodiments, the communication interface can govern and manage the input and output received from the attached input device 1216 and/or output device 1218. As may be contemplated, there is no restriction on operating on any particular hardware arrangement and accordingly the basic features here may easily be substituted for other hardware, software, or firmware arrangements as they are developed.

In some embodiments, the storage device 1210 can be described as non-volatile storage or non-volatile memory. Such non-volatile memory or non-volatile storage can be a hard disk or other types of computer readable media which can store data that are accessible by a computer, such as magnetic cassettes, flash memory cards, solid state memory devices, digital versatile disks, cartridges, RAM, ROM, and hybrids thereof.

As described above, the storage device 1210 can include hardware and/or software services such as service 1212 that can control or configure the processor 1204 to perform one or more functions including, but not limited to, the methods, processes, functions, systems, and services described herein in various embodiments. In some embodiments, the hardware or software services can be implemented as modules. As illustrated in example computing system architecture 1200, the storage device 1210 can be connected to other parts of the computing device 1202 using the system connection 1206. In an embodiment, a hardware service or hardware module such as service 1212, that performs a function can include a software component stored in a non-transitory computer-readable medium that, in connection with the necessary hardware components, such as the processor 1204, connection 1206, cache 1208, storage device 1210, memory 1214, input device 1216, output device 1218, and so forth, can carry out the functions such as those described herein.

The disclosed systems and service of a task facilitation service (e.g., the task facilitation service 102 described herein at least in connection with FIG. 1) can be performed using a computing system such as the example computing system illustrated in FIG. 12, using one or more components of the example computing system architecture 1200. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device.

In some embodiments, the processor can be configured to carry out some or all of methods and systems for generating proposals associated with a task facilitation service (e.g., the task facilitation service 102 described herein at least in connection with FIG. 1) described herein by, for example, executing code using a processor such as processor 1204 wherein the code is stored in memory such as memory 1214 as described herein. One or more of a user device, a provider server or system, a database system, or other such devices, services, or systems may include some or all of the components of the computing system such as the example computing system illustrated in FIG. 12, using one or more components of the example computing system architecture 1200 illustrated herein. As may be contemplated, variations on such systems can be considered as within the scope of the present disclosure.

This disclosure contemplates the computer system taking any suitable physical form. As example and not by way of limitation, the computer system can be an embedded computer system, a system-on-chip (SOC), a single-board computer system (SBC) (such as, for example, a computer-on-module (COM) or system-on-module (SOM)), a desktop computer system, a laptop or notebook computer system, a tablet computer system, a wearable computer system or interface, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud computing system which may include one or more cloud components in one or more networks as described herein in association with the computing resources provider 1228. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor 1204 can be a conventional microprocessor such as an Intel® microprocessor, an AMD® microprocessor, a Motorola® microprocessor, or other such microprocessors. One of skill in the relevant art will recognize that the terms "machine-readable (storage) medium" or "computer-readable (storage) medium" include any type of device that is accessible by the processor.

The memory 1214 can be coupled to the processor 1204 by, for example, a connector such as connector 1206, or a bus. As used herein, a connector or bus such as connector 1206 is a communications system that transfers data between components within the computing device 1202 and may, in some embodiments, be used to transfer data between computing devices. The connector 1206 can be a data bus, a memory bus, a system bus, or other such data transfer mechanism. Examples of such connectors include, but are not limited to, an industry standard architecture (ISA" bus, an extended ISA (EISA) bus, a parallel AT attachment (PATA" bus (e.g., an integrated drive electronics (IDE) or an extended IDE (EIDE) bus), or the various types of parallel component interconnect (PCI) buses (e.g., PCI, PCIe, PCI-104, etc.).

The memory 1214 can include RAM including, but not limited to, dynamic RAM (DRAM), static RAM (SRAM), synchronous dynamic RAM (SDRAM), non-volatile random access memory (NVRAM), and other types of RAM. The DRAM may include error-correcting code (EEC). The memory can also include ROM including, but not limited to, programmable ROM (PROM), erasable and programmable ROM (EPROM), electronically erasable and programmable ROM (EEPROM), Flash Memory, masked ROM (MROM), and other types or ROM. The memory 1214 can also include magnetic or optical data storage media including read-only (e.g., CD ROM and DVD ROM) or otherwise (e.g., CD or DVD). The memory can be local, remote, or distributed.

As described above, the connector 1206 (or bus) can also couple the processor 1204 to the storage device 1210, which may include non-volatile memory or storage and which may also include a drive unit. In some embodiments, the non-volatile memory or storage is a magnetic floppy or hard disk, a magnetic-optical disk, an optical disk, a ROM (e.g., a CD-ROM, DVD-ROM, EPROM, or EEPROM), a magnetic or optical card, or another form of storage for data. Some of this data is may be written, by a direct memory access process, into memory during execution of software in a computer system. The non-volatile memory or storage can be local, remote, or distributed. In some embodiments, the non-volatile memory or storage is optional. As may be contemplated, a computing system can be created with all applicable data available in memory. A typical computer system will usually include at least one processor, memory, and a device (e.g., a bus) coupling the memory to the processor.

Software and/or data associated with software can be stored in the non-volatile memory and/or the drive unit. In some embodiments (e.g., for large programs) it may not be possible to store the entire program and/or data in the memory at any one time. In such embodiments, the program and/or data can be moved in and out of memory from, for example, an additional storage device such as storage device 1210. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The connection 1206 can also couple the processor 1204 to a network interface device such as the network interface 1220. The interface can include one or more of a modem or other such network interfaces including, but not limited to those described herein. It will be appreciated that the network interface 1220 may be considered to be part of the computing device 1202 or may be separate from the computing device 1202. The network interface 1220 can include one or more of an analog modem, Integrated Services Digital Network (ISDN) modem, cable modem, token ring interface, satellite transmission interface, or other interfaces for coupling a computer system to other computer systems. In some embodiments, the network interface 1220 can include one or more input and/or output (I/O) devices. The I/O devices can include, by way of example but not limitation, input devices such as input device 1216 and/or output devices such as output device 1218. For example, the network interface 1220 may include a keyboard, a mouse, a printer, a scanner, a display device, and other such components. Other examples of input devices and output devices are described herein. In some embodiments, a communication interface device can be implemented as a complete and separate computing device.

In operation, the computer system can be controlled by operating system software that includes a file management system, such as a disk operating system. One example of operating system software with associated file management system software is the family of Windows® operating systems and their associated file management systems. Another example of operating system software with its associated file management system software is the Linux™ operating system and its associated file management system including, but not limited to, the various types and implementations of the Linux® operating system and their associated file management systems. The file management system can be stored in the non-volatile memory and/or drive unit and can cause the processor to execute the various acts required by the operating system to input and output data and to store data in the memory, including storing files on the non-volatile memory and/or drive unit. As may be contemplated, other types of operating systems such as, for example, MacOS®, other types of UNIX® operating systems (e.g., BSD™ and descendants, Xenix™, SunOS™, HP-UX®, etc.), mobile operating systems (e.g., iOS® and variants, Chrome®, Ubuntu Touch®, watchOS®, Windows 10 Mobile®, the Blackberry® OS, etc.), and real-time operating systems (e.g., VxWorks®, QNX®, eCos®, RTLinux®, etc.) may be considered as within the scope of the present disclosure. As may be contemplated, the names of operating systems, mobile operating systems, real-time operating systems, languages, and devices, listed herein may be registered trademarks, service marks, or designs of various associated entities.

In some embodiments, the computing device 1202 can be connected to one or more additional computing devices such as computing device 1224 via a network 1222 using a connection such as the network interface 1220. In such embodiments, the computing device 1224 may execute one or more services 1226 to perform one or more functions under the control of, or on behalf of, programs and/or services operating on computing device 1202. In some embodiments, a computing device such as computing device 1224 may include one or more of the types of components as described in connection with computing device 1202 including, but not limited to, a processor such as processor 1204, a connection such as connection 1206, a cache such as cache 1208, a storage device such as storage device 1210, memory such as memory 1214, an input device such as input device 1216, and an output device such as output device 1218. In such embodiments, the computing device 1224 can carry out the functions such as those described herein in connection with computing device 1202. In some embodiments, the computing device 1202 can be connected to a plurality of computing devices such as computing device 1224, each of which may also be connected to a plurality of computing devices such as computing device 1224. Such an embodiment may be referred to herein as a distributed computing environment.

The network 1222 can be any network including an internet, an intranet, an extranet, a cellular network, a Wi-Fi network, a local area network (LAN), a wide area network (WAN), a satellite network, a Bluetooth® network, a virtual private network (VPN), a public switched telephone network, an infrared (IR) network, an internet of things (IoT network) or any other such network or combination of networks. Communications via the network 1222 can be wired connections, wireless connections, or combinations thereof. Communications via the network 1222 can be made via a variety of communications protocols including, but not limited to, Transmission Control Protocol/Internet Protocol (TCP/IP), User Datagram Protocol (UDP), protocols in various layers of the Open System Interconnection (OSI) model, File Transfer Protocol (FTP), Universal Plug and Play (UPnP), Network File System (NFS), Server Message Block (SMB), Common Internet File System (CIFS), and other such communications protocols.

Communications over the network 1222, within the computing device 1202, within the computing device 1224, or within the computing resources provider 1228 can include information, which also may be referred to herein as content. The information may include text, graphics, audio, video, haptics, and/or any other information that can be provided to a user of the computing device such as the computing device 1202. In an embodiment, the information can be delivered using a transfer protocol such as Hypertext Markup Language (HTML), Extensible Markup Language (XML), JavaScript®, Cascading Style Sheets (CSS), JavaScript® Object Notation (JSON), and other such protocols and/or structured languages. The information may first be processed by the computing device 1202 and presented to a user of the computing device 1202 using forms that are perceptible via sight, sound, smell, taste, touch, or other such mechanisms. In some embodiments, communications over the network 1222 can be received and/or processed by a computing device configured as a server. Such communications can be sent and received using PHP: Hypertext Preprocessor ("PHP"), Python™, Ruby, Perl® and variants, Java®, HTML, XML, or another such server-side processing language.

In some embodiments, the computing device 1202 and/or the computing device 1224 can be connected to a computing resources provider 1228 via the network 1222 using a network interface such as those described herein (e.g. network interface 1220). In such embodiments, one or more systems (e.g., service 1230 and service 1232) hosted within the computing resources provider 1228 (also referred to herein as within "a computing resources provider environment") may execute one or more services to perform one or more functions under the control of, or on behalf of, programs and/or services operating on computing device 1202 and/or computing device 1224. Systems such as service 1230 and service 1232 may include one or more computing devices such as those described herein to execute computer code to perform the one or more functions under the control of, or on behalf of, programs and/or services operating on computing device 1202 and/or computing device 1224.

For example, the computing resources provider 1228 may provide a service, operating on service 1230 to store data for the computing device 1202 when, for example, the amount of data that the computing device 1202 exceeds the capacity of storage device 1210. In another example, the computing resources provider 1228 may provide a service to first instantiate a virtual machine (VM) on service 1232, use that VM to access the data stored on service 1232, perform one or more operations on that data, and provide a result of those one or more operations to the computing device 1202. Such operations (e.g., data storage and VM instantiation) may be referred to herein as operating "in the cloud," "within a cloud computing environment," or "within a hosted virtual machine environment," and the computing resources provider 1228 may also be referred to herein as "the cloud." Examples of such computing resources providers include, but are not limited to Amazon® Web Services (AWS®), Microsoft's Azure®, IBM Cloud®, Google Cloud®, Oracle Cloud® etc.

Services provided by a computing resources provider 1228 include, but are not limited to, data analytics, data storage, archival storage, big data storage, virtual computing (including various scalable VM architectures), blockchain services, containers (e.g., application encapsulation), database services, development environments (including sandbox development environments), e-commerce solutions, game services, media and content management services, security services, server-less hosting, virtual reality (VR) systems, and augmented reality (AR) systems. Various techniques to facilitate such services include, but are not be limited to, virtual machines, virtual storage, database services, system schedulers (e.g., hypervisors), resource management systems, various types of short-term, mid-term, long-term, and archival storage devices, etc.

As may be contemplated, the systems such as service 1230 and service 1232 may implement versions of various services (e.g., the service 1212 or the service 1226) on behalf of, or under the control of, computing device 1202 and/or computing device 1224. Such implemented versions of various services may involve one or more virtualization techniques so that, for example, it may appear to a user of computing device 1202 that the service 1212 is executing on the computing device 1202 when the service is executing on, for example, service 1230. As may also be contemplated, the various services operating within the computing resources provider 1228 environment may be distributed among various systems within the environment as well as partially distributed onto computing device 1224 and/or computing device 1202.

Client devices, user devices, computer resources provider devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things such as those described herein. The input devices can include, for example, a keyboard, a mouse, a key pad, a touch interface, a microphone, a camera, and/or other types of input devices including, but not limited to, those described herein. The output devices can include, for example, a display screen, a speaker, a haptic feedback system, a printer, and/or other types of output devices including, but not limited to, those described herein. A data storage device, such as a hard drive or flash memory, can enable the computing device to temporarily or permanently store data. A network interface, such as a wireless or wired interface, can enable the computing device to communicate with a network. Examples of computing devices (e.g., the computing device 1202) include, but is not limited to, desktop computers, laptop computers, server computers, hand-held computers, tablets, smart phones, personal digital assistants, digital home assistants, wearable devices, smart devices, and combinations of these and/or other such computing devices as well as machines and apparatuses in which a computing device has been incorporated and/or virtually implemented.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as that described herein. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices (e.g., a combination of a DSP and a microprocessor), a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

As used herein, the term "machine-readable media" and equivalent terms "machine-readable storage media," "computer-readable media," and "computer-readable storage media" refer to media that includes, but is not limited to, portable or non-portable storage devices, optical storage devices, removable or non-removable storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), solid state drives (SSD), flash memory, memory or memory devices.

A machine-readable medium or machine-readable storage medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like. Further examples of machine-readable storage media, machine-readable media, or computer-readable (storage) media include but are not limited to recordable type media such as volatile and non-volatile memory devices, floppy and other removable disks, hard disk drives, optical disks (e.g., CDs, DVDs, etc.), among others, and transmission type media such as digital and analog communication links.

As may be contemplated, while examples herein may illustrate or refer to a machine-readable medium or machine-readable storage medium as a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

Some portions of the detailed description herein may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

It is also noted that individual implementations may be described as a process which is depicted as a flowchart, a flow diagram, a data flow diagram, a structure diagram, or a block diagram (e.g., the example process 800 for generating proposals as illustrated in FIG. 8). Although a flowchart, a flow diagram, a data flow diagram, a structure diagram, or a block diagram may describe the operations as a sequential process, many of the operations can be performed in parallel or concurrently. In addition, the order of the operations may be re-arranged. A process illustrated in a figure is terminated when its operations are completed, but could have additional steps not included in the figure. A process may correspond to a method, a function, a procedure, a subroutine, a subprogram, etc. When a process corresponds to a function, its termination can correspond to a return of the function to the calling function or the main function.

In some embodiments, one or more implementations of an algorithm such as those described herein may be implemented using a machine learning or artificial intelligence algorithm. Such a machine learning or artificial intelligence algorithm may be trained using supervised, unsupervised, reinforcement, or other such training techniques. For example, a set of data may be analyzed using one of a variety of machine learning algorithms to identify correlations between different elements of the set of data without supervision and feedback (e.g., an unsupervised training technique). A machine learning data analysis algorithm may also be trained using sample or live data to identify potential correlations. Such algorithms may include k-means clustering algorithms, fuzzy c-means (FCM) algorithms, expectation-maximization (EM) algorithms, hierarchical clustering algorithms, density-based spatial clustering of applications with noise (DBSCAN) algorithms, and the like. Other examples of machine learning or artificial intelligence algorithms include, but are not limited to, genetic algorithms, backpropagation, reinforcement learning, decision trees, liner classification, artificial neural networks, anomaly detection, and such. More generally, machine learning or artificial intelligence methods may include regression analysis, dimensionality reduction, metalearning, reinforcement learning, deep learning, and other such algorithms and/or methods. As may be contemplated, the terms "machine learning" and "artificial intelligence" are frequently used interchangeably due to the degree of overlap between these fields and many of the disclosed techniques and algorithms have similar approaches.

As an example of a supervised training technique, a set of data can be selected for training of the machine learning model to facilitate identification of correlations between members of the set of data. The machine learning model may be evaluated to determine, based on the sample inputs supplied to the machine learning model, whether the machine learning model is producing accurate correlations between members of the set of data. Based on this evaluation, the machine learning model may be modified to increase the likelihood of the machine learning model identifying the desired correlations. The machine learning model may further be dynamically trained by soliciting feedback from users of a system as to the efficacy of correlations provided by the machine learning algorithm or artificial intelligence algorithm (i.e., the supervision). The machine learning algorithm or artificial intelligence may use this feedback to improve the algorithm for generating correlations (e.g., the feedback may be used to further train the machine learning algorithm or artificial intelligence to provide more accurate correlations).

The various examples of flowcharts, flow diagrams, data flow diagrams, structure diagrams, or block diagrams discussed herein may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments) such as those described herein. A processor(s), implemented in an integrated circuit, may perform the necessary tasks.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

It should be noted, however, that the algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC (e.g., an iPad®, a Microsoft Surface®, a Chromebook®, etc.), a laptop computer, a set-top box (STB), a personal digital assistant (PDA), a mobile device (e.g., a cellular telephone, an iPhone®, and Android® device, a Blackberry®, etc.), a wearable device, an embedded computer system, an electronic book reader, a processor, a telephone, a web appliance, a network router, switch or bridge, or any system capable of executing a set of instructions (sequential or otherwise) that specify actions to be taken by that system. The system may also be a virtual system such as a virtual version of one of the aforementioned devices that may be hosted on another computer device such as the computer device 1202.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting or restricting the subject matter to the precise forms disclosed. Persons skilled in the relevant art can appreciate that many modifications and variations are possible in light of the above disclosure and may be made thereto without departing from the broader scope of the embodiments as set forth herein. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

As used herein, the terms "a" and "an" and "the" and other such singular referents are to be construed to include both the singular and the plural, unless otherwise indicated herein or clearly contradicted by context.

As used herein, the terms "comprising," "having," "including," and "containing" are to be construed as open-ended (e.g., "including" is to be construed as "including, but not limited to"), unless otherwise indicated or clearly contradicted by context.

As used herein, the recitation of ranges of values is intended to serve as a shorthand method of referring individually to each separate value falling within the range, unless otherwise indicated or clearly contradicted by context. Accordingly, each separate value of the range is incorporated into the specification as if it were individually recited herein.

As used herein, use of the terms "set" (e.g., "a set of items") and "subset" (e.g., "a subset of the set of items") is to be construed as a nonempty collection including one or more members unless otherwise indicated or clearly contradicted by context. Furthermore, unless otherwise indicated or clearly contradicted by context, the term "subset" of a corresponding set does not necessarily denote a proper subset of the corresponding set but that the subset and the set may include the same elements (i.e., the set and the subset may be the same).

As used herein, use of conjunctive language such as "at least one of A, B, and C" is to be construed as indicating one or more of A, B, and C (e.g., any one of the following nonempty subsets of the set $\{A, B, C\}$, namely: $\{A\}$, $\{B\}$, $\{C\}$, $\{A, B\}$, $\{A, C\}$, $\{B, C\}$, or $\{A, B, C\}$) unless otherwise indicated or clearly contradicted by context. Accordingly, conjunctive language such as "as least one of A, B, and C"

does not imply a requirement for at least one of A, at least one of B, and at least one of C.

As used herein, the use of examples or exemplary language (e.g., "such as" or "as an example") is intended to more clearly illustrate embodiments and does not impose a limitation on the scope unless otherwise claimed. Such language in the specification should not be construed as indicating any non-claimed element is required for the practice of the embodiments described and claimed in the present disclosure.

As used herein, where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms.

Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method, comprising:
    receiving a task specification associated with a member, wherein the task specification includes a set of parameters associated with a task, and wherein the task specification is received through a communications session between the member and a representative;
    training a template machine learning algorithm to identify interaction correlations between different interactions and proposals generated using proposal templates;
    identifying a proposal template for the task specification, wherein the proposal template is identified by using the template machine learning algorithm to process the task specification according to the interaction correlations, and wherein the proposal template includes a set of proposal options and a set of data fields associated with the task;
    training a recommendation machine learning algorithm to generate proposal recommendations for different proposal options and data field recommendations for different data fields presentable with the proposal recommendations, wherein the recommendation machine learning algorithm is trained and implemented to reduce unnecessary interactions with the proposal recommendations and the different data fields, and wherein the recommendation machine learning algorithm is trained using a sample interaction dataset that includes sample interactions with the proposal recommendations and the different data fields;
    identifying a proposal recommendation and one or more data fields for a proposal option, wherein the proposal recommendation and the one or more data fields are identified by using the recommendation machine learning algorithm according to the set of parameters;
    generating a proposal, wherein the proposal includes the proposal option, the proposal recommendation, and the one or more data fields;
    updating a member interface to present the proposal;
    monitoring ongoing messages exchanged between the member and the representative through the communications session to obtain message feedback corresponding to the proposal;
    monitoring member interactions with the proposal recommendation and the one or more data fields through the member interface to obtain interaction feedback corresponding to the proposal; and
    retraining the template machine learning algorithm and the recommendation machine learning algorithm using the message feedback and the interaction feedback, wherein retraining provides improved recommendations in new proposals and reduces unnecessary interactions.

2. The computer-implemented method of claim 1, further comprising:
    ranking the proposal recommendation based on a suitability metric to generate a recommendation ranking, wherein the suitability metric indicates a suitability between the proposal recommendation and the proposal option; and
    adding the recommendation ranking to the proposal.

3. The computer-implemented method of claim 1, wherein identifying the proposal recommendation and the one or more data fields further comprises:
    automatically processing a member profile associated with the member through the recommendation machine learning algorithm to toggle the one or more data fields for presentation with the proposal recommendation.

4. The computer-implemented method of claim 1, wherein the proposal template specifies an empty set of proposal options.

5. The computer-implemented method of claim 1, further comprising:
    adding one or more custom fields to the proposal template; and
    generating one or more custom proposal recommendations for a selected custom field, wherein the one or more custom proposal recommendations are generated using the set of parameters and other parameters associated with the selected custom field.

6. The computer-implemented method of claim 1, further comprising:
receiving a request to add another proposal recommendation for the proposal option;
automatically querying a resource library to identify previously generated proposals associated with the member, wherein the previously generated proposals include previously provided proposal recommendations; and
providing the previously provided proposal recommendations in response to the request.

7. The computer-implemented method of claim 1, wherein:
the ongoing messages and the member interactions are further monitored to determine one or more preferences corresponding to a presentation of the proposal through the member interface; and
the computer-implemented method further comprises automatically updating a member profile associated with the member based on the one or more preferences.

8. A system, comprising:
one or more processors; and
memory storing thereon instructions that, as a result of being executed by the one or more processors, cause the system to:
receive a task specification associated with a member, wherein the task specification includes a set of parameters associated with a task, and wherein the task specification is received through a communications session between the member and a representative;
train a template machine learning algorithm to identify interaction correlations between different interactions and proposals generated using proposal templates;
identify a proposal template for the task specification, wherein the proposal template is identified by using the template machine learning algorithm to process the task specification according to the interaction correlations, and wherein the proposal template includes a set of proposal options and a set of data fields associated with the task;
train a recommendation machine learning algorithm to generate proposal recommendations for different proposal options and data field recommendations for different data fields presentable with the proposal recommendations, wherein the recommendation machine learning algorithm is trained and implemented to reduce unnecessary interactions with the proposal recommendations and the different data fields, and wherein the recommendation machine learning algorithm is trained using a sample interaction dataset that includes sample interactions with the proposal recommendations and the different data fields;
identify a proposal recommendation and one or more data fields for a proposal option, wherein the proposal recommendation and the one or more data fields are identified by using the recommendation machine learning algorithm according to the set of parameters;
generate a proposal, wherein the proposal includes the proposal option, the proposal recommendation, and the one or more data fields;
update a member interface to present the proposal;
monitor ongoing messages exchanged between the member and the representative through the communications session to obtain message feedback corresponding to the proposal;
monitor member interactions with the proposal recommendation and the one or more data fields through the member interface to obtain interaction feedback corresponding to the proposal; and
retrain the template machine learning algorithm and the recommendation machine learning algorithm using the message feedback and the interaction feedback, wherein retraining provides improved recommendations in new proposals and reduces unnecessary interactions.

9. The system of claim 8, wherein the instructions further cause the system to:
rank the proposal recommendation based on a suitability metric to generate a ranking, wherein the suitability metric indicates a suitability between the proposal recommendation and the proposal option; and
add the ranking to the proposal.

10. The system of claim 8, wherein the instructions that cause the system to identify the proposal recommendation and the one or more data fields further cause the system to:
automatically process a member profile associated with the member through the recommendation machine learning algorithm to toggle the one or more data fields for presentation with the proposal recommendation.

11. The system of claim 8, wherein the proposal template specifies an empty set of proposal options.

12. The system of claim 8, wherein the instructions further cause the system to:
add one or more custom fields to the proposal template; and
generate one or more custom proposal recommendations for a selected custom field, wherein the one or more custom proposal recommendations are generated using the set of parameters and other parameters associated with the selected custom field.

13. The system of claim 8, wherein the instructions further cause the system to:
receive a request to add another proposal recommendation for the proposal option;
automatically query a resource library to identify previously generated proposals associated with the member, wherein the previously generated proposals include previously provided proposal recommendations; and
provide the previously provided proposal recommendations in response to the request.

14. The system of claim 8, wherein:
the ongoing messages and the member interactions are monitored to determine one or more preferences corresponding to a presentation of the proposal through the member interface; and
the instructions further cause the system to automatically update a member profile associated with the member based on the one or more preferences.

15. A non-transitory, computer-readable storage medium storing thereon executable instructions that, as a result of being executed by a computer system, cause the computer system to:
receive a task specification associated with a member, wherein the task specification includes a set of parameters associated with a task, and wherein the task specification is received through a communications session between the member and a representative;

train a template machine learning algorithm to identify interaction correlations between different interactions and proposals generated using proposal templates;

identify a proposal template for the task specification, wherein the proposal template is identified by using the template machine learning algorithm to process the task specification according to the interaction correlations, and wherein the proposal template includes a set of proposal options and a set of data fields associated with the task;

train a recommendation machine learning algorithm to generate proposal recommendations for different proposal options and data field recommendations for different data fields presentable with the proposal recommendations, wherein the recommendation machine learning algorithm is trained and implemented to reduce unnecessary interactions with the proposal recommendations and the different data fields, and wherein the recommendation machine learning algorithm is trained using a sample interaction dataset that includes sample interactions with the proposal recommendations and the different data fields;

identify a proposal recommendation and one or more data fields for a proposal option, wherein the proposal recommendation and the one or more data fields are identified by using the recommendation machine learning algorithm according to the set of parameters;

generate a proposal, wherein the proposal includes the proposal option, the proposal recommendation, and the one or more data fields;

update a member interface to present the proposal;

monitor ongoing messages exchanged between the member and the representative through the communications session to obtain message feedback corresponding to the proposal;

monitor member interactions with the proposal recommendation and the one or more data fields through the member interface to obtain interaction feedback corresponding to the proposal; and retrain the template machine learning algorithm and the recommendation machine learning algorithm using the message feedback and the interaction feedback, wherein retraining provides improved recommendations in new proposals and reduces unnecessary interactions.

16. The non-transitory, computer-readable storage medium of claim 15, wherein the executable instructions further cause the computer system to:

rank the proposal recommendation based on a suitability metric to generating a ranking, wherein the suitability metric indicates a suitability between the proposal recommendation and the proposal option; and add the ranking to the proposal.

17. The non-transitory, computer-readable storage medium of claim 15, wherein the executable instructions that cause the computer system to identify the proposal recommendation and the one or more data fields further cause the computer system to:

automatically process a member profile associated with the member through the recommendation machine learning algorithm to toggle the one or more data fields for presentation with the proposal recommendation.

18. The non-transitory, computer-readable storage medium of claim 15, wherein the proposal template specifies an empty set of proposal options.

19. The non-transitory, computer-readable storage medium of claim 15, wherein the executable instructions further cause the computer system to:

add one or more custom fields to the proposal template; and generate one or more custom proposal recommendations for a selected custom field, wherein the one or more custom proposal recommendations are generated using the set of parameters and other parameters associated with the selected custom field.

20. The non-transitory, computer-readable storage medium of claim 15, wherein the executable instructions further cause the computer system to:

receive a request to add another proposal recommendation for the proposal option;

automatically query a resource library to identify previously generated proposals associated with the member, wherein the previously generated proposals include previously provided proposal recommendations; and provide the previously provided proposal recommendations in response to the request.

21. The non-transitory, computer-readable storage medium of claim 15, wherein:

the ongoing messages and the member interactions are further monitored to determine one or more preferences corresponding to a presentation of the proposal through the member interface; and the executable instructions further cause the computer system to automatically update a member profile associated with the member based on the one or more preferences.

* * * * *